(12) United States Patent
Myers et al.

(10) Patent No.: US 11,283,900 B2
(45) Date of Patent: Mar. 22, 2022

(54) ENTERPRISE PERFORMANCE AND CAPACITY TESTING

(71) Applicant: MicroStrategy Incorporated, Vienna, VA (US)

(72) Inventors: Clayton Myers, Oak Hill, VA (US);
Andrew Smith, Oakton, VA (US);
Timothy Lang, McLean, VA (US);
Herminio Carames, Lansdowne, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/697,375

(22) Filed: Nov. 27, 2019

(65) Prior Publication Data

US 2020/0099773 A1    Mar. 26, 2020

Related U.S. Application Data

(63) Continuation-in-part of application No. 15/427,816, filed on Feb. 8, 2017, now abandoned, and a
(Continued)

(51) Int. Cl.
*G06F 15/16* (2006.01)
*H04L 67/00* (2022.01)
(Continued)

(52) U.S. Cl.
CPC .......... *H04L 67/34* (2013.01); *H04L 67/1095* (2013.01); *H04L 67/42* (2013.01)

(58) Field of Classification Search
CPC . H04L 67/1008; H04L 67/1095; H04L 67/34; H04L 67/42
(Continued)

(56) References Cited

U.S. PATENT DOCUMENTS 5,758,071 A    5/1998  Burgess et al.
6,085,244 A    7/2000  Wookey
(Continued)

OTHER PUBLICATIONS

Abhors et al., "An Automated Approach for Creating Workload Models from Server Log Data," 9th Intl Conf. on Software Engineering and Applications, 2014, 1-12.
(Continued)

*Primary Examiner* — Moustafa M Meky
*Assistant Examiner* — Thorne E Waugh
(74) *Attorney, Agent, or Firm* — Fish & Richardson P.C.

(57) ABSTRACT

In some implementations, an interface indicating a set of software objects used in a first server environment may be provided. Data indicating a selection of testing parameters including a load level and one or more software objects selected from among the set of software objects may be received. A server environment test configured to generate concurrently running tasks at the indicated load level using the selected software objects may be generated. The server environment test may be performed on the first server environment to generate first results indicating at least server resource usage levels and response times of the first server environment during the server environment test. The server environment test may be performed on a second server environment to generate second results. An output data set indicating performance of the second server environment relative to performance of the first server environment may be provided.

20 Claims, 25 Drawing Sheets

Related U.S. Application Data continuation-in-part of application No. 16/595,330, filed on Oct. 7, 2019, now Pat. No. 11,102,331, which is a continuation of application No. 15/427,675, filed on Feb. 8, 2017, now Pat. No. 10,440,153.

(60) Provisional application No. 62/810,461, filed on Feb. 26, 2019, provisional application No. 62/292,524, filed on Feb. 8, 2016, provisional application No. 62/292,791, filed on Feb. 8, 2016.

(51) Int. Cl.
*H04L 67/1095* (2022.01)
*H04L 67/01* (2022.01)

(58) Field of Classification Search
USPC .......................................................... 709/220
See application file for complete search history.

(56) References Cited

U.S. PATENT DOCUMENTS

| | | | |
|---|---|---|---|
| 6,282,175 B1 | 8/2001 | Steele et al. | |
| 6,334,158 B1 | 12/2001 | Jennyc et al. | |
| 6,338,149 B1 | 1/2002 | Ciccone, Jr. et al. | |
| 6,339,795 B1 | 1/2002 | Narukar et al. | |
| 6,449,739 B1 | 9/2002 | Landan | |
| 6,473,794 B1 * | 10/2002 | Guheen | H04L 41/22 709/223 |
| 6,691,067 B1 | 2/2004 | Ding et al. | |
| 6,691,245 B1 | 2/2004 | DeKoning | |
| 6,816,871 B2 | 11/2004 | Lee | |
| 6,934,934 B1 * | 8/2005 | Osborne, II | G06F 11/3414 709/224 |
| 6,964,051 B1 | 11/2005 | Palaniappan | |
| 6,993,747 B1 * | 1/2006 | Friedman | G06F 11/36 714/E11.207 |
| 7,024,548 B1 | 4/2006 | O'Toole, Jr. | |
| 7,035,919 B1 * | 4/2006 | Lee | H04L 67/1095 709/203 |
| 7,047,177 B1 * | 5/2006 | Lee | H04L 41/0823 703/22 |
| 7,051,098 B2 | 5/2006 | Masters et al. | |
| 7,089,347 B2 | 8/2006 | Mogi et al. | |
| 7,155,462 B1 * | 12/2006 | Singh | G06F 8/65 717/170 |
| 7,197,559 B2 | 3/2007 | Goldstein et al. | |
| 7,346,676 B1 | 3/2008 | Swildens et al. | |
| 7,389,216 B2 | 6/2008 | Parent et al. | |
| 7,523,447 B1 * | 4/2009 | Callahan | G06F 11/3672 717/135 |
| 7,552,438 B1 | 6/2009 | Werme et al. | |
| 7,581,011 B2 | 8/2009 | Teng | |
| 7,617,486 B2 | 11/2009 | Sharma et al. | |
| 7,657,871 B2 | 2/2010 | Velupillai | |
| 7,784,049 B1 | 8/2010 | Gandler | |
| 7,802,174 B2 | 9/2010 | Teng et al. | |
| 7,917,617 B1 | 3/2011 | Ponnapur et al. | |
| 7,937,655 B2 | 5/2011 | Teng et al. | |
| 8,024,299 B2 | 9/2011 | Dias et al. | |
| 8,099,727 B2 | 1/2012 | Bahat et al. | |
| 8,219,432 B1 | 7/2012 | Bradley et al. | |
| 8,260,893 B1 | 9/2012 | Bandbole et al. | |
| 8,285,681 B2 | 10/2012 | Prahlad et al. | |
| 8,554,918 B1 | 10/2013 | Douglis | |
| 8,583,769 B1 | 11/2013 | Peters et al. | |
| 8,595,364 B2 * | 11/2013 | Yahalom | G06F 3/0635 709/226 |
| 8,595,714 B1 | 11/2013 | Hamer et al. | |
| 8,612,599 B2 | 12/2013 | Tung et al. | |
| 8,732,604 B2 | 5/2014 | Okamoto et al. | |
| 8,805,970 B2 | 8/2014 | Breh et al. | |
| 8,819,171 B2 * | 8/2014 | Chakraborty | G06F 11/3428 709/217 |
| 8,892,954 B1 | 11/2014 | Gray et al. | |
| 8,990,778 B1 | 3/2015 | Allocca et al. | |
| 9,047,017 B1 | 6/2015 | Dolan et al. | |
| 9,053,220 B2 * | 6/2015 | Chong | G06F 11/328 |
| 9,110,496 B1 | 8/2015 | Michelsen | |
| 9,164,874 B1 | 10/2015 | Tonnay et al. | |
| 9,166,895 B1 | 10/2015 | Sivaraman | |
| 9,189,294 B2 * | 11/2015 | Considine | G06F 9/5088 |
| 9,262,150 B2 | 2/2016 | Haserodt et al. | |
| 9,268,663 B1 | 2/2016 | Siddiqui et al. | |
| 9,270,449 B1 | 2/2016 | Tribble et al. | |
| 9,311,161 B2 | 4/2016 | Jagtap | |
| 9,367,305 B1 | 6/2016 | Kumar et al. | |
| 9,424,172 B1 | 8/2016 | Helder | |
| 9,436,535 B2 | 9/2016 | Ricken et al. | |
| 9,491,072 B2 | 11/2016 | Raghunathan et al. | |
| 9,531,604 B2 * | 12/2016 | Akolkar | H04L 47/70 |
| 9,674,294 B1 | 6/2017 | Gonthier et al. | |
| 9,716,624 B2 | 7/2017 | Zeyliger et al. | |
| 9,733,921 B1 | 8/2017 | Saenz et al. | |
| 9,762,450 B2 | 9/2017 | Xie | |
| 9,766,962 B2 | 9/2017 | Dvir et al. | |
| 9,767,312 B2 | 9/2017 | Sahoo | |
| 9,811,849 B2 | 11/2017 | Bursey | |
| 9,820,224 B2 | 11/2017 | Hui et al. | |
| 9,928,210 B1 | 3/2018 | Zbang et al. | |
| 9,959,104 B2 | 5/2018 | Chen et al. | |
| 9,965,261 B2 | 5/2018 | Chen et al. | |
| 9,986,427 B2 | 5/2018 | Kimpe | |
| 10,002,247 B2 | 6/2018 | Suarez et al. | |
| 10,007,509 B1 | 6/2018 | Quershi et al. | |
| 10,169,023 B2 | 1/2019 | Ciano et al. | |
| 10,191,778 B1 | 1/2019 | Yang et al. | |
| 10,241,778 B2 | 3/2019 | Emeis et al. | |
| 10,244,034 B2 | 3/2019 | Joshi et al. | |
| 10,261,782 B2 | 4/2019 | Suarez et al. | |
| 10,303,455 B2 | 5/2019 | Fitzgerald et al. | |
| 10,310,949 B1 | 6/2019 | Chakraborty et al. | |
| 10,318,280 B2 | 6/2019 | Islam et al. | |
| 10,356,214 B2 | 7/2019 | Joshi et al. | |
| 10,389,582 B1 | 8/2019 | Fakhour et al. | |
| 10,440,153 B1 | 10/2019 | Smith et al. | |
| 10,474,548 B2 | 11/2019 | Sanakkayala et al. | |
| 10,803,411 B1 | 10/2020 | Smith et al. | |
| 10,810,041 B1 | 10/2020 | Myers | |
| 10,997,135 B2 | 5/2021 | Zoll | |
| 11,102,330 B2 | 8/2021 | Gardner et al. | |
| 11,102,331 B2 | 8/2021 | Smith | |
| 2002/0065833 A1 | 5/2002 | Litvin | |
| 2002/0122422 A1 | 9/2002 | Kenney et al. | |
| 2002/0124243 A1 * | 9/2002 | Broeksteeg | G06F 8/65 717/168 |
| 2002/0157089 A1 | 10/2002 | Patel et al. | |
| 2002/0198985 A1 | 12/2002 | Fraenkel et al. | |
| 2003/0135382 A1 | 7/2003 | Marejka et al. | |
| 2004/0060044 A1 | 3/2004 | Das et al. | |
| 2004/0068424 A1 | 4/2004 | Lee et al. | |
| 2006/0129870 A1 | 6/2006 | Parent et al. | |
| 2006/0236056 A1 | 10/2006 | Nagata | |
| 2008/0077366 A1 | 3/2008 | Neuse et al. | |
| 2008/0097960 A1 * | 4/2008 | Dias | G06F 16/20 |
| 2008/0109448 A1 | 5/2008 | Aboel-Nil et al. | |
| 2008/0115195 A1 | 5/2008 | Malek et al. | |
| 2008/0163092 A1 | 7/2008 | Rao | |
| 2008/0243660 A1 | 10/2008 | Amemiya et al. | |
| 2008/0247314 A1 | 10/2008 | Kim et al. | |
| 2008/0030166 A1 | 12/2008 | Bahat et al. | |
| 2009/0018996 A1 | 1/2009 | Hunt et al. | |
| 2009/0063699 A1 | 3/2009 | Chapweske et al. | |
| 2009/0070462 A1 * | 3/2009 | Chong | G06F 11/328 709/224 |
| 2009/0282401 A1 | 11/2009 | Todorova | |
| 2010/0153780 A1 | 6/2010 | Kirtkow | |
| 2010/0162406 A1 | 6/2010 | Benameur et al. | |
| 2010/0250487 A1 | 9/2010 | Gabriel et al. | |
| 2010/0318986 A1 | 12/2010 | Burke et al. | |
| 2011/0054968 A1 | 3/2011 | Galaviz | |
| 2011/0055823 A1 | 3/2011 | Nichols et al. | |
| 2011/0099290 A1 | 4/2011 | Swildens et al. | |

(56) References Cited

U.S. PATENT DOCUMENTS

| | | |
|---|---|---|
| 2011/0145525 A1 | 6/2011 | Browne et al. |
| 2011/0314344 A1 | 12/2011 | Okamoto et al. |
| 2012/0096149 A1 | 4/2012 | Sunkara et al. |
| 2012/0117620 A1 | 5/2012 | Cassidy |
| 2012/0167094 A1 | 6/2012 | Suit |
| 2012/0198279 A1 | 8/2012 | Schroeder |
| 2012/0310765 A1 | 12/2012 | Masters |
| 2013/0042123 A1 | 2/2013 | Smith et al. |
| 2013/0054792 A1 | 2/2013 | Sharaf |
| 2013/0080514 A1 | 3/2013 | Gupta et al. |
| 2013/0197863 A1 | 8/2013 | Rayate et al. |
| 2013/0297769 A1 | 11/2013 | Chang et al. |
| 2013/0311740 A1 | 11/2013 | Watanabe et al. |
| 2013/0339299 A1 | 12/2013 | Muller et al. |
| 2014/0019387 A1 | 1/2014 | Cao et al. |
| 2014/0020048 A1 | 1/2014 | Snodgrass |
| 2014/0089033 A1 | 3/2014 | Snodgrass |
| 2014/0089505 A1 | 3/2014 | Haserodt et al. |
| 2014/0156839 A1 | 6/2014 | Swildens et al. |
| 2014/0165063 A1 | 6/2014 | Shiva et al. |
| 2014/0282456 A1* | 9/2014 | Drost ............... G06F 8/76 717/158 |
| 2014/0331209 A1 | 11/2014 | Singh |
| 2014/0331225 A1 | 11/2014 | Helander et al. |
| 2014/0358944 A1 | 12/2014 | Brower, Jr. et al. |
| 2015/0019195 A1 | 1/2015 | Davis |
| 2015/0019197 A1 | 1/2015 | Higginson |
| 2015/0019488 A1* | 1/2015 | Higginson ............ G06F 16/214 707/634 |
| 2015/0019706 A1 | 1/2015 | Raghunathan et al. |
| 2015/0081574 A1 | 3/2015 | Selby et al. |
| 2015/0089479 A1 | 3/2015 | Chen et al. |
| 2015/0095892 A1 | 4/2015 | Baggott et al. |
| 2015/0100829 A1 | 4/2015 | Nanjundappa et al. |
| 2015/0178052 A1 | 6/2015 | Gupta et al. |
| 2015/0220426 A1 | 8/2015 | Spektor et al. |
| 2015/0242636 A1 | 8/2015 | Kiran et al. |
| 2015/0295792 A1 | 10/2015 | Cropper et al. |
| 2015/0326432 A1 | 11/2015 | Fujie et al. |
| 2015/0373097 A1 | 12/2015 | Konkus et al. |
| 2016/0026555 A1 | 1/2016 | Kuo et al. |
| 2016/0044040 A1 | 2/2016 | Caffary, Jr. |
| 2016/0055067 A1 | 2/2016 | Bensinger |
| 2016/0072730 A1 | 3/2016 | Jurban et al. |
| 2016/0132320 A1 | 5/2016 | Fitzgerald et al. |
| 2016/0139887 A1 | 5/2016 | Pudiyapura et al. |
| 2016/0164738 A1 | 6/2016 | Pinski et al. |
| 2016/0277249 A1 | 9/2016 | Singh et al. |
| 2016/0335106 A1 | 11/2016 | Behere et al. |
| 2016/0335108 A1 | 11/2016 | Ryu et al. |
| 2016/0337186 A1 | 11/2016 | Dolinsky et al. |
| 2016/0344610 A1 | 11/2016 | Robinette |
| 2016/0350205 A1* | 12/2016 | Safari ............... G06F 9/45533 |
| 2016/0371170 A1 | 12/2016 | Salunke et al. |
| 2017/0090972 A1 | 3/2017 | Ryu et al. |
| 2017/0147319 A1 | 5/2017 | Riek et al. |
| 2017/0154017 A1 | 6/2017 | Kristiansson et al. |
| 2017/0177860 A1 | 6/2017 | Suarez et al. |
| 2017/0185488 A1 | 6/2017 | Kumarasamy et al. |
| 2017/0270455 A1 | 9/2017 | Chi et al. |
| 2017/0295199 A1 | 10/2017 | Kirti et al. |
| 2017/0300311 A1 | 10/2017 | Lopez et al. |
| 2017/0315795 A1 | 11/2017 | Keller |
| 2018/0013616 A1 | 1/2018 | Abadi et al. |
| 2018/0075086 A1 | 3/2018 | Yam et al. |
| 2018/0088926 A1 | 3/2018 | Abrams |
| 2018/0088935 A1 | 3/2018 | Church et al. |
| 2018/0095778 A1 | 4/2018 | Aydelott et al. |
| 2018/0095973 A1 | 4/2018 | Huang et al. |
| 2018/0136931 A1 | 5/2018 | Hendrich et al. |
| 2018/0157516 A1 | 6/2018 | Kristiansson et al. |
| 2018/0173502 A1 | 6/2018 | Biskup et al. |
| 2018/0173522 A1 | 6/2018 | Hamill et al. |
| 2018/0205652 A1 | 7/2018 | Saxena |
| 2018/0267908 A1 | 9/2018 | Pan et al. |
| 2018/0285199 A1 | 10/2018 | Mitkar et al. |
| 2018/0285210 A1 | 10/2018 | Mitkar et al. |
| 2018/0285246 A1 | 10/2018 | Tuttle et al. |
| 2018/0285353 A1 | 10/2018 | Rao et al. |
| 2018/0287902 A1 | 10/2018 | Chitalia et al. |
| 2018/0288129 A1 | 10/2018 | Joshi et al. |
| 2018/0341471 A1 | 11/2018 | Stefanov et al. |
| 2019/0034313 A1 | 1/2019 | Vedurumudi et al. |
| 2019/0050680 A1 | 2/2019 | Waugh et al. |
| 2019/0095254 A1 | 3/2019 | Rao |
| 2019/0109822 A1 | 4/2019 | Clark et al. |
| 2019/0109857 A1 | 4/2019 | Caffary, Jr. |
| 2019/0132329 A1 | 5/2019 | Verberkt et al. |
| 2019/0163559 A1 | 5/2019 | Takahashi et al. |
| 2019/0208031 A1 | 7/2019 | Bennet et al. |
| 2019/0213068 A1 | 7/2019 | Upadhyay |
| 2019/0230130 A1 | 7/2019 | Beckman et al. |
| 2019/0235897 A1 | 8/2019 | Goel |
| 2019/0236844 A1 | 8/2019 | Balasian et al. |
| 2019/0260716 A1 | 8/2019 | Lerner |
| 2019/0278669 A1 | 9/2019 | Mueller-Wicke et al. |
| 2019/0288956 A1 | 9/2019 | Pulier et al. |
| 2019/0303541 A1 | 10/2019 | Reddy et al. |
| 2019/0317829 A1 | 10/2019 | Brown et al. |
| 2019/0354389 A1 | 11/2019 | Du et al. |
| 2019/0392045 A1 | 12/2019 | De Lima Junior et al. |
| 2020/0019393 A1 | 1/2020 | Vichare et al. |
| 2020/0067763 A1 | 2/2020 | Vytla |
| 2020/0081814 A1 | 3/2020 | Srinivasan et al. |
| 2020/0112624 A1 | 4/2020 | Smith et al. |
| 2020/0119979 A1 | 4/2020 | Woodland et al. |
| 2020/0177634 A1 | 6/2020 | Hwang et al. |
| 2020/0204465 A1 | 6/2020 | Baker et al. |
| 2020/0257612 A1 | 8/2020 | Lang et al. |
| 2020/0272786 A1 | 8/2020 | Pandurangarao et al. |
| 2020/0293436 A1 | 9/2020 | Carames et al. |
| 2020/0356806 A1 | 11/2020 | Li et al. |
| 2020/0366572 A1 | 11/2020 | Chauhan |
| 2020/0394120 A1 | 12/2020 | Salmi et al. |
| 2021/0042141 A1 | 2/2021 | De Marco et al. |
| 2021/0048995 A1 | 2/2021 | Myers et al. |
| 2021/0048998 A1 | 2/2021 | Myers et al. |
| 2021/0049002 A1 | 2/2021 | Myers et al. |
| 2021/0064262 A1 | 3/2021 | Myers et al. |
| 2021/0064492 A1 | 3/2021 | Myers |
| 2021/0065078 A1 | 3/2021 | Gardner et al. |
| 2021/0067406 A1 | 3/2021 | Myers et al. |
| 2021/0067607 A1 | 3/2021 | Gardner et al. |
| 2021/0073026 A1 | 3/2021 | Myers et al. |
| 2021/0081298 A1 | 3/2021 | Gardner et al. |
| 2021/0089438 A1 | 3/2021 | Gardner et al. |
| 2021/0092015 A1 | 3/2021 | Gardner et al. |
| 2021/0124610 A1 | 4/2021 | Gardner et al. |

OTHER PUBLICATIONS

Pederson, "Testing SharePoint Apps in Production (Canary Release)", Simon J.K. Pedersen's Azure & Docker blog, 2014, 1-9.

Doc-archives.microstrategy.com [online], "Installation and Configuration Guide," Sep. 2018, retrieved Mar. 20, 2020, retrieved from URL <https://doc-archives.microstrategv.com/producthelp/10.11/manuals/en/installationConfig.pdP>, 527 pages.

Doc-archives.microstrategy.com [online], "Installing and Configuring MicroStrategy Library'," Jun. 2017, retrieved on Oct. 25, 2019, retrieved from URL https://doc-archives.microstrateey.com/oroducthelp/1010/nstallConfig/WebHelp/Lang 1033/Content/install_con fig library.htm, 2 pages.

Docs.docker.com [online]. "Get Started, Part 1: Orientation and setup." 2.017. retrieved on Oct. 25, 2019, retrieved from URL<https://docs.docker.com/get-staited/>, 6 pages.

Dyn.com "Kubemetes: The Difference Between Containers and Virtual Machines," Feb. 2018, retrieved on Oct. 25. 2019, retrieved from URL <https://dyn.com/blog/kubernetes-the-difference-between-containers-and-virtual-machines/>. 8 pages.

Edureka.co [online], "Docker tutorial—Introduction to docker & containerization," 2017, retrieved on October 25, 2019, retrieved from URL <https://www.edureka.co/blog/docker-tutorial>, 10 pages.

(56) References Cited

OTHER PUBLICATIONS

GWS Advisory [online], "What's New in Microstrategy 2019", Jan. 2019, retrieved on Oct. 8, 2021, retrieved from URL < https://www.gwsadvisory.com/wp-content/uploads/2019/01/whats-new-in-microst.rategy-2019.pdf >, 138 pages.
Kubernetes.io [online]." Concepts underlvine the cloud controller manager," May 2019, retrieved on Jun. 20, 2019, retrieved from URL <https://kubernetes.io/docs/concepts/architecture/cloud-controller/, 9 pages.
Kubernetes.io [online], "StatefulSet is the workload API object used to manage stateful applications," Jun. 2019, retrieved on Jun. 20, 2019, retrieved from URL <https://kubemetes.io/docs/concepts/woikloads/controllers/statefidset/>, 9 pages.
Linkedin.com [online], "Moving Micro Strategy to a docker/kubemetes infrastructure," Jan. 2018, retrieved from Oct. 25, 2019 retrieved from URL <https://www.linkedin.com/pulse/moving-microstrategy-dockerkuberaetes-infrasture-montero/>, 3 pages.
Linuxize.com [online], "How To Remove Docker Containers, Images. Volumes, and Networks," Oct. 2018. retrieved on Oct. 25, 2019, retrieved from URL <https://linuxize.com/post/how-to-remove-docker-images-containers-vols. and-netwoiks/#remove-one-or-more-containers>, 11 pages.
Ma et al., "Efficient sendee handoff across edge servers via docker container migration author:," 2017, SEC '17: Proceedings of the Second ACM/IEEE Symposium on Edge Computing, 11:1-13.
MicroStrategy [online]. "MicroStrategy 10.9 Readme", 2017, retrieved on Oct. 5, 2021, 124 pages.
MicroStrategy [online], "System Administration Guide". 2018, retrieved on Oct. 5. 2021, 831 pages.
MicroStrategy [online], "Tools to Upgrade with Confidence", Feb. 4, 2019, retrieved on Oct. 12, 2021, 26 pages.
MicroStrategy [online]. "Upgrade Guide—Upgrading your MicroStrategy Enterprise Software", Jun. 2016, retrieved on Oct. 8, 2021, retrieved from URL <https://doc-arehives.microstrategy.com/producthelp/10.4/manuals/en/UpgradeGuide.pdf >, 109 pages.
MicroStrategy [online], "Upgrade Guide—Version 10", 2015, retrieved on Oct. 8, 2021, retrieved from URI. <https://doc-archives.microstxategy.com/producthelp/10/manuals/en/UpgradeGuide.pdf >, 118 pages.
MicroStrategy [online], "Upgrade Guide—Version 10. 9"Sep. 2017, retrieved on Oct. 8, 2021, retrieved from URL <https://www2.microstrategy.com/producthelp/10.9/manuals/en/UpgradeGuide.pdf>, 90 pages.
MicroStrategy [online], "Upgrade Guide—Version 10.11", Jun. 2018, retrieved on Oct. 8, 2021, retrieved from URL < https://www2.microstrategy.com/producthelp/10.11/manuals/en/UpgradeGuide.pdf>, 92 pages.
MicroStrategy.com [online]," Microstrategy on Kubernetes," 2017, retrieved on Oct. 25, 2019, retrieved from URL <https://www.microstrategv.com/getmedia/d99b44dc-ec44-45 1b-a5a3-3db7160282f0/Genesvs-How-to-tun-MicroStrategy-on-Kubemetes>, 10 pages.
Singh et al., "Container-based microservice architecture for cloud applications," May 2017, 2017 International Conference on Computing, Communication and Automation (ICCCA). 847-852.
Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#5224 1241>, 6 pages.
Tao et al., "Dynamic Resource Allocation Algorithm for Container-based Service Computing"; 2017 IEEE 13th International Symposium on Autonomous Decentralized Systems-2017 IEEE, pp. 61-67.
Tuton, "Deploy A MongoDB replica set using the IBM Cloud Kubernetes Service," IBM Developer, Mar. 15, 2018, 14 pages.
U.S. Office Action in U.S. Appl. No. 16/582,874, dated Jun. 8, 2021, 7 pages.
U.S. Office Action in U.S. Appl. No. 16/582,874, dated May 19, 2021, 23 pages.
U.S. Office Action in U.S. Appl. No. 16/582,874, dated Nov. 13, 2020, 21 pages.
U.S. Office Action in U.S. Appl. No. 17/028,565, dated Oct. 22, 2021, 9 pages.
U.S. Office Action in United States Appln. No. 16/542.023, dated Mar. 12, 2021, 15 pages.
U.S. Office Action in U.S. Appl. No. 16/556,636 , dated Aug. 18, 2021, 8 pages.
U.S. Office Action in U.S. Appl. No. 16/582,874 , dated Sep. 16, 2021, 30 pages.
U.S. Office Action in U.S. Appl. No. 16/557,713, dated Aug. 5, 2021, 39 pages.
U.S. Office Action in U.S. Appl. No. 16/557,713, dated Feb. 24, 2021, 34 pages.
U.S. Office Action in U.S. Appl. No. 16/557,713, dated Nov. 13, 2020, 25 pages.
Wikipedia.org [online], "Docker(software)," Mar. 2013, retrieved on Oct. 25, 2.019, retrieved from URI. <https://en.wikipedia.org/wiki/Docker (software)>, 8 pages.
Wikipedia.org [online], "OS-level virtualization," Aug. 2006, retrieved on Oct. 25, 2019, retrieved from URL <https://en.wikipedia.org/wiki/OS-level virtualization> , 4 pages.
Wikipedia.org [online], "System Image." Feb. 2013, retrieved Oct. 25. 2019. retrieved from URL <https://en.wikipedia.org/wiki/System image>, 2 pages.
Wong, "What's the Difference Between Containers and Virtual Machines?," Jul. 15, 2016, Electronic Design, retrieved from URL <http://electronicdesign.com/ dev-tools /what-s-difference-between-containers-and-virtualmachines>, 3 pages.
Www.en.wikipedia.org [online], "Online Analytical Processing" Mar. 2018, retrieved on Mar. 19, 2020, retrieved from URL <https://en.wikipedia.org/wiki/Online_analytical_processing>. 14 pages.
Www2.microstrategy.com [online], "MicroStrategy Intelligence Server," Apr. 2019, retrieved on Oct. 25, 2019, retrieved from URL https://www2.microstrategv.com/producthelp/10.4/ProjectDesignGuide/WebHelp/Lang_1033/Content/ProjectDesign/MicroStrategy_Intelligence_Server.htm, 2 pages.
Www2.microstrategv.com [online]. "Operations Manager Guide," 2016, retrieved on Mar. 20, 2020 retrieved from URL <https:/www2.microstrategy.com/producthelp/10.4/manuals/en/OperationsManager.pdf>. 154 pages.
Xu et al.; "Mining Container Image Repositories for Software Configuration and Bevoud' ", 2018 ACM/DEEE 40th International Conference on Software Engineering: New Ideas and Emerging Results- ICSE-NIER'18. May 27 Jun. 3, 2018, 4 pages.

* cited by examiner

| Enterprise | | Environment Name | Type | Created on | Version | Machines | Applications | Users | Alerts | Health |
|---|---|---|---|---|---|---|---|---|---|---|
| Environments | | | | | | | | | | |
| Applications ⊕ | ▦ | Aqueduct Production | On-Premise | Sep 01, 2015, 10:15 AM | V10.1 | 8 | 3 | 1,289 | | (73) RUNNING |
| Data Sources | ▦ | Aqueduct Test | On-Premise | May 29, 2015, 10:15 AM | V10.1 | 6 | 4 | 280 | (4) | |
| Directories | ▦ | Aqueduct Development | On-Premise | Jul 25, 2015, 10:15 AM | V10.1 | 6 | 7 | 137 | | |
| ∴ All | | | | | | | | | | |

Alerts
• System reliability has dropped 40% since 2 weeks ago.
• System capacity has dropped 23% since 2 weeks ago.
• Performance of Dossier2 has reached threshold.
• Performance of Dashboard1 has reached threshold.

Documents
◆ Dossiers
📊 Dashboards
📄 Reports
📋 Forms
◉ Charts
🌐 Maps

Workstation

| Enterprise | | | | | | | |
|---|---|---|---|---|---|---|---|
| Environments ⊕ | | | Workstation | | | | |
| Applications | | | | | | | |
| Data Sources | ●Cloud Production Machines | | | | | 8 Machine 3 Application | |
| Directories | Machine Name | Machine Address | CPU Used | Memory Used | Disk Used | Fenced User | |
| ∴ All | ▽□ cloud-07-135 | 230.193.10.31 | 12% | 9% | 18% | | ▲x2 |
| Documents | Analytic Service | | 8% | 4% | 10% | | ▲ Merit |
| Dossiers | Security Service | | 2% | 3% | 6% | | ▲ Finance |
| Dashboards | Messaging Service | | 2% | 2% | 2% | | |
| Reports | ▽□ cloud-07-137 | 259.89.289.98 | 12% | 23% | 13% | | ▲x2 |
| Forms | Analytic Service | | 7% | 18% | 6% | | |
| Charts | Distribution Service | | 2% | 2% | 6% | | |
| Maps | Web Service | | 3% | 3% | 1% | | |
| Grids | ▽□ cloud-07-138 | 204.90.221.90 | 56% | 54% | 57% | | ▲x1 |
| Analytics | Recommendation Service | | 30% | 22% | 46% | | |
| Filters | Exporting Service | | 26% | 32% | 21% | | |
| Objects | ▽□ cloud-07-139 | 194.355.25.21 | 39% | 30% | 47% | | ▲x1 |
| Models | Analytic Service | | 21% | 16% | 35% | | |
| Security | Search Service | | 18% | 14% | 12% | | |
| Users | ▽□ cloud-07-145 | 284.984.294.2 | 24% | 22% | 23% | | ▲x2 |
| Badges | Mobility Service | | 8% | 12% | 9% | | |
| Others | Analytic Service | | 16% | 10% | 14% | | |
| Media | | | | | | | |
| Styles | | | | | | | |
| Logic | | | | | | | |
| Alerts | | | | | | | |
| Schedules | | | | | | | |
| Scripts | | | | | | | |
| Workflows | | | | | | | |

FIG. 18

| | Cloud Production Machines | | | | | |
|---|---|---|---|---|---|---|
| | Machine Name | Machine Address | CPU Used | Memory Used | Disk Used | Fenced User |
| ▼□ | cloud-07-135 | 230.193.10.31 | 12% | 9% | 18% | ☆x2 |
| | Analytic Service | | 8% | 4% | 10% | |
| | Security Service | | 2% | 3% | 6% | |
| | Messaging Service | | 2% | 2% | 2% | |
| ▽□ | cloud-07-137 | 259.89.289.98 | 12% | 23% | 13% | ☆x2 |
| | Analytic Service | | 7% | 18% | 6% | |
| | Distribution Service | | 2% | 2% | 6% | |
| | Web Service | | 3% | 3% | 1% | |
| ▼□ | cloud-07-133 | 204.90.221.90 | 56% | 54% | 57% | ☆x1 |
| | Recommendation Service | | 30% | 22% | 46% | Restart |
| | Exporting Service | | 26% | 32% | 21% | Machine Information / Fence Users |
| ▽□ | cloud-07-139 | 194.355.25.21 | 39% | 30% | 47% | ☆x1 |
| | Analytic Service | | 21% | 16% | 35% | |
| | Search Service | | 18% | 14% | 12% | |
| ▽□ | cloud-07-145 | 284.984.294.2 | 24% | 22% | 23% | ☆x2 |
| | Mobility Service | | 8% | 12% | 9% | |
| | Analytic Service | | 16% | 10% | 14% | |

FIG. 19

| Machine Name | Machine Address | CPU Used | Memory Used | Disk Used | Fenced User | |
|---|---|---|---|---|---|---|
| ▽ ☐ cloud-07-135 | 230.193.10.31 | 12% | 9% | 18% | | |
| Analytic Service | | 8% | 4% | 10% | | |
| Security Service | | 2% | 3% | 6% | (CXO Group x) | ★x2 |
| Messaging Service | | 2% | 2% | 2% | | |
| ▽ ☐ cloud-07-137 | 259.89.289.98 | 12% | 23% | 13% | | |
| Analytic Service | | 7% | 18% | 6% | | ★x2 |
| Distribution Service | | 2% | 2% | 6% | | |
| Web Service | | 3% | 3% | 1% | | |
| ▽ ☐ cloud-07-138 | 204.90.221.90 | 56% | 54% | 57% | | |
| Recommendation Service | | 30% | 22% | 46% | (CXO Group x) | ★x1 |
| Exporting Service | | 26% | 32% | 21% | | |
| ▽ ☐ cloud-07-139 | 194.355.25.21 | 39% | 30% | 47% | | |
| Analytic Service | | 21% | 16% | 35% | | ★x1 |
| Search Service | | 18% | 14% | 12% | | |
| ▽ ☐ cloud-07-145 | 284.984.294.2 | 24% | 22% | 23% | | |
| Mobility Service | | 8% | 12% | 9% | | ★x2 |
| Analytic Service | | 16% | 10% | 14% | | |

FIG. 21

ENTERPRISE PERFORMANCE AND CAPACITY TESTING

CROSS-REFERENCE TO RELATED APPLICATIONS

This application claims the benefit of U.S. Provisional Patent Application No. 62/810,461, filed on Feb. 26, 2019. This application is a continuation-in-part of U.S. patent application Ser. No. 16/595,330, filed on Oct. 7, 2019, which is a continuation of U.S. patent application Ser. No. 15/427,675, filed on Feb. 8, 2017, which claims priority to U.S. application Ser. No. 62/292,791, filed on Feb. 8, 2016. This application is a continuation-in-part of U.S. patent application Ser. No. 15/427,816, filed on Feb. 8, 2017, which claims priority to U.S. application Ser. No. 62/292,524, filed on Feb. 8, 2016. The entirety of each of the prior applications is incorporated by reference herein.

FIELD

This specification generally describes technology related to enterprise environment testing.

BACKGROUND

In computing, a system may be tested to determine whether performance of the system is satisfactory. For example, a system may be tested to ensure that the system is stable and does not crash. In another example, a system may be tested to ensure that the system is able to execute tasks in a timely manner.

SUMMARY

A server environment may be used to provide an enterprise environment in which tasks may be executed. Server environments may be configured with a variety of different parameters which may affect performance. For example, server environments may be configured with different numbers of processors, different types of processors, and different amounts of memory. However, determining an effect of a change in a server environment on performance may be difficult. For example, a user may not be able to easily discern whether a system is performing faster after a configuration change.

Accordingly, an environment testing platform may test enterprise environments with different configurations and indicate to a user performance of the enterprise environments relative to one another. For example, the environment testing platform may indicate that an enterprise environment with twice the memory of another enterprise environment but otherwise identical can handle tasks twice as fast as the other enterprise environment. In another example, the environment testing platform may indicate that an enterprise environment with twice the memory of another enterprise environment but otherwise identical has the identical performance as the other enterprise environment.

In one aspect, a computer-implemented method can include providing, by the one or more computers, an interface indicating a set of software objects used in a first server environment, receiving, by the one or more computers, data indicating a selection of testing parameters including a load level and one or more software objects selected from among the set of software objects, generating, by the one or more computers, a server environment test configured to generate concurrently running tasks at the indicated load level using the selected software objects, performing, by the one or more computers, the server environment test on the first server environment to generate first results indicating at least server resource usage levels and response times of the first server environment during the server environment test, performing, by the one or more computers, the server environment test on a second server environment to generate second results indicating at least server resource usage levels and response times of the second server environment during the server environment test, the second server environment having a configuration that is different from the first server environment, and based on the first results and the second results, providing, by the one or more computers, an output data set indicating performance of the second server environment relative to performance of the first server environment.

Other versions include corresponding systems and computer programs configured to perform the actions of the methods encoded on computer storage devices.

One or more implementations can include the following optional features. For example, in some implementations, providing the output data set includes providing a document having an interactive user interface that includes a set of controls customized based on the first results and the second results. In certain aspects, actions include determining, based on the first results and the second results, an error that occurred during testing of the second server environment, identifying, by the one or more computers, a software configuration setting of the second server environment corresponding to the error, and based on identifying the software configuration setting corresponding to the error, generating the document such that the set of controls includes a control that is configured to initiate, when selected by a user, a change to the software configuration setting to avoid the error.

In some aspects, actions include determining, based on the first results and the second results, that the error did not occur during the server environment test of the first server environment, where identifying, by the one or more computers, the software configuration setting includes identifying a software configuration difference between the first server environment and the second server environment, and where the document is generated, based on identifying the software configuration difference between the first server environment and the second server environment, such that the control configured to initiate the change to the software configuration setting is configured to change the software configuration setting of the second server environment to a corresponding setting of the first server environment.

In some implementations, further actions include after performing the server environment test for the first environment, making a hardware and/or software change to the first server environment to create the second server environment. In certain aspects, actions include accessing usage logs indicating load on the first server environment over a period of time, determining, based on the usage logs a profile of tasks performed over the period of time and a maximum level of concurrency supported by the first server environment over the period of time, determining, based on the second results, whether the second server environment supports the maximum level of concurrency with tasks corresponding to the profile of tasks, and where providing the data set includes providing an indication whether the second server environment supports the maximum level of concurrency with tasks corresponding to the profile of tasks.

In certain aspects, the load level includes a number of users or concurrent tasks. In some aspects, the software objects includes one or more of data sources, documents, or applications. In some implementations, the interface includes a graphical user interface or an application programming interface. In some aspects, the second server environment differs from the first server environment in regards to one or more of a software configuration change, a hardware change, or a software upgrade. In certain aspects, the server environment test is configured to test one or more of response time, task completion time, central processing unit resource usage, memory resource usage, or throughput.

In some implementations, actions include determining, by the one or more computers, whether the first results and the second results are valid and determining, by the one or more computers, whether outputs from the server environment test on the first server environment match outputs from the server environment test on the first server environment.

The subject matter described in this specification can be implemented in particular embodiments so as to realize one or more of the following advantages. For example, the disclosed system can provide faster and more accurate testing of capabilities of server environments with different configurations. In another example, the disclosed system can enable performance differences between the server environments to be more easily detected and indicated to users.

Many types of enterprise software often include a large number of application components within different computing environments, which makes it difficult to deploy large-scale software upgrades without creating significant performance risks to other software components. In addition, while there are upgrade tools available that can be used to manage large-scale upgrades, such tools often suffer from slow performance, and force system administrators to meticulously plan highly complex upgrade cycles that are usually reactive to performance inefficiencies rather than proactive to improve customer experience.

In some implementations, a system includes an integrated upgrade module that provides access to upgraded versions of enterprise applications without requiring extensive manual user input. The upgraded versions of the software are automatically generated and customized specifically to address a customer's usage patterns. The upgraded versions are also capable of being executed concurrently with prior versions of the software to minimize risks and performance impacts that can result from a large-scale upgrade deployment.

The simplified software upgrade process can generate an upgraded version of software based on stored data and configurations associated with prior versions of the software. Performance tests executed on the upgraded versions are then used indicate actual performance with system data and usage patterns. In this regard, when provided notification of available upgrades for software, a system administrator also receives accurate, personalized recommendations indicating actual performance of the already-created upgraded version, rather than being provided speculative performance predictions for an upgraded version that does not yet exist. The system administrator can also receive various options to access the upgrade in order to minimize the potential impact on the existing configuration of other related enterprise applications.

In one aspect, a computer-implemented method can include: receiving data associated with an initial version of software configured to operate in a server environment; determining one or more usage patterns of the initial version of the software based on the received data; generating an upgraded version of the software configured to operate within the server environment, the upgraded version operating separately and independently of the initial version and being configured according to configuration settings of the initial version; executing one or more performance tests on the generated upgraded version of the software that test the determined one or more usage patterns for the initial version using data previously used with the initial version; and providing access to the upgraded version of the software while maintaining access to the initial version of the software.

Other versions include corresponding systems, and computer programs, configured to perform the actions of the methods encoded on computer storage devices.

One or more implementations can include the following optional features. For example, in some implementations, the one or more usage patterns of the initial version of the software indicate load characteristics of the initial version of the software, user characteristics of users that frequently use the initial version of the software, and a list of other software within the server environment that exchange data transmissions with the initial version of the software.

In some implementations, generating the upgraded version of the software configured to operate within the server environment includes generating an upgraded version of software configured to operate within a local server environment.

In some implementations, generating the upgraded version of the software configured to operate within the server environment includes generating an upgraded version of software configured to operate within a cloud-based server environment.

In some implementations, the one or more performance tests on the generated upgraded version of the software are executed as background processes within the server environment prior to a user providing a request for an upgrade.

In some implementations, executing the one or more performance tests on the generated upgraded version of the software includes executing the upgraded version of the software within a virtual server environment.

In some implementations, the virtual server environment includes the data associated with an initial version of software and data associated with an initial version of software.

In some implementations, providing access to the updated version of the software includes generating a user interface element for the upgraded version of the software that enables a user to access, by providing a single click, a previously installed version of the upgraded version of the software.

In some implementations, the previously installed version of the software includes a portion of the upgraded version of the software.

In some implementations, the user interface that includes the user interface element for the upgraded version of the software is assigned to a predetermined subset of users that were previously assigned to the initial version of the software.

In some implementations, providing access to the upgraded version of the software includes providing one or more indications associated with the executed one or more performance tests.

In some implementations, executing the one or more performance tests on the generated upgraded version of the software includes computing values of one or more performance metrics indicating likelihoods that the upgraded version of the software will successfully operate within the server environment, and providing the one or more indications associated with the executed one or more performance tests includes providing the computed values of the one or more performance metrics.

In some implementations, executing the one or more performance tests includes running a report on the software by pulling values from data sources to populate a report. In some examples, the report includes predetermined characteristics for which values are pulled. In some examples, the report may be automatically customized. For example, the report may be customized based on the configuration settings of the environment. In other examples, the report may be customized by a user.

In some implementations, the data and configuration settings of the initial version of the software comprises at least one of: simulated data of actual user requests processed previously by the initial version of the software, files that are currently used by the initial version of the software to process user requests, or data stored in one or more databases that are associated with the initial version of the software.

In some implementations, the computer-implemented method includes: after configuring the upgraded version of the software, independently storing the upgraded version of the software within a storage device associated with the server environment; and installing the stored upgraded version of the software such that the server environment is capable of operating the upgraded version of the software and the initial version of the software in parallel.

The subject matter described in this specification can be implemented in particular embodiments so as to realize one or more of the following advantages. For example, the disclosed system can provide more accurate performance previews than performance previews generated using benchmarks, because the disclosed system uses actual user data, and even actual prior usage patterns, to generate performance previews. For example, logs showing actions performed with the initial version of the software can be used to simulate or recreate those actions using the upgraded version. Additionally, the disclosed system can provide compatibility previews for applications and programs being updated to the new version. This allows users of the new version of the software to discover conflicts and/or issues before committing to the new version. The upgraded version can be stored and operate in parallel with, and independent of, the earlier version of the software.

In some implementations, the disclosed method of updating a system does not affect the previously installed version of software. Both the current version of the system and the new version of the system can run in parallel. Additionally, by generating a copy of the system and performing the upgrade on the copy, there is no risk of alteration of or interruption of access to the current version of the software or the current image of the environment, including the files, settings, etc.

The system allows for selective migration of data. The system transfers and updates only files that are determined to be critical for the system and its applications to function, or files that are determined to be in use by users of the system. This method of migration reduces computing resources used by reducing the processing required to update the files and reducing the memory required to store the files. For example, using logs of actual usage data for the current version of the software, the tasks or other actions in the log can be run or simulated using the upgraded version. Files, settings, and other data that is rendered redundant or simply is not used with the upgraded version may be omitted in some instances.

By migrating files used by the system and in use by users, the method also preserves dependencies, reducing the occurrence of system and application failure and interruption to a user's workflow. Additionally, the generation of the copy of the system and the updating of the copy is performed in the background and does not disrupt ongoing tasks being performed by user of the system. In some examples, the system performs the upgrade of the software to the new version and automatically generates the performance previews, including testing of the new version of the software using real user data and/or historical user tasks, and reduces the amount of user input required.

In some implementations, a system can configure various platforms of a unified, multi-platform enterprise system. When a request to manipulate a data object from one platform or category to another platform or category is received, resources connected to the data object may be retrieved and a simulation of the unified, multi-platform enterprise system can be executed to determine the likely performance of the unified, multi-platform enterprise system after the data object is reconfigured, e.g., assigned to be served by a different server in the enterprise. Health scores for the unified, multi-platform enterprise system or a particular platform or category may be generated based on the simulation. A user can decide based on the health scores whether the user would like to proceed with the requested change or to terminate the request. If the user would like to proceed with the requested change, the resources associated with the data object may be copied or reconfigured so that the data object can operate or be executed in the destination platform or category.

These and other techniques enable a user to remotely configure many types of applications, documents, and other elements of an enterprise computing system. For example, a user can instruct the system to assign an application or document to be served in a particular computing environment, e.g., a particular grouping of servers, which may be designated for a particular purpose or task. The system can then identify metadata, data sources, resource dependencies, and other needs of the selected application or document, and automatically configure the particular computing environment to support the selected application or document.

In general, one aspect of the subject matter described in this specification may include a computer-implemented method including operations of receiving, by the one or more computers, a request from a user to change a configuration of a computing environment provided by one or more servers, in response to receiving the request and before performing the requested change in the configuration of the environment: determining, by the one or more computers, an estimated measure of performance that represents a level of performance of the computing environment if changed according to the request, and providing, by the one or more computers, data indicating performance measures indicating the estimated measure of performance for the environment corresponding to the change in the configuration of the environment. After providing the data indicating the estimated performance measures, the computers receive data indicating user input confirming the request to change the configuration of the environment, and perform the requested change in the configuration of the computing environment.

In some implementations, receiving the request from the user to change a configuration of the computing environment includes receiving an input instructing the one or more computers to copy or move one or more objects from a first computing environment to a second computing environment.

In some implementations, receiving the request from the user to change a configuration of the computing environment includes: receiving an indication that a drag and drop operation has been executed, in which one or more respective representations of the one or more objects are dragged from a representation of the first computing environment and dropped to a representation of the second computing environment in the drag and drop operation, or receiving an indication that a copy and paste operation has been executed, one or more respective representations of the one or more objects being copied from a representation of the first computing environment and placed a representation of the second computing environment in the copy and paste operation.

In some implementations, the first computing environment is a first computing environment provided by a first server system and the second computing environment is a second computing environment provided by a second server system, wherein the second server system is different from the first server system.

In some implementations, the operations further include determining one or more assets associated with the one or more objects, and executing migration of the one or more objects from the first computing environment to the second computing environment, the migration of the one or more objects form the first computing environment to the second computing environment including configuring the one or more assets associated with the one or more objects for the second computing environment.

In some implementations, the one or more assets associated with the one or more objects includes one or more of: a metadata model associated with the object, data indicative of users associated with the object, data structures associated with the object, and data sources associated with object.

In some implementations, configuring the one or more assets associated with the one or more objects for the second computing environment includes: copying the one or more assets from the first computing environment to the second computing environment, or reconfiguring the one or more assets to operate in the second computing environment.

In some implementations, the operations further include one or more of: determining a category or subcategory of the object, determining a file type of the object, determining a programming language used to program the object, and determining an identification feature of the object.

In some implementations, the operations further include generating an alert based on the estimated performance measure of the computing environment corresponding to the second computing environment, the alert including: a first alert indicating: (i) that the computing environment corresponding to the second computing environment is predicted to be impacted negatively by the object migration by less than a threshold amount, and (ii) a proceed with caution message indicating that a user should proceed with the object migration with caution, a second alert indicating that: (i) the computing environment corresponding to the second computing environment is predicted to be impacted negatively by the object migration by more than a threshold amount, and (ii) the object cannot be migrated without system administrator approval, or a third alert indicating that: (i) the computing environment corresponding to the second computing environment is predicted to be harmed by the object migration, and (ii) the object migration cannot be completed, and transmitting the alert to a user device.

In some implementations, the one or more objects include a server-hosted application, determining one or more assets associated with the one or more objects includes determining users, application settings, data source connections, and object definitions associated with the server-hosted application, and executing migration includes migrating the determined users, application settings, data source connections, and object definitions associated with the server-hosted application to the second computing environment.

In some implementations, the estimated performance measure includes data indicative of one or more of a response time of the object, a reliability of the second computing environment, data processing speed of the second computing environment, data processing capacity of the second computing environment, available storage in the second computing environment, user capacity of the second computing environment, security status of the second computing environment, and network connectivity of the second computing environment.

In some implementations, another aspect of the disclosed subject matter includes a computer-readable storage medium storing instructions executable by one or more computers which, upon such execution, cause the one or more computers to perform operations including: receiving, by the one or more computers, a request from a user to change a configuration of a computing environment provided by one or more servers, in response to receiving the request and before performing the requested change in the configuration of the environment: determining, by the one or more computers, an estimated measure of performance that represents a level of performance of the computing environment if changed according to the request, and providing, by the one or more computers, data indicating performance measures indicating the estimated measure of performance for the environment corresponding to the change in the configuration of the environment. After providing the data indicating the estimated performance measures, the one or more computers receive data indicating user input confirming the request to change the configuration of the environment, and perform the requested change in the configuration of the computing environment.

In some implementations, receiving the request from the user to change a configuration of the environment provided by the one or more servers includes receiving an input to copy or move one or more objects from a first computing environment to a second computing environment.

In some implementations, receiving the request from the user to change a configuration of the environment provided by the one or more servers includes: receiving an indication that a drag and drop operation has been executed, one or more respective representations of the one or more objects dragged from a representation of the first computing environment and dropped to a representation of the second computing environment in the drag and drop operation, or receiving an indication that a copy and paste operation has been executed, one or more respective representations of the one or more objects being copied from a representation of the first computing environment and placed a representation of the second computing environment in the copy and paste operation.

In some implementations, the first computing environment is a first computing environment provided by a first server system and the second computing environment is a second computing environment provided by a second server system, wherein the second server system is different from the first server system.

In some implementations, the operations further include determining one or more assets associated with the one or more objects, and executing migration of the one or more objects from the first computing environment to the second computing environment, the migration of the one or more objects form the first computing environment to the second computing environment including configuring the one or more assets associated with the one or more objects for the second computing environment.

In some implementations, the one or more assets associated with the one or more objects includes one or more of: a metadata model associated with the one or more objects, data indicative of users associated with the one or more objects, data structures associated with the one or more objects, and data sources associated with the one or more objects.

In some implementations, another aspect of the disclosed subject matter includes a system that includes one or more computers and one or more storage devices storing instructions that upon execution by the one or more computers, cause the one or more computers to perform operations. The operations include receiving, by the one or more computers, a request from a user to change a configuration of a computing environment provided by one or more servers, in response to receiving the request and before performing the requested change in the configuration of the environment: determining, by the one or more computers, an estimated measure of performance that represents a level of performance of the computing environment if changed according to the request, and providing, by the one or more computers, data indicating performance measures indicating the estimated measure of performance for the environment corresponding to the change in the configuration of the environment. After providing the data indicating the estimated performance measures, the one or more computers receive data indicating user input confirming the request to change the configuration of the environment, and perform the requested change in the configuration of the computing environment.

In some implementations, receiving the request from the user to change a configuration of the environment provided by the one or more servers includes receiving an input to copy or move one or more objects from a first computing environment to a second computing environment.

In some implementations, the first computing environment is a first computing environment provided by a first server system and the second computing environment is a second computing environment provided by a second server system, wherein the second server system is different from the first server system.

In general, another aspect of the subject matter described in this specification may include a computer-implemented method including operations of receiving an input to copy or move one or more objects from a first computing environment to a second computing environment, determining one or more assets associated with the one or more objects, and determining a likely performance of an environment corresponding to the second computing environment when the one or more objects are to be copied or moved to the second computing environment. The likely performance of the environment corresponding to the second computing environment including a likely health score of the environment corresponding to the second computing environment. The operations further include providing data indicating performance measures indicating the likely performance of the environment corresponding to the second computing environment, receiving data indicating user input confirming the operation to copy or move the one or more objects from the first computing environment to the second computing environment after providing the data indicating the performance measures, and executing migration of the one or more objects from the first computing environment to the second computing environment. The migration of the one or more objects from the first computing environment to the second computing environment includes configuring the one or more assets associated with the one or more objects for the second computing environment.

In some implementations, the receiving the input to copy or move one or more objects from the first computing environment to the second computing environment includes receiving an indication that a drag and drop operation has been executed or receiving an indication that a copy and paste operation has been executed. In the drag and drop operation, the one or more respective representations of the one or more objects are dragged from a representation of the first computing environment and dropped to a representation of the second computing environment. In the copy and paste operation, one or more respective representations of the one or more objects are copied from a representation of the first computing environment and placed a representation of the second computing environment.

In some implementations, the one or more assets associated with the one or more objects include one or more of a metadata model associated with the object, data indicative of users associated with the object, data structures associated with the object, and data sources associated with object.

In some implementations, the operations further include one or more of determining a category or subcategory of the object; determining a file type of the object; determining a programming language used to program the object; and determining an identification feature of the object.

In some implementations, the likely health score of the second environment includes data indicative of one or more of a response time of the object, a reliability of the second environment, data processing speed of the second environment, data processing capacity of the second environment, available storage in the second environment, user capacity of the second environment, security status and indicators of the second environment, and network connectivity and performance of the second environment.

In some implementations, the operations further include generating an alert based on the determined likely performance of the environment corresponding to the second computing environment and transmitting the alert to a user device. The alert includes one of: a first alert indicating: (i) that the environment corresponding to the second computing environment is predicted to be impacted negatively by the object migration by less than a threshold amount, and (ii) a proceed with caution message indicating that a user should proceed with the object migration with caution; a second alert indicating that: (i) the environment corresponding to the second computing environment is predicted to be impacted negatively by the object migration by more than a threshold amount, and (ii) the object cannot be migrated without system administrator approval; and a third alert indicating that: (i) the environment corresponding to the second computing environment is predicted to be harmed by the object migration, and (ii) the object migration cannot be completed.

In some implementations, the configuring of the one or more assets associated with the one or more objects for the second computing environment includes copying the one or more assets from the first computing environment to the second computing environment, or reconfiguring the one or more assets to operate in the second computing environment.

In some implementations, the one or more objects comprise a server-hosted application. The determining one or more assets associated with the one or more objects includes determining users, application settings, data source connections, and object definitions associated with the server-hosted application. The executing migration includes migrating the determined users, application settings, data source connections, and object definitions associated with the server-hosted application to the second computing environment.

Other features may include corresponding systems, apparatus, and computer programs encoded on computer storage devices configured to perform the foregoing actions.

The subject matter described in this specification can be implemented in particular embodiments so as to realize one or more of the following advantages. The disclosed techniques can provide real-time and historical trend data on performance metrics for a system migration by using benchmarks for the current system and projecting performance for the migrated system with known characteristics of the migrated system. The method provides users with a snapshot of the estimated performance of a migrated system and allows users to make informed decisions regarding their computing needs and to effectively manage their resources. The techniques can improve the reliability of computer systems by anticipating potential errors or decreases in responsiveness. For example, the system can monitor the number of users assigned to a server, the storage space available for the server, and other factors, and determine when available resources are insufficient to maintain a particular level of performance (e.g., responsiveness or throughput) for the expected demand.

The disclosed method allows users to customize performance reports and focus computing resources on monitoring resources that are crucial for a specific use case. When available computing resources are not sufficient for the enterprise, newly generated environments can be established by the system. For example, the system allows a user to migrate data and tasks to different environments, including existing environments or environments that are created by the system. This migration can be done at a fine-grained level, allowing the system to migrate specific applications, documents, or data to be served by a specific environment. The system also enables users to specific users, or specific groups of users, to be served by particular server environments, allowing computing resources to be managed more efficiently. For example, users with high demands on the server can be assigned to specific servers or environments within the enterprise computing system to avoid impacting other users. As another example, the system can dedicate specific resources to certain prioritized users or departments in an organization to ensure that a high level of performance is consistently available, regardless of other demands on the computing system.

The details of one or more implementations are set forth in the accompanying drawings and the description below. Other potential features and advantages will become apparent from the description, the drawings, and the claims.

BRIEF DESCRIPTION OF THE DRAWINGS

FIG. 11 is an exemplary illustration of system performance alerts.

FIG. 13 is an exemplary illustration of a multi-application status indicator.

FIG. 18 is an exemplary illustration of GUI providing information regarding computers in a cloud-based environment.

FIG. 19 is an exemplary illustration of an operation to fence users.

FIG. 21 is an exemplary illustration of an operation to fence users.

In the drawings, like reference numbers represent corresponding parts throughout.

DETAILED DESCRIPTION

Figure 1A:
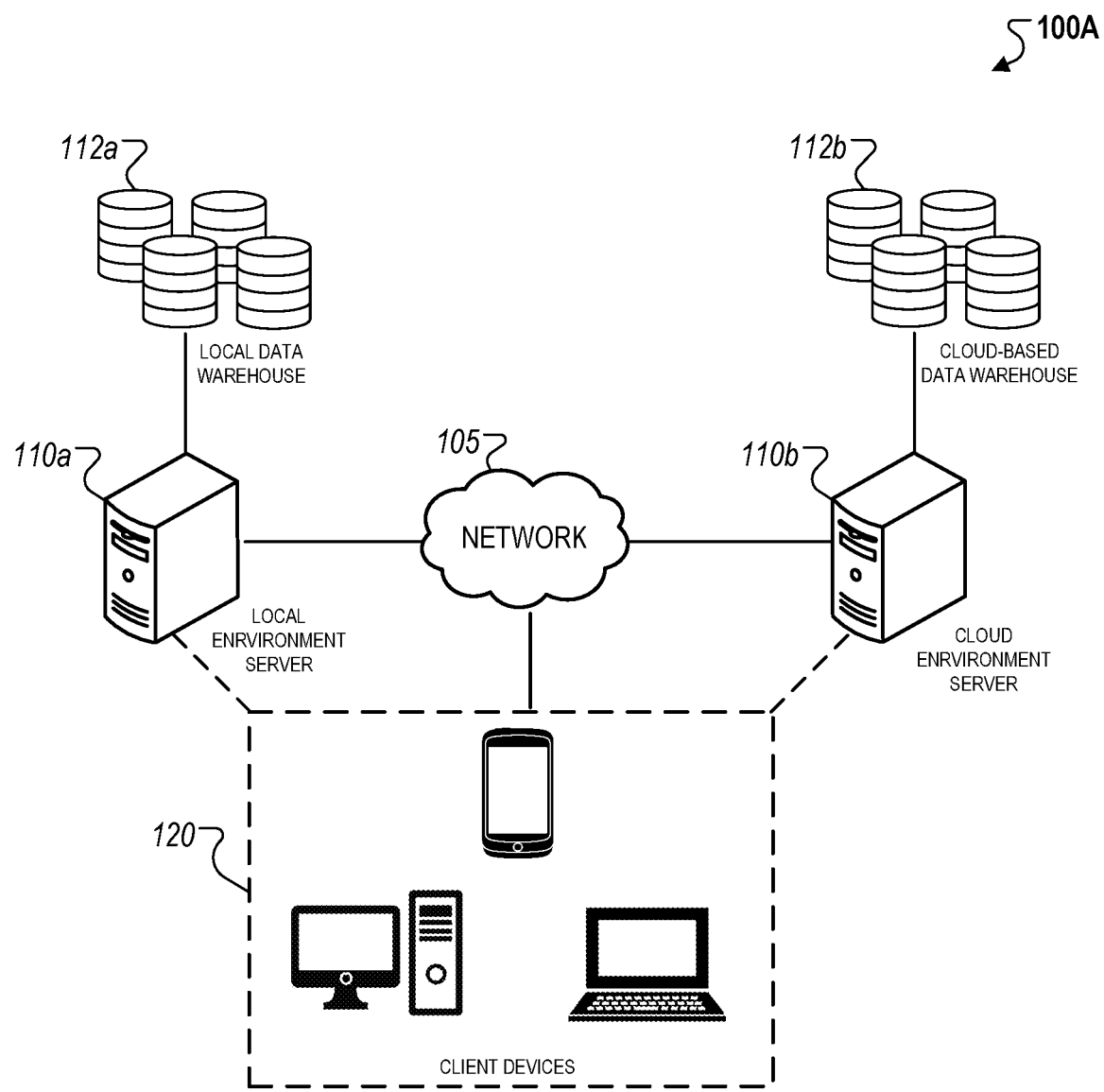
FIG. 1A is a diagram that illustrates an example of an enterprise computing system with different server environments.

In general, this specification describes enterprise computing systems, and methods for generating upgraded versions of software for enterprise applications that can be accessed concurrently with prior versions of the enterprise applications. As described throughout, "enterprise applications" refer to types of computer software used to fulfill business needs of organizations such as businesses, schools, interest-based user groups, governments, and the like. Often, these applications rely on large databases and serve data to tens, hundreds, or thousands of users in an organization. An "upgraded version" refers to updates to enterprise applications that are made available to individuals, and capable of being used with minimal user input from the individual (e.g., a single user input provided on a user interface).

In the enterprise analytics space, performing upgrades can be a long, complex, costly, and sometimes risky endeavor.

Customers often invest large resources of funds and manpower to develop customized applications using an analytics platform, and an upgrade may have an unknown impact. System administrators may want to know that the upgrade will not cause unforeseen downtime, failures in the generation of reports, slowness, or security holes, or security breaches. There are usually many changes requires to make an enterprise-class upgrade, such as adjusting object definitions, data source connections, object dependencies, adjusting settings or customizations, setting appropriate security permissions and policies. Further, many upgrades or alterations are made on top of the prior version, which overwrites some or all of the prior software and renders the prior version unavailable for use.

Rather than requiring customers to expend significant effort to carry out an upgrade and test the upgraded version, a new, upgraded version can be automatically be generated and tested for the user without the user initiating or requesting the upgrade. The new version can be customized according to characteristics of the previous version, and can be tested using the same data, applications, and usage patterns for the previous version. This can involve profiling the usage of the previous version and determining performance measures. Then, a separate upgraded version of the software can be created to mimic the production environment of the prior version but to include the updates and enhancements of the upgraded version. The upgraded version exists and operates independently of the prior version, which runs alongside the upgraded version without being changed. Thus, rather than overwriting or modifying the previous version, the upgraded version is created as an additional environment that can be accessed while the prior version is still available.

In addition, the upgraded version can be tested and profiled to show the actual performance of the upgraded version, without the system administrator initiating tests or upgrades. For example, the upgrade process may replay, on the upgraded version of the software, different load scenarios that mimic the current or previous usage of the prior version. The testing may involve recreating or repeating actual requests or actions from users to the prior version, on the upgraded version. This can allow a direct comparison of actual measured performance characteristics, rather than extrapolated or estimated measures. Similarly, the testing may use the same data, reports, documents, databases, and dashboards that the prior version is using. The administrator can be give a system health check advisory for the upgraded version to show the actual impact that would occur from using the upgraded version which has already been created.

As a result, without any action on the part of the administrator, the system provides the administrator a new, ready-to-use upgraded environment as well as data indicating the impact of the new version on the administrator's systems. The testing data indicates as it pertains to the organization's own usage (e.g., actual data, applications, and usage patterns). In fact, environments supported by an organizations own servers, the testing and deployment of the upgraded version can be actually deployed on those servers so that testing reflects the particular constraints and network characteristics of the organization's servers. The personalized testing information is more meaningful because it represents the organization's own data, with actions re-played with production workloads. In some implementations, the testing involves running all of the organizations reports, allowing the administrator to see where they pass off early, where they were faster or slower, and impacts to system reliability is up.

The upgraded version can be made available for immediate use by the organization. For example, within an interface describing the existing or prior version of the software, an option can be provided to transfer workloads for users or applications, in whole or in part, to the upgraded environment, while the prior version runs or is available concurrently. The upgraded version can be stored on an organization's own computer systems, or on one or more server systems such as a cloud computing environment, or both.

Various types of individuals can use enterprise applications within an enterprise computing system. Two particular examples include "system administrators" that maintain the operation and configuration of enterprise applications within the enterprise computing system, and "end-users" that use the enterprise applications to receive a set of business services. Examples of such business services provided can include online payment processing, interactive product catalogues, automated billing systems, security, enterprise content management, information technology (IT) service management, resource integration, customer relationship management, enterprise resource planning, business intelligence, project management, collaboration, or human resource management.

The enterprise applications can be periodically upgraded to improve the quality of business services provided to the end-user. As used throughout, an "upgrade" refers to a general replacement or supplement of software or firmware to a newer version in order to improve performance, compatibility, and/or other application characteristics. For example, a software upgrade for enterprise applications can be used to increase the maximum number of active users that can concurrently use the software, reduce the number of software failures or the time between consecutive software failures, reduce response time for loading resource-intensive documents, among other types of enhancements.

The enterprise applications can be configured and operated on client devices using a variety types of server environments. A "server environment" refers to a client-server application framework that can be used to exchange application content, data, and/or other information that is necessary to provide business services through the enterprise applications. In one example, a server environment can be provided by servers that are owned or managed by the organization that they serve. For example, these may be "on-premises" servers which may be co-housed or co-located within a particular location associated with an organization. In another example, a server environment can include one or more cloud-based servers that are managed and maintained by a third party, for example, at a location separate from offices of the organization. The cloud-based server is generally connected to a network and remotely accessed by one or more computers over a network connection. In some implementations, as described more particularly below, multiple different server environments can be used within a system to exchange data from a set of distributed data sources.

Each server environment can store application data used to configure and operate enterprise applications on client devices associated within each server environment. As an example, the application data can include raw data stored on a data warehouse that is aggregated and visualized through business intelligence enterprise applications. Each server environment can also store data that is used to migrate various application components of the enterprise applications between different server environments. For example, such data can include required resources for content transfer between different environments, types of data that are migrated (e.g., metadata, object definitions, data source connections, object dependencies), resources or information associated with data to be migrated (e.g., user lists, user groups, directories, etc.), or configurations associated with data to be migrated (e.g., security settings, notifications, user-specified settings, etc.).

FIG. 1A is a diagram that illustrates an example of an enterprise computing system 100A with different environment servers. In the example, the system 100A includes a local environment server 110a and a cloud environment server 110b, each with respective data warehouses, data warehouse 112a and 112b. The system 100A also includes client devices 120 connected to the servers 110a and 110b over the network 105.

The local environment server 110a can be one or more computing devices that are managed by the organization. These may be located in a particular location associated with an organization (e.g., corporate office, database storage facility, etc.). The local environment server 110a can also be accessed by an on-site system administrator or another authorized user, for example, directly or over a network connection. For example, the local environment server 110a can be co-housed within a particular location such that the authorized users can access data stored on the data warehouse 112a by using a computing terminal that is associated with the local environment server 110a.

The data warehouse 112a may be one or more enterprise data warehouses (EDWs) used for reporting and data analysis of stored information. For instance, the data warehouse 112a can be central repositories of integrated data that are retrieved from multiple data sources. As an example, the data stored within the data warehouse 112a can include current and historical data used for creating business intelligence analytical reports such as annual or quarterly comparisons and trends of sales performance. In other examples, the data stored within the data warehouse 112a can include financial information related to an organization's fiscal year performance (e.g., price-to-earnings, market share penetration, etc.).

The cloud-based environment server 112b can be one or more network-enabled remote computing devices that provide a system administrator with access to data stored on the cloud-based data warehouse 112b over the network 105. As an example, the cloud-based environment server 112 may be operated by a third-party provider and can be used by an organization to access to data stored on third-party data centers that are remotely located from the local premises of the organization. In this example, users of the organization can use front-end cloud client software associated with the cloud-based environment server 110b to interact with data stored the data warehouse 112b.

The cloud-based data warehouse 112b can be a set of one or more databases that remotely store information, content, and/or other types of data that are utilized to configure, operate, and/or update enterprise applications that operate within the cloud server environment 110b. For instance, like the local data warehouse 112a, the cloud-based data warehouse 112b can store raw data to be aggregated and visualized on interfaces associated with the enterprise applications, or a set of configuration files used to execute the enterprise applications on the client devices 120.

The client devices 120 can be electronic computing devices that exchange data communications with one or more of the local server environment 110a or the cloud-based server environment 110b over the network 105 in order to operate enterprise applications on the client devices 120. For instance, the client devices 120 can include one or more of a laptop computing device, a desktop computing device, a tablet computer, a PDA device, or other electronic devices.

In some implementations, the client devices 120 can be associated with subscription services associated with enterprise applications configured and operated by the server environments 110a and 110b. In such implementations, the subscription services can be purchased by the end-users of the client devices 120 and data associated with the subscription services (e.g., purchased data reports) can be transmitted to the client devices 120 over the network 105 using enterprise applications as described previously.

Figure 1B:
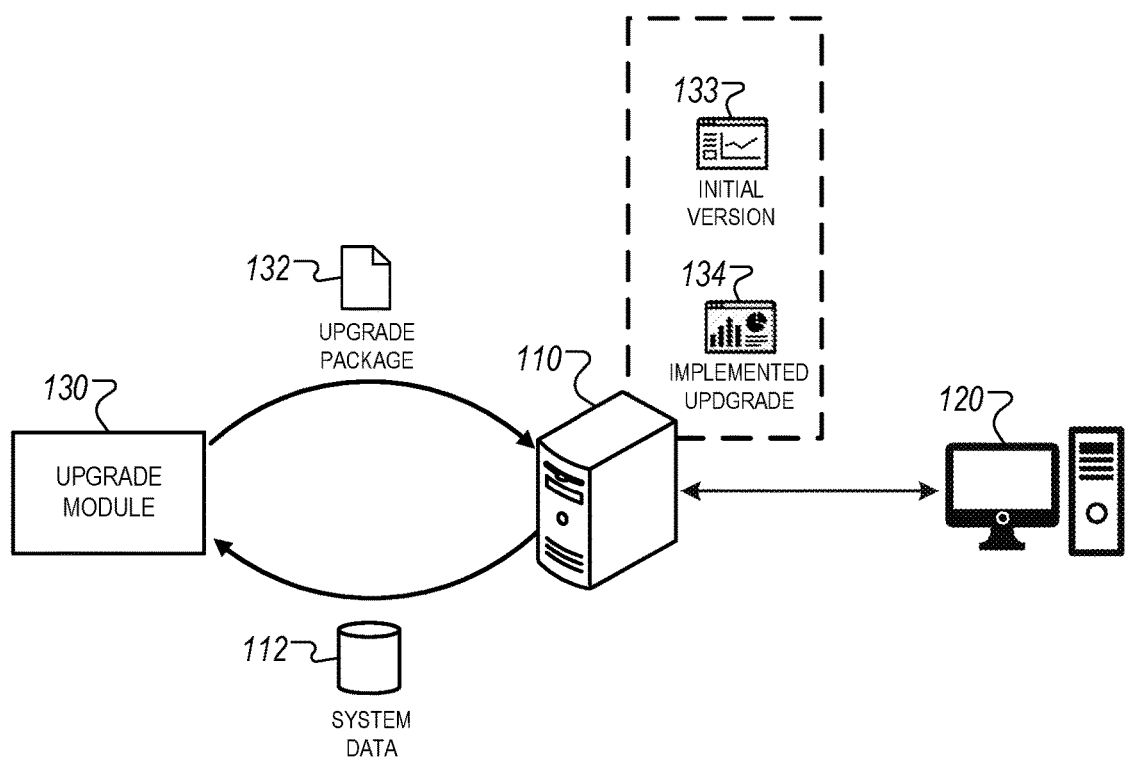
FIG. 1B is a diagram that illustrates an example of a technique used to allow access to upgraded software by client devices of enterprise computing systems.

FIG. 1B is a diagram that illustrates an example of a technique used to allow access to upgraded software by client devices of enterprise computing systems. Initially, the server environment 110 includes an initial version 133 of software. An upgrade module 130 receives system data 112 from the server environment 110, showing usage data indicating how the initial version 133 has been used. The upgrade module 130 creates an upgraded version 134 of the software and generates an upgrade package 132 to indicate characteristics of the upgraded version 134 based on the system data 112. The environment server 110 can then be used to automatically provide access to the implemented software upgrade 134 by the client device 120.

In more detail, the upgrade module 130 can be a software component of the enterprise computing system 100A that is used to process system data 112 and generate a potential software upgrade. In some implementations, the upgrade module 130 can be stored on the environment servers 110a and 110b and operated in parallel with processes required provide business services associated with enterprise applications associated with the system 100A to the client devices 120. For example, the upgrade module 130 can be operated during time periods of low usage such that resource allocation for upgrade processes does not substantially impact the processes required to provide business services associated with the enterprise applications.

In some implementations, the upgrade module 130 can be stored on another environment server within the system 100A, other than the environment servers 110a and 110b, that does not execute processes necessary to configure and operate the enterprise applications on the client devices 120. In such implementations, the additional environment server can be specifically tasked with executing upgrade-related processes such that generation and performance testing of the upgrade does not consume resources allocated to the normal operations of the environment servers 110a and 110b.

In other implementations, the upgrade module 130 can be operated on a virtual machine environment in addition to the environment servers 110a and 110b to mitigate potential performance impacts resulting from upgrade processes. In such implementations, instead of carrying out the upgrade processes on either the environment servers 110a and 110b, the virtual machine environment can instead periodically retrieve data from the warehouses 112a and 112b in order to generate an applicable upgrade. After generating an upgrade for the initial version 133, the upgrade module 130 then transmits the upgrade package 132 to the environment servers 110a and 110b for display to an administrator.

The upgrade module 130 can generate upgraded version for enterprise software automatically, without user input indicating a specific need for an upgrade. For instance, in some implementations, a manufacturer of enterprise software provides an upgraded version of the enterprise software when one is ready, and the upgrade module 130 processes the upgraded version and make it available to the server environment 110 using the upgrade package 132. In other implementations, the upgrade module 130 can be run as background processes for the environment servers 110a and 110b that continuously monitor data generated by the system 100A and is capable of automatically detecting potential performance lapses that can be corrected through an upgrade such as a software patch. For example, the upgrade module 130 can be capable of parsing through user-submitted bug reports, system-generated error logs, or entries within historical usage logs, and identify potential upgrades that lead to performance enhancements.

In response, the upgrade module 130 can then initiate a set of computer-implemented procedures that generate a potential upgrade that adjusts one or more application components of the enterprise applications that specifically impact performance.

The upgrade package 132 includes relevant information associated with the upgraded version gathered by the upgrade module 130 (e.g., results comparing the performance of the upgraded version 134 and the prior version 133 within a particular environment, performance forecasts for the upgrade, potential system risks resulting from using the upgraded version 134, relative improvements resulting from the upgraded version 134, etc.). The upgrade package 132 also includes access to the upgrade. For example, as described more particularly with respect to FIGS. 3A-3C, the upgrade package 132 can be presented to an administrator of the system 100A as an interface element that allows the administrator to view relevant information and provide an input (e.g., a mouse click) to provide access to the upgraded version 134 by one or more users at their respective client devices.

Once a system administrator provides an input to allow access to the upgraded version 134, the environment server 110 provides access to the upgrade within one or more environments of the system 100A and the implemented upgrade 134 is then provided to the client device 120. As an example, the implemented upgrade 134 can include an additional feature that enables an end-user to create new data visualizations not included in the prior version of the enterprise applications. In this example, once the upgrade has been implemented within the system 100A and determined to be stable, the end-user receives an upgrade notification indicating the additional feature when a new instance of the enterprise applications is started on the client device 120.

Figure 2:
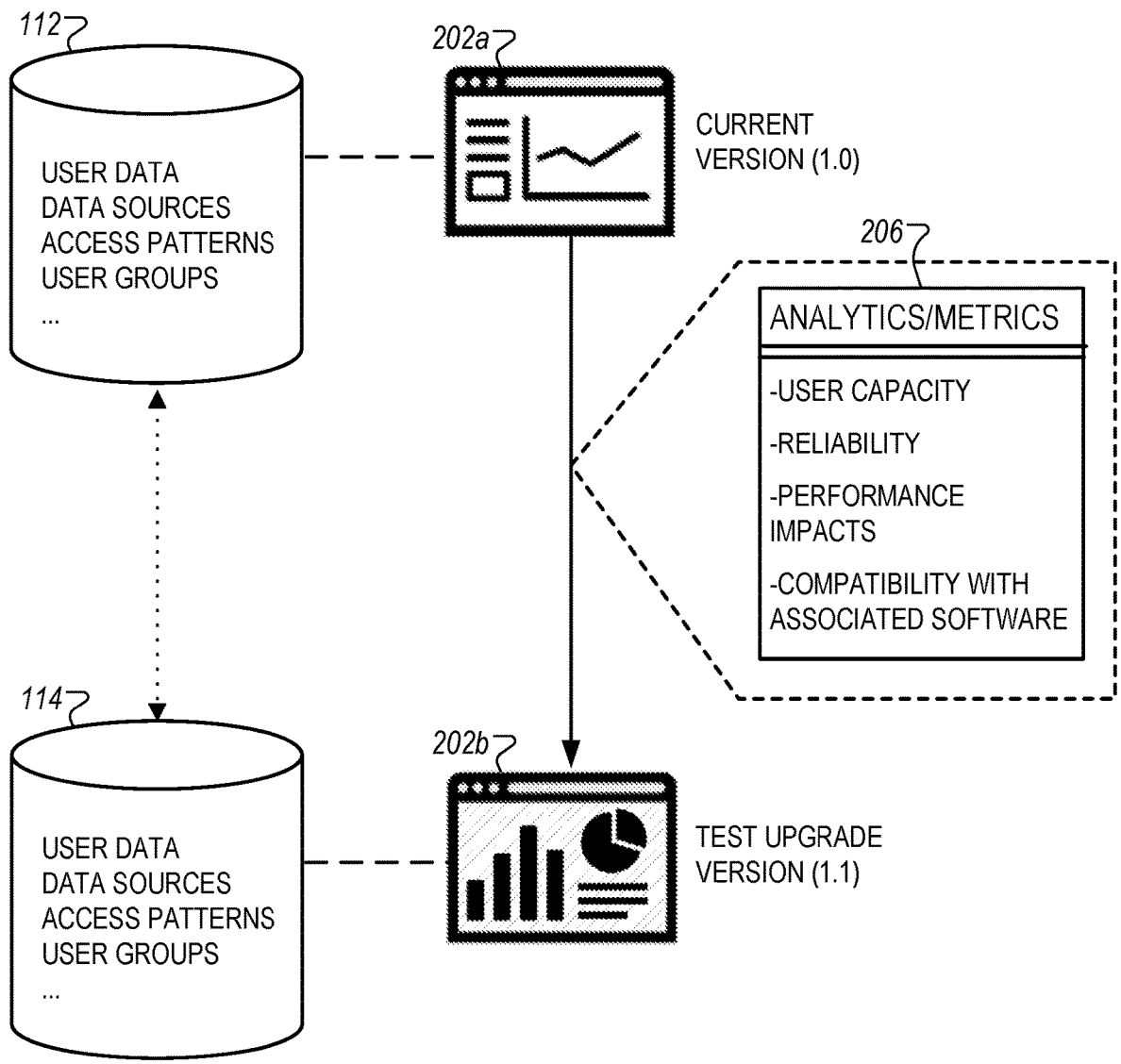
FIG. 2 is a diagram that illustrates examples of data and metrics used to generate upgraded versions of software for enterprise computing systems.

FIG. 2 is a diagram that illustrates examples of data and metrics used to generate upgraded versions of software for enterprise applications. As depicted, a current version 202a of an enterprise application can be associated with system data 112 as described previously. An upgraded version 202b for the enterprise applications can be generated using a set of upgrade metrics 206 and associated with system data 114. In some instances, the process of generating the upgraded version 202b can be performed by the upgrade module 130 as described previously with respect to FIG. 1B.

In some examples, the process of generating the upgraded version 202b can include running an initial performance test, or a baseline performance test, on the current version 202a of the enterprise application or other software. The results of this initial performance test can be used to establish a baseline of performance against which performance of the upgraded or new version 202b can be compared.

Specifically, the system data 112 can include various types of information that is used to configure and operate the enterprise applications on the client device 120. In the example depicted in FIG. 2, the system data 112 can include user data stored in the data warehouses 112a and 112b, data sources within the warehouses 112a and 112b that include stored data, patterns of database access queries specifying tables or columns of interest, or groups of users that use the enterprise applications. The system data 112 is also previously assigned to the current version 202a in prior instances based on configuration files for the enterprise applications.

The system data 114 can be a copy of the system data 112 for the initial version. This system data 114 is used to generate the upgraded version 202b that is a complete and separate instance of the enterprise applications that can be run alongside the current version 202a. For instance, as described previously, the upgrade module 130 can initially determine the contents of the system data 112 based on accessing data logs associated with prior instances of the current version 202a, generating a copy of the system data 112 as the system data 114, and utilizing the system data 114 to generate and configure the upgraded version 202b. In such an instance, because the upgraded version 202b is not dependent on the same data files as the current version 202a (e.g., the system data 112), an administrator that is provided access to the upgraded version can choose to use the upgraded version without any significant impact to the current operation to the current version 202a. This enables individual evaluation of upgrades without necessarily risking the operability of the prior version of the enterprise applications after migrating to a new upgraded version.

The set of upgrade metrics 206 can include performance parameters that are used to measure the performance of the upgraded version 202b with data that is predetermined to be assigned to the current version 202a (e.g., the system data 112), and provide an evaluation, to the administrator, of how well the upgraded version 202b performs relative to the current version 202a. In the example depicted in FIG. 2, the list of metrics 206 includes a maximum number of users that the enterprise applications can accommodate, a reliability score associated with operation of the software, performance impacts resulting from an upgrade implementation, and compatibility between the upgraded version of the enterprise applications and the other associated application components (e.g., data sources used to retrieve data to be visualized in a report, other enterprise applications used to import data from or export data to, etc.). As described more particularly with respect to FIG. 3B, the set of upgrade metrics 206 can be used to provide a benefits summary that indicates potential improvements from using an upgraded version of software (e.g., an actual existing installation of the upgraded software that has been prepared and is ready for use).

Figure 3A:
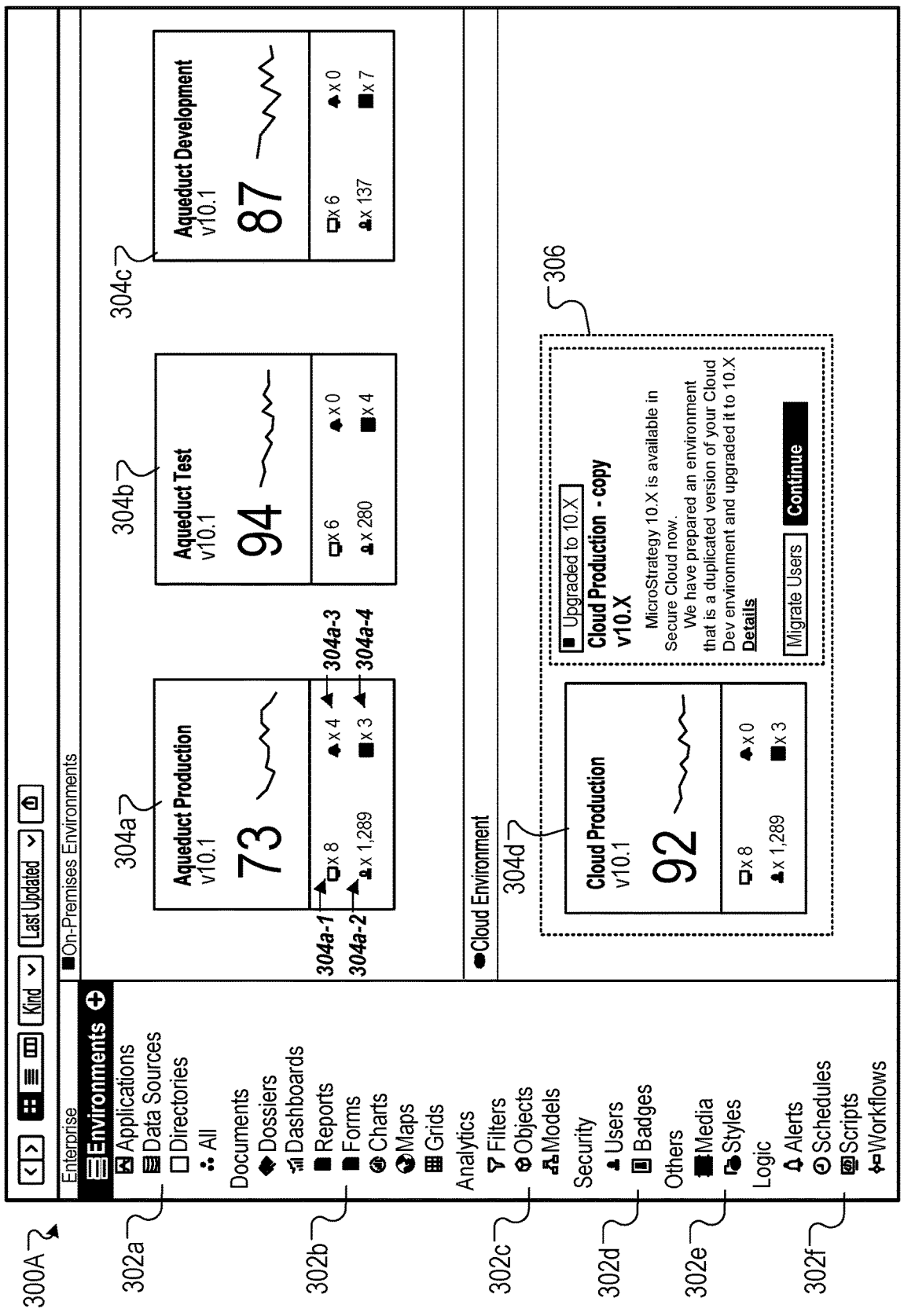
FIGS. 3A-3C are diagrams that illustrate examples of user interfaces for accessing upgraded versions of software on an enterprise computing system.
Figure 3B:
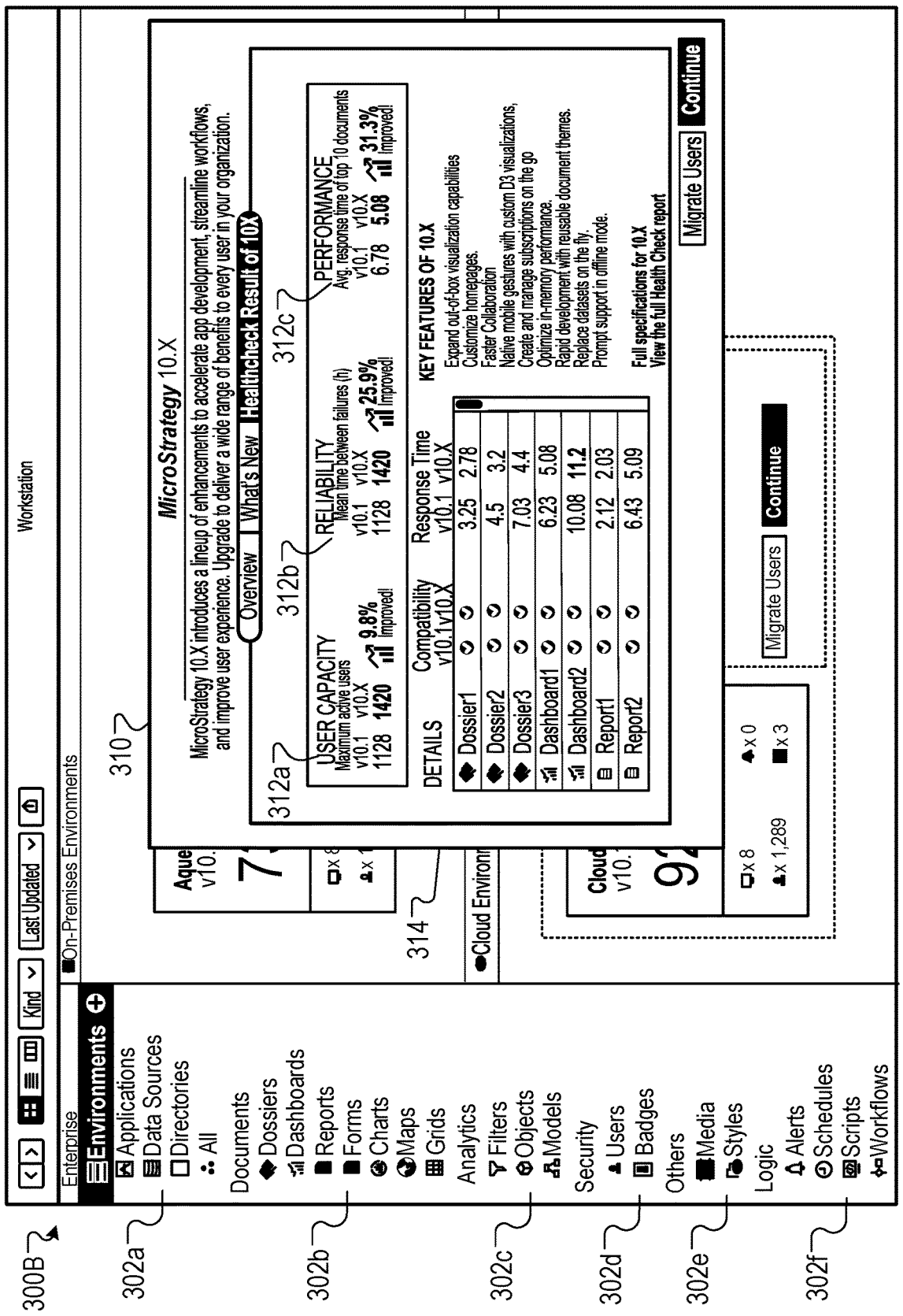
Figure 3C:
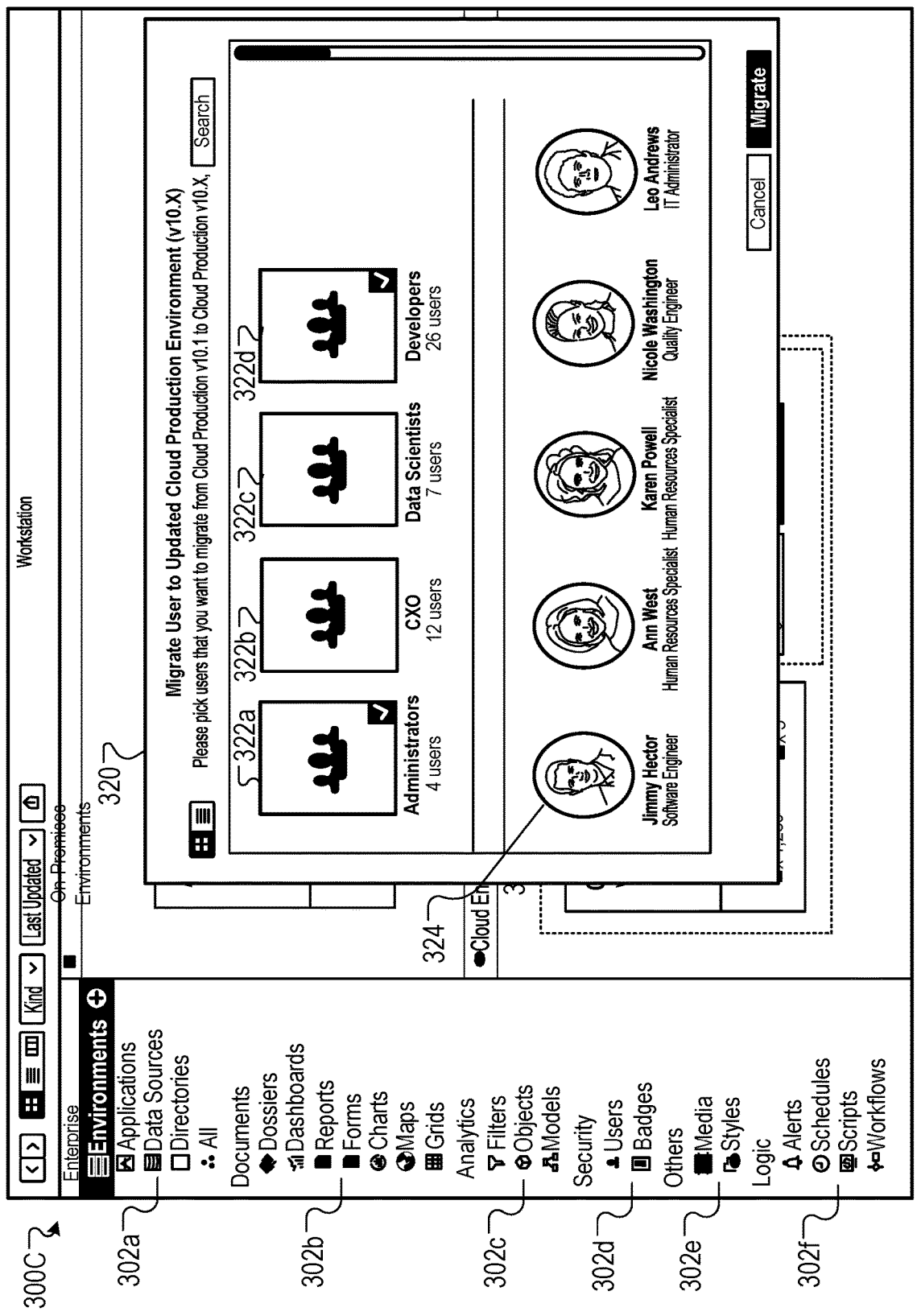

FIGS. 3A-3C are diagrams that illustrate examples of user interfaces 300A-300C for accessing or making available upgraded versions of software on an enterprise computing system. FIG. 3A depicts an interface 300A where an administrator can be presented with an upgrade notification 306. FIG. 3B depicts an interface 300B where the administrator can be presented with an upgrade benefits summary 310. FIG. 3C depicts an interface 300C where the administrator can be presented with an upgrade user migration list 320.

In general, the interfaces 300A-300C can be user interfaces associated with an administrator portal that are presented on authorized devices associated system administrators of the system 100A. The administrator portal can be used by the system administrators to adjust the configuration and operation of different environments that can individually or collectively impact the enterprise applications. For instance, the different environments can be used coordinate data aggregation from distributed data sources that are each configured by an individual environment.

The interfaces 300A-300C also include a navigation pane that enables the administrator to navigate to different interface screens associated with the administrator portal. For example, the interface elements 302a enable the administrator to access enterprise-related pages such as a list of environments (as depicted in FIG. 3A), enterprise applications that can be configured, data sources that store data to be used by the enterprise applications, or user directories that provide access and privilege settings associated for each user.

The interface elements 302b enable the administrator to navigate through different application content that is generated by the enterprise applications for retrieved data from the data sources. For example, the administrator can access dossiers that provide a collection of documents related to a particular end-user, a particular enterprise application, or a particular data source. The administrator can also access content provided to end-users such as dashboards, reports, forms, charts, maps, and grids that constructed by the enterprise applications based on the business services provided to users.

The interface elements 302c enable the administrator to access analytics features that can be used to identify patterns within raw data extracted from data sources. For example, the administrator can apply data filters to identify subsets of data that are important for a particular business service, view different data objects used to store or reference data (e.g., tables, indexes, stored procedures, sequences, etc.), and view different data models to that can be used to represent information for end-users on the enterprise application.

The interface elements 302d enable the administrator to adjust security settings associated with the enterprise applications. For example, the administrator can adjust read/write privileges for specific end-users within enterprise applications, and/or specify a set of badges that control access to specific features associated with the enterprise applications.

The interface elements 302e enable the administrator to customize the appearance of enterprise applications that are provided to the end-user. For example, the administrator can select content to be displayed on the enterprise applications and specify visual styles that adjust the appearance of the enterprise applications.

The interface elements 302f enable the administrator to configure processes related to particular enterprise applications. For example, the administrator can specify specific alerts to display to end-users, update schedules for individual enterprise applications, scripts to implement a set of computer-implemented processes in response to detecting specific application conditions, and/or workflows that specify a sequence of events or processes that take place after initiating an upgrade implementation.

Referring to FIG. 3A, the interface 300A includes interface elements 304a, 304b, 304c, and 304d that enable the administrator to view information, configure settings, and monitor the activity related to individual environments. In some instances, the interface 300A includes interface elements for each of the interface servers 110a and 110b as depicted in FIG. 1A. For instance, the interface elements 304a, 304b, and 304c can be associated with local environments such as the local environment server 110a, and interface element 304d can be associated with a cloud-based environment such as the cloud-based environment server 110b. In the examples depicted, the administrator can view specific information associated with each environment such as the number of servers (e.g., eight servers indicated by the interface element 304a-1), the number of end-users that receive business services (e.g., 1,289 end-users indicated by the interface element 304a-2), the number of notifications (e.g., four notifications indicated by the interface element 304a-3), and the number of currently operating enterprise applications (e.g., three applications indicated by the interface element 304a-4).

The interface 300A can additionally display the upgrade notification 306 after an applicable upgrade has been generated for a particular environment. In the example, an upgrade is generated for the "Cloud Production" environment represented by interface element 304d, which is running version "10.1" of the software. The upgraded version is indicated as version "10.X." As depicted, the upgraded environment is presented as a separate instance from the existing installation of the prior software version "10.1," so that the administrator can choose to use a pre-configured upgraded version "10.X" without adversely impacting the configurability and compatibility of the prior version as described previously. The administrator can additionally view details related to the available upgrade as depicted within the interface element 306. An administrator can then provide a user input to access the upgrade (e.g., providing a click or other interaction with the "Continue" button), choose end-users to migrate with the upgrade, or view additional information by clicking the "Details" link.

Referring now to FIG. 3B, after clicking the "Details" link, the administrator can be directed to the upgrade benefits summary 310 displayed on the interface 300B. As depicted, the upgrade benefits summary 310 can include interface elements 312a, 312b and 312c that provide performance information that represents improvement of the upgraded version relative to the current version of the "Cloud Production" environment. In the examples depicted, the performance information indicates an increase in the number of maximum active end-users that can be supported (e.g., increase from 1128 to 1420 end-users), an increase in the mean time between failures (e.g., increase from 1128 hours to 1420 hours), and a decrease in the average response time required to load the top ten most resource intensive documents (e.g., decrease from 6.78 to 5.08 seconds). The administrator is also shown a percentage increase for each performance parameter (e.g., 9.8%, 25.9%, and 31.3%). As described previously, in each of these examples, the performance information for the upgraded version is calculated using actual user data that was previously determined to be associated with the current version (e.g., the system data 114 as a copy of the system data 112 as depicted in FIG. 2).

The performance information can be generated using samples of actual user tasks that were run previously, e.g., by executing scripts, generating reports, running database queries, and performing other actions that are indicated in a log of user actions. For example, the items "Dossier1," "Dossier2," and "Dossier3" can represent commonly accessed documents within the organization, and the performance data can indicate response times to load or generate a view of those documents. Similarly, the "Dashboard1" and "Dashboard2" can represent standardized or customized interactive user interfaces generated by the software, and the performance characteristics indicate response time to provide the interface or perform another action, such as filter a data set, create a graph, etc. and show the result. The "Report1" and "Report2" represent user-defined reports of the organization, e.g., tasks to collection information from one or more data sources and format it according to the specifications in the report. All of these example tasks can be selected from actual tasks that users in the organization perform. For example, they can represent recent or frequently accessed documents or views provided by the software, generated from the actual data sets of the organization. Each of these documents may include data access tasks (e.g., accessing data, searching, filtering, performing statistical analysis, etc.) and/or visualization tasks (e.g., generating charts, graphs, tables, spreadsheets, text, and other visualizations for display). The use of the organization's own documents and data can also demonstrate that compatibility has been achieved with the upgraded version, e.g., dependencies and data sources required by the tested documents or tasks are appropriately identified and accessed during the testing.

The upgrade benefits summary 310 can provide predicted performance reports based on benchmarks or known characteristics of certain system configurations. For example, there may be a standard or representative set of tasks that is run using the old version and the upgraded version, and the results of each can be compared. The predicted performance results may be adjusted to compensate for differences between the hardware platforms, based on experimentally determined adjustment factors. For example, scores can be scaled to adjust for different numbers of CPUs running different versions of the software and other differences.

In some instances, actual data from users determined to be users of the current version is used to perform performance tests. For example, performance tests can simulate or recreate on the upgraded version tasks previously performed on the earlier version. In some examples, data is selected from users who are determined to be frequent users of the current version of software (e.g., have used the system at least a threshold amount within a time period). Logs or other records of interactions of these users with the software and the tasks they performed are obtained. In some instances, an aggregate or average measure of usage for an organization or group of users is obtained. The same data or data sources that was used to carry out user tasks can also be used in performing performance and compatibility test. For example, the log may show that a user ran a particular report which derived a specific set of information from three different databases. In the performance and compatibility test, the system can check the ability of the upgraded system to access the files defining the particular report, as well as to retrieve the specific set of information from the three databases. The system can re-run the report, effectively performing the same task the user performed previously, but with the upgraded version instead of with the earlier version. Using the same task (e.g., running the same report) and the same data (e.g., the same data bases, or even the same data files) can ensure an accurate comparison of performance between the versions. Measures of performance (e.g., latency, total time to complete a task, CPU time or memory used, errors or retries, that occur, and so on) can be determined for the earlier version from the log data, and corresponding measures can be determined for the new version as the tasks are repeated with the new version.

The performance reports of the upgrade benefits summary 310 can include the results of performance tests. In some examples, the actual usage data is used to run a second performance test using the copy of the system that was generated. This second performance test provides performance data for the new version of the software using actual usage data. The usage data can include load characteristics, such as peak usage times, peak load, etc. The second performance test can be compared to the first, or baseline, performance test to determine a difference in performance between the current version of the software and the new version of the software.

In some examples, the upgrade benefits summary 310 provides snapshots of application performance before and after the upgrade. For example, the upgrade benefits summary 310 may provide the results of the first performance test and the results of the second performance test to the user.

In some examples, the upgrade process can include displaying additional recommendations for configuration changes. These additional recommendations may be provided within the upgrade benefits summary 310. The recommendations for configuration changes may be provided after the upgrade. The recommendations may include suggestions for additional configuration changes that will improve performance in areas that did not improve with the new version of software. The recommendations may include suggestions for additional configuration changes, such as increasing the amount of memory added in order to reduce application load times. For example, the recommendation may display text reading: "Because of the upgrade, you have twice the memory. If you increase the number of servers available, you will see further improvements to application execution time. Additionally, we see you are trying to increase the number of users in this particular environment. We recommend that you also delete the following files that are not being used by the environment, and have not been used in 74 weeks." The recommendation may include options for selecting portions of or accepting the recommendation. In some examples, the recommendations for configuration changes may be provided before the upgrade is executed, and a user may accept the suggestions or make changes to the upgrade before the new version of the software is generated. In some examples, the recommendation may be generated and provided independently from the upgrade process.

The upgrade benefits summary 310 can additionally include a list of details 314 that provides information for individual application content and components (e.g., dossiers, dashboards, reports) that are generated within specific enterprise applications. The upgrade benefits summary 310 provides a highly accurate representation of the projected performance because the actual user data previously determined to be associated with the current version is used.

Alternatively, or additionally, the upgrade benefits summary 310 can provide a customized report on the projected performance of the new version by using modified or projected usage patterns. For example, the upgrade benefits summary 310 may be configured to provide a prediction of the performance of the new version at double the current usage, or model predicted usage with a 50% increase in users.

In the examples depicted, the list of details 314 indicates that the upgraded version "10.X" is backwards compatible with each of the individual components depicted in FIG. 3B and differences in response times between the current version "10.1" and the upgraded version "10.X." As shown, with the exception of the response time for "Dashboard2," the response time for each individual application content is shorter for the upgraded version compared to the current version. As described previously with respect to the upgrade benefits summary 310, the response time measurements included within the list of details 314 is computed for the upgraded version based on testing the performance of the upgraded version using actual individual application content depicted. By providing compatibility information, the list of details 314 allows users of the systems being upgraded to discover conflicts and/or issues with the new version before committing to it. For example, issues with incorrect dependencies or missing files can be identified using the performance and compatibility tests, before for migrating users to the new version and before discontinuing access to the earlier version.

The upgrade benefits summary 310 can also provide high-level information for the upgraded version. For instance, as depicted in the example, the upgrade benefit summary 310 can include a list of key features that are either newly included within the upgraded version, or have been improved in the upgraded version compared to the current version. The administrator can also be provided with options to view "Full Specifications" for the upgraded version and/or view a "Full Health Check Report." In some instances, the "Full Specifications" and the "Health Check Report" are each included within the upgrade package 132 generated by the upgrade module 130 as discussed previously with respect to FIG. 1B.

Referring now to FIG. 3C, after viewing the upgrade benefits summary 310, the administrator can then click on an "Migrate Users" option and be redirected to the interface 300C. The interface 300C includes the upgrade user migration list 320, which enables the administrator to specify specific end-users to migrate the upgrade to after implementation. For instance, the interface 300C can include interface elements 322a, 322b, 322c, and 322d that include specific groups of users (e.g., administrators, CXO, data scientists, developers) or user avatars 324 that indicate individual users that are included within the selected user groups. This interface allows an administrator to selectively migrate specific users or groups of users to the new upgraded version.

In the example depicted, the administrator can select a specific subset of users (e.g., administrators and developers) such that the upgrade implementation is only migrated to a particular testing team that can then perform manual testing of the upgrade to verify the performance information included within the upgrade package 132. In this example, after implementing the upgrade, the upgraded version "10.X" is migrated only to the two identified groups, whereas the unselected groups that include end-users (e.g., CXO and data scientists) can use the initial version "10.1" without any interruptions to prior configuration. In this regard, the upgraded version and the prior version can be implemented and migrated in parallel to lead a more efficient transition process since both the initial and upgraded versions of the "Cloud Production" environment can be migrated into a real-time production environment without breaking the existing functionality of the initial version, which is used by end-users to receive business services.

This gradual or staged migration technique can be used as an intermediary testing environment that uses real production data (e.g., the system data 114) without potentially exposing risks to existing functionalities. Once the end-users that previously received the migrated upgraded version (e.g., administrators and developers) complete testing of the upgraded version, the user migration list 320 can be updated to include the remaining groups (e.g., CXO and data scientists) so that users are seamlessly transitioned to the upgraded version while minimizing potential adverse impact of the transition on business services received by these user groups.

In some implementations, the migration technique can be combined with individual and group-level security settings to provide different sets of privileges to access and modify the upgraded version after completing migration. For instance, administrators and developers, who are selected to receive the migration of the upgraded version, can be provided types of access based on security settings specified for each respective group. For example, administrators may have full access to view and modify different components of the test upgraded version, whereas the developers may only have limited privileges to modify source code associated with the different components. In this example, different levels of access can be further used to mitigate risks associated with an upgrade of an enterprise application.

Figure 4:
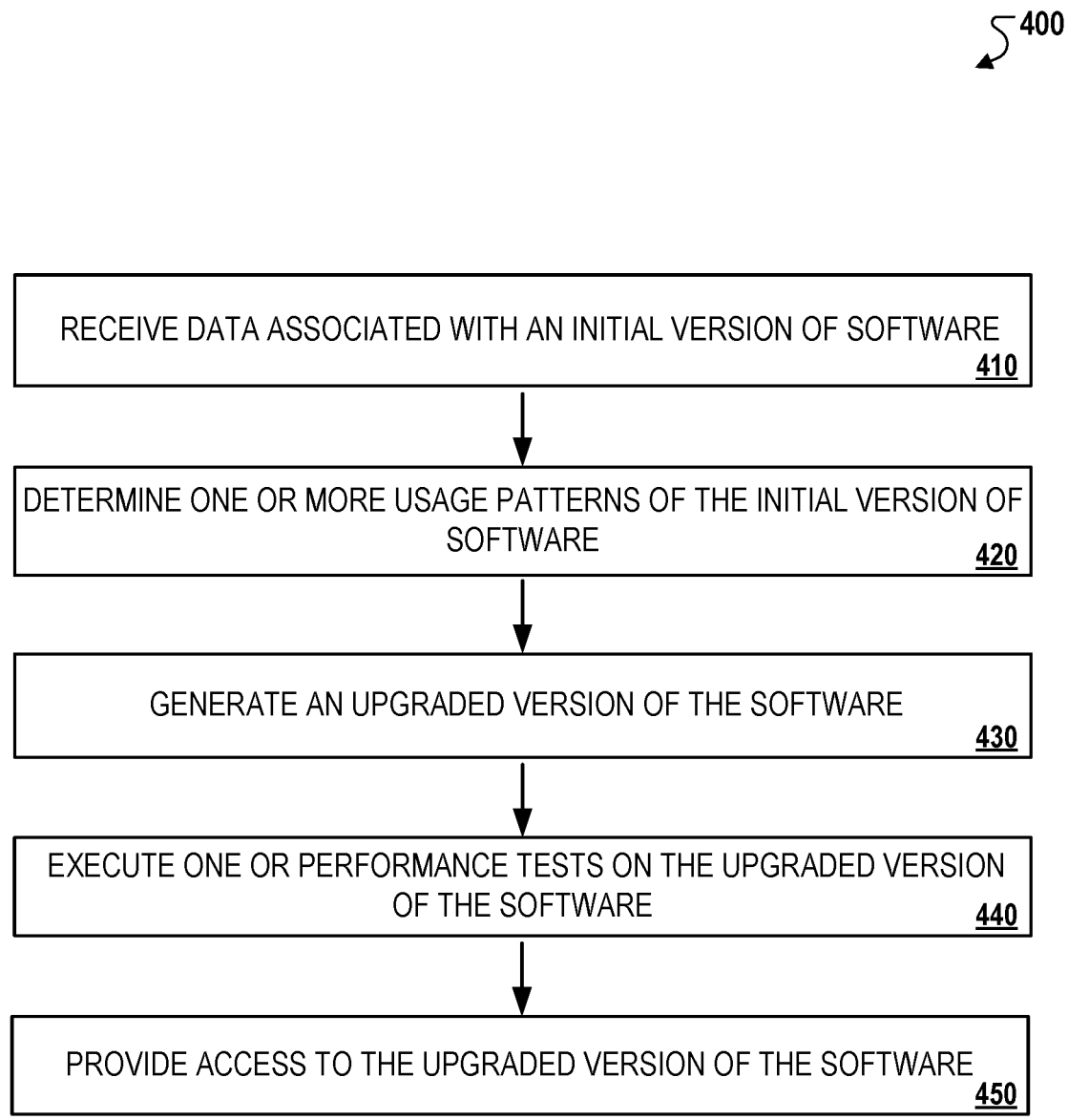
FIG. 4 is a diagram that illustrates an example of a process for generating upgraded versions of software for enterprise computing systems.

FIG. 4 is a diagram that illustrates an example of a process 400 for generating upgraded versions of software for enterprise computing systems. Briefly, the process 400 can include receiving data associated with an initial version of software (410), determining one or more usage patterns of the initial version of software (420), generating an upgraded version of the software (430), executing one or more performance tests on the upgraded version of the software (440), and providing access to the upgraded version of the software (450).

In more detail, the process 400 can include receiving data associated with an initial version of software (410). The initial version refers to a current version of the software, e.g., the version prior to upgrade, and not necessarily to the first released version. For instance, the upgrade module 130 can receive data associated with the current version 202a of an enterprise application configured to operate in a server environment. As described previously with respect to FIG. 1, the server environment can include a local server such as the local environment server 110a or a remote server such as the cloud-based environment server 110b. The user data can include user data, data sources, or user groups that were previously identified to be assigned with the current version 202a of the enterprise application.

In some implementations, the received data includes log data that indicates tasks that users requested, actions of the current version 202a of the enterprise application in responding to the user requests, and measures of performance of the current version 202a in responding. The log data can indicate specific users and documents they requested or tasks they instructed to be performed. This data can also indicate the frequency of access or use of different documents, or of different functions or portions of the application. The log data can also indicate errors and failures that have occurred, as well as uptime between failures and other measures of reliability. In some implementations, the log data indicates all actions that meet certain criteria (e.g., all actions of a certain type, or actions initiated by certain types of users) that have occurred over a particular time frame (e.g., the previous day, week, or month) using the current version 202a. The received data may indicate configuration data also, for example, data indicating how many users and which users are assigned to use a particular server-provided environment, and hardware capabilities of the server running the current version 202a (e.g., number of CPUs, type of CPUs, amount of memory, network bandwidth, and so on).

The process 400 can include determining one or more usage patterns of the initial version of software (420). For instance, the upgrade module 130 can determine or more access patterns of the current version 202a of the enterprise application based on the received data. The access patterns can indicate the types of data included within the enterprise application, common usage trends by multiple end-users, configuration settings for optimal operation, or the business services provided to end-users. The upgrade module 130 can analyze received log data describing use of the current version 202a to determine, e.g., which documents are accessed most frequently, which types of tasks are most common, which users provide the most demanding tasks, and so on.

In some examples, determining usage patterns may include identifying bottlenecks in performance and providing a visual representation of the usage patterns to the user. For example, the process 400 can include determining which aspects of the current version 202a of the enterprise application and the configuration of the current environment are causing suboptimal performance. In some examples, the process 400 can include displaying these identified aspects to the user through the interface 300B. In some implementations, these visual representations are displayed as a preview before the upgrade is executed. In other implementations, the visual representations are displayed after the upgrade is completed, and may include an indication of the differences in performance between the current version 202a and the new version 202b.

The process 400 can include generating an upgraded version of the software (430). For instance, the upgrade module 130 can generate the upgraded version 202b of the enterprise application that is configured to operate in the server environment of the current version 202a of the enterprise application based on the one or more determined access patterns of the current version 202a of the enterprise application. As described previously with respect to FIG. 2, the upgraded version 202b of the enterprise application can be generated based on using the list of metrics 206 to optimize the performance of the upgraded version 202b of the enterprise application when used with system data associated with the current version 202a of the enterprise application (e.g., the system data 112). In some implementations, the upgraded version 202b is generated to operate in the same server environment, e.g., on the same computing hardware as the current version 202a. In other implementations, the upgraded version 202b is generated to operate in a different server environment from the current version 202a, e.g., on different computing hardware managed by the organization, or in a cloud computing environment.

The process of migrating or upgrading an environment within an enterprise may include a third-party management server establishing a baseline level of performance by running quality assurance reports and tests and documenting a baseline system performance. Establishing a baseline may include determining the performance characteristics of the particular system.

The management server may be operated by an entity that is independent from the operator of a cloud server or a local server. In such implementations, the management server operates as a trusted platform that one or more enterprises use to manage environments for multiple users. For example, the management server may allow multiple different enterprises to migrate, manage, upgrade, etc. the environments that a user can access through various applications. The management server can be a server system that includes one or more computing devices.

Next, the management server determines the states of machines within an environment by collecting and taking backups of configuration files within the infrastructure (e.g., backing up plug-ins, metadata, .ini, etc.).

The management server then deploys the new environment. An infrastructure is created by allocating hardware required by the new environment and/or deploying a virtual machine (VM) with the new environment. The management server identifies pre-requisite components from the baseline measures and installs those components, and organization specific settings (e.g., antivirus software, administrative access rights, etc.) are applied.

The management server sets up the database platform is set up by installing and configuring a database server. A third-party platform for managing the migration and upgrading of an enterprise's systems is installed. Next, management server applies the previous machine state to the new infrastructure by merging the configuration files form the original infrastructure into the new infrastructure. Then, the databases are restored from backup files or copied from the environment that runs in parallel.

The management server sets up and configures individual applications and management software in the new infrastructure. For example, search software, network management software, etc. may be configured for operation in the new environment.

The management server performs quality assurance tests, and a new baseline with performance characteristics and metrics is established. Finally, the management server compares the initial baseline and the new baseline evaluates the effects of the migration and/or upgrade.

In some implementations, the deployment of an environment further includes updating a user interface or a console through which a user provides input to the system. For example, the management server may provide a user device with a notification that the build and deployment of a new environment is complete. Upon completion of deployment, the management server may continue to configure non-critical applications, such as platform services, web and mobile settings, email, etc. In some implementations, the management server may notify users of the new environment that the migration or update is complete. For example, the management server may send users an email stating that the new environment is ready for use.

The process of migrating and/or updating an environment and deploying the environment may be executed automatically by the management server when a user initializes migration. For example, the management server may perform the process automatically when it is given data indicating that a user instructed the migration to occur, e.g., through a drag and drop operation on a user interface of a client device.

In some implementations, the management server runs software that provides the data shown in user interfaces as illustrated and described in the present application. That data can be rendered or interpreted by a client device that displays the user interfaces depicted in the figures. For example, the client device can run a management application that communicates with the management server to obtain messages or performance measures to display, and the application on the client device generates the visualizations and interactive elements based on the data received. The management server manages the transition, migration, updating, etc. of the environments within the system 100.

In some implementations, the local server runs software that provides the user interfaces as illustrated and described in the present application. The local server manages the transition, migration, updating, etc. of the environments within the system 100.

In some implementations, the deployment of an environment further includes updating a user interface or a console through which a user provides input to the system. For example, the system may provide a user with a notification that the build and deployment of a new environment is complete. Upon completion of deployment, the system may continue to configure non-critical applications, such as platform services, web and mobile settings, email, etc. In some implementations, the system may notify users of the new environment that the migration or update is complete. For example, the system may send users an email stating that the new environment is ready for use.

The process of migrating and/or updating an environment and deploying the environment may be executed automatically by the system when a user initializes migration. For example, the system may perform the process automatically when a user drags an object to be migrated.

In some instances, the upgrade module 130 generates a copy of the system data 112 (e.g., creates the system data 114) so that the generated upgraded version 202b of the enterprise application and the current version 202a of the enterprise application can be concurrently executed within the same server environment.

In some implementations, the upgrade module 130 also configures the upgraded version 202b of the enterprise application to be compatible with the functionality of the current version 202a of the enterprise application. In some examples, the components of the upgraded version 202b of the enterprise application can be optimized so that they are backwards compatible with individual application content such as dossiers, dashboards, or reports, as depicted in FIG. 3B. In other examples, the components of the upgraded version 202b of the enterprise application can be adjusted so that they are capable of exchanging communications with the same data sources and complementary enterprise applications as the current version 202a of the enterprise application.

In some implementations, the upgrade module 130 allows selective migration of custom data. For example, the upgrade module 130 may determine, based on usage data, which applications or files are currently in use, or are most heavily used. The upgrade module 130 may upgrade only the selected applications and files to the new version 202b. In some examples, the upgrade module 130 may select data to migrate automatically and without user input. For example, the upgrade module 130 may analyze usage patterns to determine which data is useful to the current version 202a, and may not upgrade legacy data not being used to the new version 202b. In some examples, the upgrade module 130 may display an interface through which a user may provide input to select data or files to be migrated.

The process 400 can include executing one or more performance tests on the upgraded version of the software (440). For instance, the upgrade module 130 can execute one or more performance tests, using the data and configuration settings of the current version 202a of the enterprise application (e.g., the system data 112) or a copy of the data and configuration settings of the current version 202a of the enterprise application (e.g., the system data 114), on the generated upgraded version 202b of the enterprise application. As described previously, executing the performance tests can include measurements of multiple performance parameters whose values can be used as indicators to compare the upgraded test version 202b and the current version 202a of the enterprise application. Examples of performance parameters can include a user capacity for maximum active end-users, a mean time between repeated failures, and an average response time to load resource-intensive documents as described previously with respect to FIG. 3B.

As discussed above, the performance tests can include executing, with the upgraded version 202b, tasks that users of the organization previously executed with the initial or current version 202a of the software. The upgrade module 130 can recreate usage patterns determined from the log data for the current version 202a. For example, the upgrade module 130 can provide instructions to the upgraded version 202b that simulate actual previous user tasks. These tasks can include database searches, document accesses, content generation (e.g., generating visualizations such as charts, graphs, tables, maps, 3D renderings, etc.), data manipulation (e.g., statistical analysis of a data set, data filtering, data sorting or classification, and so on.), generating user interfaces or responding to user inputs, and other tasks. Among other actions, the upgrade module 130 may re-run specific tasks, such as loading a specific document that is frequently accessed, or re-running a series of tasks, such as an entire user session that includes a sequence of multiple actions initiated by the user. In performing the tests, the upgraded module 202b can be directed to the actual user data, e.g., so that the underlying data used to generate a report is the same or similar to the data used to generate the same report previously.

The performance tests can be performed for individual users, groups of users, or for an organization as a whole. Generally, the performance tests are run using the tasks of users assigned to the environment that is being upgraded. Thus the performance tests reflect the usage patterns of the users who will likely be using the upgraded version.

If the performance tests determine that one or more tasks are not compatible with the upgraded version, the upgrade module 130 may keep a log of the error and which elements resulted in the error. Data sources, dependencies, or other items that are not appropriately accessed can be logged, and the system can attempt reconfiguration of those elements before running the performance tests again.

The process 400 can include providing access to the upgraded version of the software (450). For instance, the upgrade module 130 can provide the upgrade package 132 to an administrator device of the system 100A. As described previously, the upgrade package 132 can include the generated upgrade for the enterprise application and/or pertinent information related to the upgrade. In some instances, an administrator can be presented with the upgrade notification 306 on an administrator portal interface that provides an option to install the upgrade by providing a single user input (a "single click") as depicted in FIG. 3A.

As discussed above, the log data received and the performance tests performed can involve the documents, tasks, and settings of a particular set of users. For example, the log data can indicate the usage of a particular organization or enterprise. As another example, the log data can indicate the usage of a particular department or group of users within the organization, such as a subset of users assigned to use a particular environment or server. Thus, the performance tests can be customized for a particular organization, or a particular subset of members of the organization, by using the corresponding user data, configurations, and usage patterns that were used for the initial version 202a used before upgrading.

Figure 5:
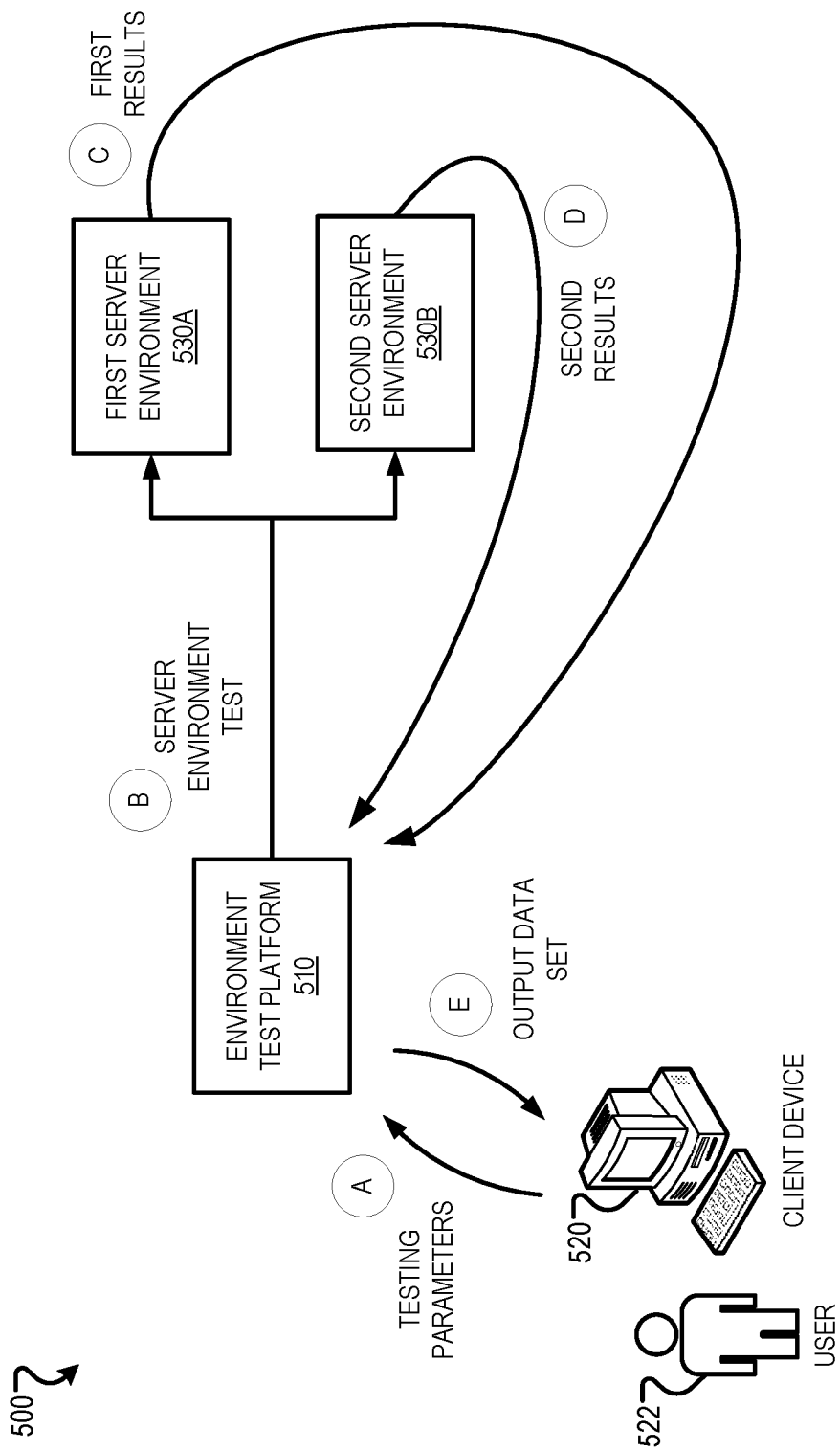
FIG. 5 is a diagram that illustrates an example of a system with an environment testing platform.

FIG. 5 is a diagram that illustrates an example of a system 500 with an environment testing platform 510. In the example, the system 500 includes a client device 520 used by a user 522, an environment test platform 510, a first server environment 530A, and a second server environment 530B (the first server environment 530A and the second server environment 530B collectively referred to as server environments 530).

The testing platform 510 can perform testing and generate upgraded environments as discussed above with respect to FIGS. 1-4. In addition, the testing platform 510 can perform testing for different environments that may or may not be upgrades of one another. For example, the two computing environments 530A, 530B may be two environments that run the same version of software, but have different settings or hardware or software configuration. The same techniques of running tests based on prior workloads (e.g., re-creating or simulating actions and load levels experienced or logged by one environment on another environment)

The client device 520 may be an electronic computing device that exchanges data communications with the environment test platform 510. For instance, the client device 520 may be one or more of a laptop computing device, a desktop computing device, a tablet computer, a PDA device, or other electronic devices. The client device 520 may receive an interface indicating a set of software objects used in the first server environment 530A. For example, the client device 520 may receive, form the environment test platform 510 and across a network, a graphical user interface indicating document A and document B is used by the first server environment 530A.

The client device 520 may be configured to provide a user interface for the user 522 to interact with the client device 520 and select testing parameters. The testing parameters may include a load level and one or more software objects to test. For example, the client device 520 may display a graphical user interface through which the user 522 may select a load level to test at and one more software objects to test.

The client device 520 may be configured to provide the selected testing parameters to the environment test platform 510. For example, the client device 520 may transmit a file, indicating the selected parameters, over a network to the environment test platform 510.

The client device 520 may be configured to receive an output data set from the environment test platform 510 and provide the user 522 an indication of the performance of the first server environment 530A and the second server environment 530B. For example, the client device 520 may receive, from the environment test platform 510 over a network, an output data set that indicates that the second server environment 540 handled tasks twice as slowly as the first server environment 530A and output on a display "The change in server environment results in tasks taking twice as long to be handled."

The environment test platform 510 may be one or more computers. For example, the environment test platform 510 may be a server or a cloud computing platform. The environment test platform 510 may be configured to obtain selected testing parameters from the client device 520 and generate a server environment test configured to generate concurrently running tasks at the indicated load level using the selected software objects. For example, the environment test platform 510 may receive selected testing parameters of "Load level=twenty average users and ten average documents per hour per user" and "Selected objects=document A" and, in response, generate a server environment test configured to generate ten tasks for document A per user for twenty users every hour.

The environment test platform 510 may be configured to perform the server environment test on the server environments 530. For example, the environment test platform 510 perform the server environment test on the first server environment 530A after, before, or in parallel with performing the server environment test on the second server environment 530B. From the performance of the server environment test, the environment test platform 510 may generate results that indicate resource usage levels and response times for the server environments 530. For example, the environment test platform 510 may determine that for the first server environment 530A, average memory usage was 80%, processor usage was 60%, and average completion time per task was thirty seconds and determine that for the second server environment 530B, average memory usage was 95%, processor usage was 60%, and average completion time per task was sixty seconds.

The environment test platform 510 may be configured to generate an output data set from the results and provide the output data set to the client device 520. For example, the environment test platform 510 may determine that the average memory usage increased from 80% to 95%, the average processor usage stayed the same, and the average response time increased from thirty to sixty seconds, generate an output data set indicating the same, and transmit the output data set to the client device 520. In some implementations, the environment test platform 510 may enable a user to search through an application programming interface to select which objects to test The server environments 530 may one or more computers. For example, the server environments 530 may each be a server or a cloud computing platform. The server environments 530 may be configured to run tasks specified by the server environment test. For example, the server environments 530 may be configured to run ten tasks for document A per user for twenty users every hour for a full day based on a server environment test being configured to generate ten tasks for document A per user for twenty users every hour.

The server environment may be a client-server application framework that can be used to exchange application content, data, and/or other information that is necessary to provide business services through enterprise applications. An enterprise application may refer to a type of computer software used to fulfill business needs of organizations such as businesses, schools, interest-based user groups, governments, and the like. Often, these applications rely on large databases and serve data to tens, hundreds, or thousands of users in an organization.

In one example, a server environment can be provided by servers that are owned or managed by the organization that they serve. For example, these may be "on-premises" servers which may be co-housed or co-located within a particular location associated with an organization. In another example, a server environment can include one or more cloud-based servers that are managed and maintained by a third party, for example, at a location separate from offices of the organization. The cloud-based server is generally connected to a network and remotely accessed by one or more computers over a network connection. In some implementations, as described more particularly below, multiple different server environments can be used within a system to exchange data from a set of distributed data sources.

Each of the server environments 530 may store application data used to configure and operate enterprise applications on client devices associated within each server environment. As an example, the application data can include raw data stored on a data warehouse that is aggregated and visualized through business intelligence enterprise applications. Each of the server environments 530 may also store data that is used to migrate various application components of the enterprise applications between different server environments. For example, such data can include required resources for content transfer between different environments, types of data that are migrated (e.g., metadata, object definitions, data source connections, object dependencies), resources or information associated with data to be migrated (e.g., user lists, user groups, directories, etc.), or configurations associated with data to be migrated (e.g., security settings, notifications, user-specified settings, etc.).

In general, the platform 510 can run a capacity test based on a workload that has previously been experienced by a server. For example, the workload can use the same objects (e.g., documents, data sets, data cubes, reports, etc.) or at least the same types of objects that are most frequently used by actual users.

The platform 510 gives the user an interface to set test parameter such as load level to apply during testing, the objects (e.g., documents, data sets, data cubes, reports, etc.) to be used in the tests, a number of users to simulate concurrently being concurrently accessed, and so on. The platform 510 initiates tests for environments, for example, by sending requests that create the appropriate load level or user level and measuring performance results such as response times, reliability, and so on. The platform 510 can output information indicating how an application or environment performs.

The platform 510 can also estimate and provide, for each environment tested, an indication of a maximum capacity that an environment can be expected to provide. For example, given a target level of performance (e.g., average response time of 0.5 seconds, or completion of 1000 transactions a second, or throughput of 10 Gb, etc.) the platform 510 can estimate the number of users that can be supported while maintaining the desired level of performance. Similarly, given a target capacity (e.g., 1000 concurrent users), the platform 510 can estimate and provide an expected level of performance at the target capacity. The platform 510 can determine these estimates by applying scaling factors to results from testing at one or more different load levels. For example, the platform 510 may perform tests that respectively simulate 100 users, 200 users, 300 users, and so on, and from the performance scores for the various tests extrapolate the performance that may reach the desired target. Similarly, specific parameters may be tested. If performance for 500 users is indicated to be of interest, the system can run tests while simulating 500 users. As another example, to determine the maximum capacity while still achieving a desired performance result (e.g., response time of <1 second), the platform 510 may run tests that incrementally increase the number of simulated users until the performance reaches the threshold level.

One of the primary uses of the platform 510 is to prepare for or validate an upgrade to an environment. When installing or evaluating an upgrade, the environment 530A may represent the current version (e.g., currently available to serve clients) and the environment 530B may represent the upgraded version. The performance tests are run on the two installations to see what your current environment 530A is capable of achieving, and what the upgraded environment 530B is capable of achieving.

Another primary use of the testing platform 510 is to test the effects of configuration changes. This may be done using a second system or environment (e.g., with two environments available concurrently). In addition, or as an alternative, the testing may be done by running performance tests with the current environment, then testing again after making the configuration change. For example, a user can run tests for a system, make a configuration change after the initial testing is done, and then test the system after the change. The change may be any of various changes, such as a software setting, a hardware change (e.g., a memory upgrade), or an increase the number of users or devices supported by a server.

Typically, testing can be user-initiated (e.g., on-demand) or automatically initiated by the system (e.g., automatic or periodic, or otherwise triggered by the platform 510 rather than a user action).

The various tests can include testing the integrity of data and the validity of connections among software components. The tests can also generate performance information such as an amount of time to complete tasks, error rates or error ratios, etc. The platform 510 can also perform difference detection, e.g., comparing the results of certain operations and determining whether the result (e.g., value or file generated) is different. The platform 510 can identify differences between the output of two environments 530A, 530B and determine a source of the difference in output, e.g., a module or function that differs between the two environments 530a, 530B that provided the values that are determined to be different. In some implementations, the platform 510 provides data for user interface controls that enable a user to remediate differences. For example, given a difference in output between two environments 530A, 530B, the platform 510 may provide a button to enable a user to transfer a setting, taken from the first environment 530A that resulted in the correct or baseline output, to the second environment 530B which had a different setting that resulted in a different output.

Performance testing can be used to verify that response time, resource usage and/or throughput of an environment 530A, 530B are adequate. Performance tests can come in several forms, e.g., load, stress and capacity testing, among others. Load testing verifies that the system is stable under normal or expected workload conditions. Stress testing verifies the system's behavior is expected under abnormally high workload conditions. Capacity testing helps determine the workload a system can support while meeting all performance goals, or the performance levels a system can achieve given a workload goal. Single-user performance tests additionally allow measuring system performance under no load, with one user and one single executing job. For evaluating the suitability of an upgrade, load and single-user performance testing are often used to verify that performance is maintained in acceptable ranges or improved.

The results of tests are compared to a set of known conditions or baseline. This baseline can be the performance characteristic of the current system, which may be obtained from another source, such as: reports and previous performance logs from an earlier version of the environment for load tests, a baseline for the single-user performance tests against a previous version, and/or service level agreements with a business organization. Typically, the current level of performance is considered a baseline, and this is compared to the performance of a changed version (e.g., whether actually changed, or whether a new, altered version is generated and runs alongside the original version.)

Single-user performance tests help pinpoint specific bottlenecks that did not exist in the previous software version in report or document execution workflows. The system can measure the execution time of a single report or document job at a time for a single logged-in user, in both, the new and old software versions. Execution times should be similar or better in the new version with respect to the old one.

Load performance, e.g., concurrency analysis, is another useful type of test. The system can give insight of the system usage in terms of user concurrency, report and document workload, and execution times. These variables can help identify the success criteria of a load performance test when upgrading software. The concurrency or load level over time (e.g., average concurrent usage per hour) can illustrate the relationship between the amount of sessions and users, and the number of executing jobs (reports and documents), for every hour and weekday. Metrics can be calculated by aggregating data at the hour level for each weekday and each application server. Specifically, the system can generate a report that provides some or all of the following information. (1) Average number of logged in users and open sessions throughout each hour of each weekday. (2) The maximum number of logged in users and open sessions recorded at any given moment in an hour for each hour of each weekday. (3) Average and maximum number of executed reports for every hour of each weekday. (4) Average and maximum number of executed documents for every hour of each weekday. The system can identify a variety of items for a particular timeframe, e.g., (1) the maximum and average concurrency that should be supported by an environment, (2) the workload in terms of documents and reports run for each concurrency level (e.g., that with 1 user and 2 active sessions, typically 15 reports and 2 documents are run), a length of time peak usage periods last (e.g., three hours straight, for each time zone when users around the country run reports; or scheduled report runs at night, lasting five hours).

Various load performance tests can have different success criteria. With information describing maximum concurrency levels and the set of reports and documents executed, it is possible to gain a good perspective of what acceptance criteria should be for a performance test. These criteria could include running an environment with a particular load, such one or more of: 30 concurrent users, generating around 45 sessions (by logging in several times); 50 reports per hour, using the most popular reports (e.g., most frequently accessed or those with the highest count of accesses); 20 documents retrieved per hour, using most popular documents (e.g., most frequently accessed or those with the highest count of accesses); or running for 3 consecutive hours (for example, for the length of a peak period).

To pass the test, a system may be required to meet predetermined criteria. For example, that recorded report execution times (through statistics) are as good as current version or better (assuming the same hardware and other performance-affecting variables are the same).

Monitoring can be performed for various variables, such as: (1) report and document execution statistics, (2) memory usage of the environment, (3) CPU usage of the environment, and/or (4) additional performance counters retrieved from the environment.

Various types of tests can be run for load performance tests. All-hands tests can help verify that the system behaves correctly under real user concurrency. For a certain period, preferably an hour, end users log into the test system and execute usual actions they do in the production environment (run reports, documents, manipulate them, create reports, browse through project folders, etc.).

The objective of the test is to monitor the environment under realistic concurrency, memory, CPU, and overall end user perceived response time should be within acceptable limits. The main advantages of this test is that it can be used as a business acceptance test, where end users give the upgrade a binary rating whether it is acceptable or not. In this case, while they do implicit feature regression testing, they in conjunction help verify the system is stable. End users execute real actions done in the day-to-day, and the full Software stack is tested, e.g., database (metadata and warehouse), Intelligence Server, Web Server, Desktop, Office and Web. However, this technique requires business user involvement throughout the upgrade project. Workload on the servers might not be as high as typical, since end users might jump on and off while testing without giving a full realistic workload.

Figure 6:
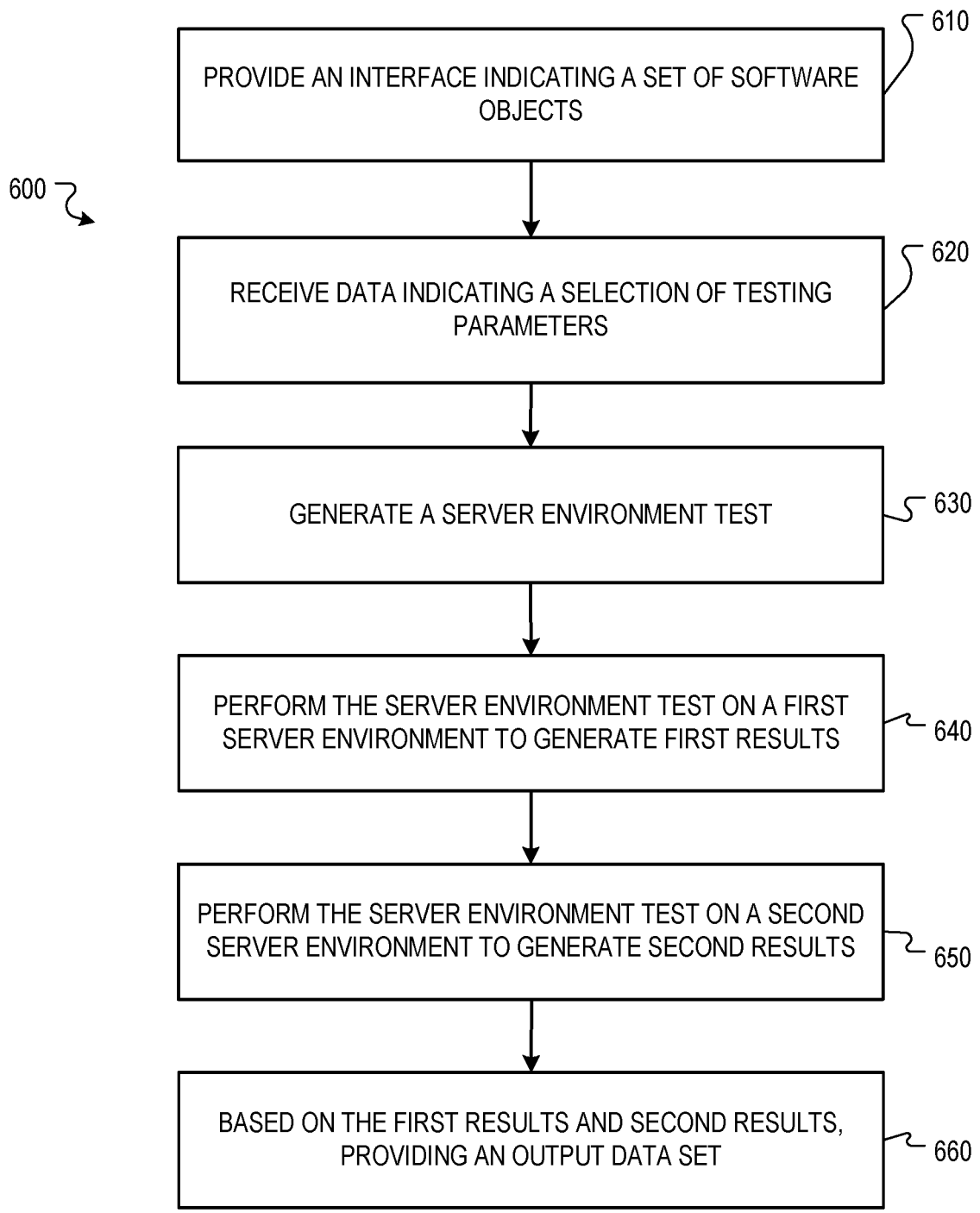
FIG. 6 is a diagram that illustrates an example of a process for testing server environments.

FIG. 6 is a diagram that illustrates an example of a process 600 for testing server environments. Briefly, the process 600 includes providing an interface indicating a set of software objects (610), receiving data indicating a selection of testing parameters (620), generating a server environment test (630), performing the server environment test on a first server environment to generate first results (640), performing the server environment test on a second server environment to generate second results (650), and, based on the first results and second results, providing an output data set (670).

In more detail, the process 600 includes providing an interface indicating a set of software objects (610). For example, the environment test platform 510 may provide an interface indicating Document A and Document B used in the first server environment 530A. In some implementations, software objects include one or more of data sources, documents, or applications. In some implementations, the interface includes a graphical user interface or an application programming interface.

In more detail, the process 600 includes receiving data indicating a selection of testing parameters (620). For example, the environment test platform 510 may receive an indication that Document B was selected and a load level of generating Document B one hundred times an hour was selected. In some implementations, a load level includes a number of users or concurrent tasks.

In more detail, the process 600 includes generating a server environment test (630). For example, the environment test platform 510 may generate a server environment test to run one hundred tasks for generating Document B every hour.

In more detail, the process 600 includes performing the server environment test on a first server environment to generate first results (640). For example, the environment test platform 510 may perform the server environment test on the first server environment 530A and generate results that indicate average memory usage was 60%, average processor usage was at 90%, and average response times were twenty seconds.

In more detail, the process 600 includes performing the server environment test on a second server environment to generate second results (650). For example, where the second server environment 530B only differs from the first server environment 530A in doubling a number of central processing units, the environment test platform 510 may perform the server environment test on the second server environment 530B and generate results that indicate average memory usage was 60%, average processor usage was at 45%, and average response times were fifteen seconds.

In some implementations, the second server environment differs from the first server environment in regards to one or more of a software configuration change, a hardware change, or a software upgrade. For example, the second server environment 530B may have more or less memory, more or less maximum users supported, or different versions of software than the first server environment 530A.

In more detail, the process 600 includes based on the first results and second results, providing an output data set (670). For example, the environment test platform 510 may provide an output data set that indicates that doubling the number of central processing units keeps average memory usage the same, reduces average processor usage from 90% to 45%, and reduces average response times from twenty seconds to fifteen seconds.

In some implementations, providing a document having an interactive user interface that includes a set of controls customized based on the first results and the second results includes determining, based on the first results and the second results, an error that occurred during testing of the second server environment, identifying, by the one or more computers, a software configuration setting of the second server environment corresponding to the error, and based on identifying the software configuration setting corresponding to the error, generating the document such that the set of controls includes a control that is configured to initiate, when selected by a user, a change to the software configuration setting to avoid the error.

For example, the environment test platform 510 may determine that the second environment crashed, determine that the second environment crashed because of the amount of memory, and, in response, generate a document with a control that is configured to increase the amount of memory upon selection by the user 522.

In some implementations, the process 600 includes determining, based on the first results and the second results, that the error did not occur during the server environment test of the first server environment, where identifying, by the one or more computers, the software configuration setting includes identifying a software configuration difference between the first server environment and the second server environment, and where the document is generated, based on identifying the software configuration difference between the first server environment and the second server environment, such that the control configured to initiate the change to the software configuration setting is configured to change the software configuration setting of the second server environment to a corresponding setting of the first server environment.

For example, the environment test platform 510 may determine, based on the first results and the second results, that the first server environment 530A did not crash while the second server environment 530B crashed, determine that the server environments 530 differed in the amount of memory, and, in response, provide a graphical user interface to the client device 520 that includes a button that upon selection changes the amount of memory for the second server environment 530B to the amount of memory for the first server environment 530A.

In some implementations, the process 600 includes, after performing the server environment test for the first environment, making a hardware and/or software change to the first server environment to create the second server environment. For example, the environment test platform 510 may perform the server environment test on the first server environment 530A and then increase the number of central processing units that can be used to create the second server environment 540.

In some implementations, the process 600 includes accessing usage logs indicating load on the first server environment over a period of time, determining, based on the usage logs a profile of tasks performed over the period of time and a maximum level of concurrency supported by the first server environment over the period of time, determining, based on the second results, whether the second server environment supports the maximum level of concurrency with tasks corresponding to the profile of tasks, and where providing the data set includes providing an indication whether the second server environment supports the maximum level of concurrency with tasks corresponding to the profile of tasks.

For example, the environment test platform 510 may access usage logs for the first server environment 530A across a week, determine document A is generated one hundred times every hour and document B is generated two hundred times every hour during the week and determine a maximum of twenty users concurrently use the first server environment 530A at any time, and determine that the second server environment 530B supports document A being generated one hundred times every hours and document B being generated two hundred times every hour during the week and determine a maximum of twenty users concurrently using the second server environment 530B at any time, where the data set provided indicates that the second server environment 530B does provide such support.

In some implementations, the process 600 includes determining whether the first results and the second results are valid and determining whether outputs from the server environment test on the first server environment match outputs from the server environment test on the first server environment. For example, the environment test platform 510 may determine whether the results are within ranges that are possible and whether the output of the tasks run by the server environments 530 are identical to one another.

Figure 7A:
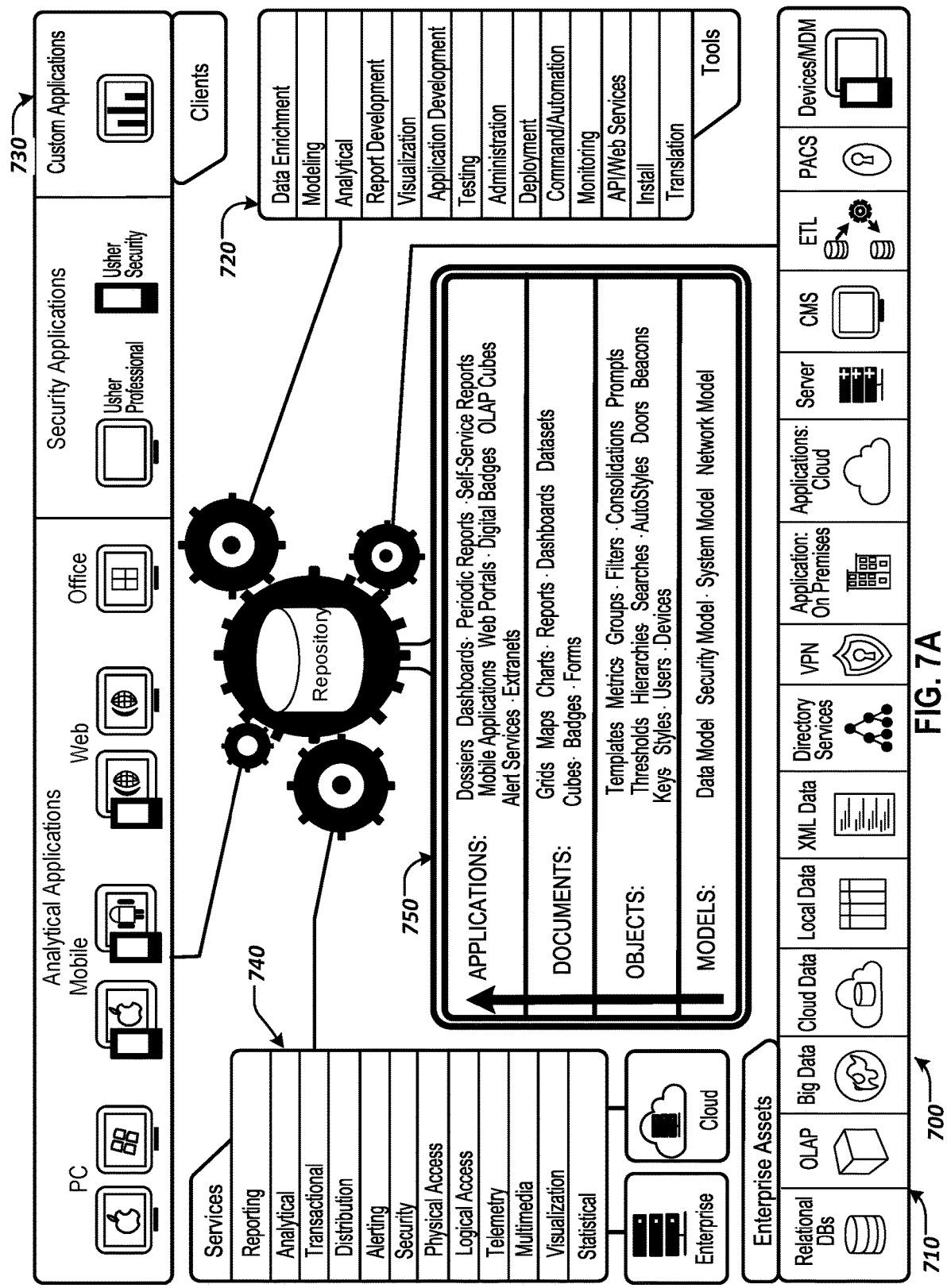
FIGS. 7A-7B are illustrations of an example of a unified, multi-platform enterprise system.

Referring to FIG. 7A, a multi-platform system 700 across an enterprise is illustrated. In general, an enterprise may include various systems, components, platforms, and configurations. As shown in FIG. 7A, the various platforms may include, for example, one or more of enterprise assets 710, tools 720, a client system 730, services 740, and a repository including resources 750.

In some implementations, the client system may include, but is not limited to, one or more of security applications, device analytic applications, and various other custom applications. The device applications may be applications used on devices provided by the enterprise. These devices may include any suitable electronic device such as, for example, a personal computer, a laptop, a mobile telephone, a smart phone, a personal digital assistant, an electronic pad, a smart watch, a smart TV, a mobile audio or video player, a game console, smart glasses, or a combination of one or more of these devices.

In some implementations, the services may include, but are not limited to, one or more of reporting services, analytical services, transactional services, distribution services, alerting services, security services, physical access services, logical access services, telemetry services, multimedia services, visualization services, and statistical services. These services may be provided through enterprise systems or through an Internet-based cloud system.

In some implementations, the tools may include, but are not limited to, one or more of a data enrichment tool, a modeling tool, an analytical tool, a report development tool, a visualization tool, an application development tool, a testing tool, an administration tool, a deployment tool, a command/automation tool, a monitoring tool, an API/web services tool, an install tool, and a translation tool.

In some implementations, the enterprise assets may include, but are not limited to, one or more of relational databases, an online analytical processing (OLAP) service, a cloud database, a local database, an XML database, big data services and databases, directory services, virtual private network (VPN) services, on-premises applications, cloud applications, one or more devices, one or more servers, content management systems (CMS), picture archiving and communication services (PACS), and Extract, Transform, and Label services.

In some implementations, the repository is a storage database that may store various data including one or more of applications, documents, objects, and models. The applications may include, for example, dossier applications, dashboard applications, periodic report applications, self-service report applications, mobile applications, web portals, digital badge applications, OLAP cube applications, alert service applications, and extranet applications. The documents may include, for example, grids, maps, charts, reports, dashboards, datasets, cubes, badges, forms, and credentials. The objects may include, for example, template objects, metric objects, group objects, filter objects, consolidation objects, prompt-related objects, threshold objects, hierarchy objects, search objects, autostyle objects, door-related objects, beacon objects, key objects, style objects, user indicators, and device-indicating objects. The models may include, for example, a data model, a security model, a system model, and a network model.

The client systems, services, tools, enterprise assets, and repository platforms are connected through one or more networks and, combined, provide a unified system for enterprise analytics, mobility, and security. The unified enterprise system may provide access to a large volume of data for a large number of devices. Access to the unified enterprise system may be provided through a graphical user interface (GUI). This GUI may be provided as part of a native application, a web application, a web page, or in another format. However, moving or copying data from one platform or category to another may be problematic. For instance, when an object from one platform is moved to another platform, user designations, access information, and other data associated with the object is not moved. If a user selects the object in the platform to which the object has been moved to, the object may be missing one or more data associated with the object thereby preventing proper utilization or execution of the object.

To address this challenge, an efficient method and system to manipulate data across the various platforms is disclosed. Implementations of such a system are described in further detail with reference to FIGS. 8-21.

Figure 7B:
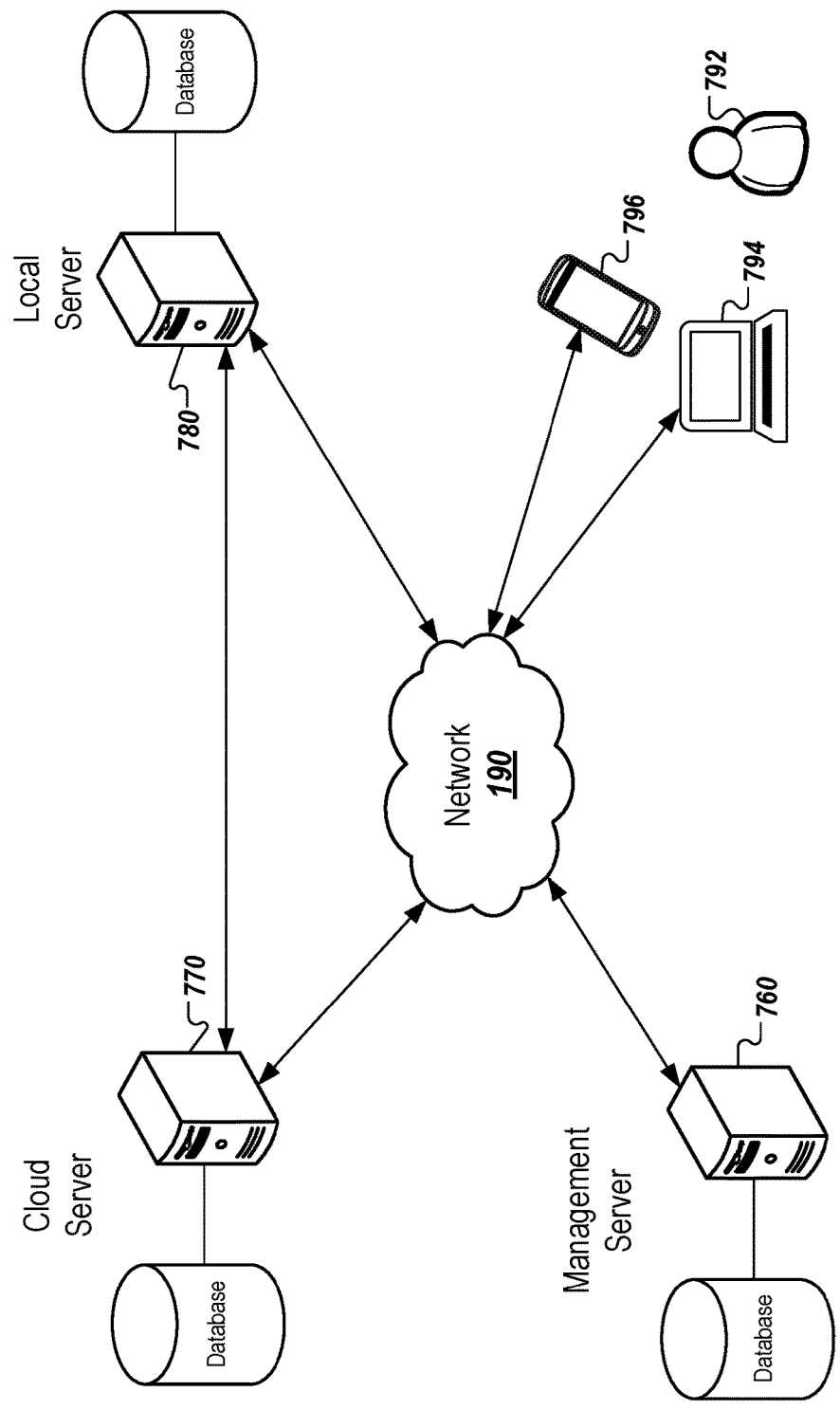

FIG. 7B illustrates the unified multi-platform enterprise system 700 and its connections. The system 700 includes a third-party management server 760, cloud servers 770, local servers 780, and user devices 794 and 796.

The network 790 is configured to enable exchange of electronic communications between devices connected to the network 790. For example, the network 790 may be configured to enable exchange of electronic communications between the management server 760, the cloud servers 770, the local servers 780, and the user devices 794 and 796.

The network 790 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 790 may include multiple networks or subnetworks, each of which may include, for example, a wired or wireless data pathway. The network 790 may also include a circuit-switched network, a packet-switched data network, or any other network able to carry electronic communications (e.g., data or voice communications). For example, the network 790 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 790 may include one or more networks that include wireless data channels and wireless voice channels. The network 790 may be a wireless network, a broadband network, or a combination of networks including a wireless network and a broadband network.

The management server 760 may be operated by an entity that is independent from the operator of the cloud server 770 or the local server 780. In such implementations, the management server 760 operates as a trusted platform that one or more enterprises use to manage environments for multiple users. For example, the management server 760 may allow multiple different enterprises to migrate, manage, upgrade, etc. the environments that a user can access through various applications. The management server 760 can be a server system that includes one or more computing devices.

The cloud server 770 may be one or more virtual servers. In some implementations, the cloud server 770 runs on a cloud computing environment, and includes all of the software it requires to run. The cloud server 770 may not depend on any centrally-installed software, and may host any of various components of the system 700, including the assets 710, the tools 720, the clients 730, the services 740, or the resources 750. In some implementations, the cloud server 770 is the same as the management server 760.

The local server 780 may be one or more physical servers local to the enterprise associated with the system 700. The local server 780 may host any of various components of the system 700, including the assets 710, the tools 720, the clients 730, the services 740, or the resources 750.

The user 792 may belong to an enterprise or organization, and may interact with the system 700 through the user devices 794 and 796. The user devices 794 and 796 can be mobile computing devices, such as smart phones, laptop computers, etc. associated with the user 792. The user devices 794 may run or otherwise access applications that provide access to the resources 750 of the system 700. For example, the user device 796 may be a desktop computer through which the user 792 may access a particular VM 750 in the system 700.

Figure 8:
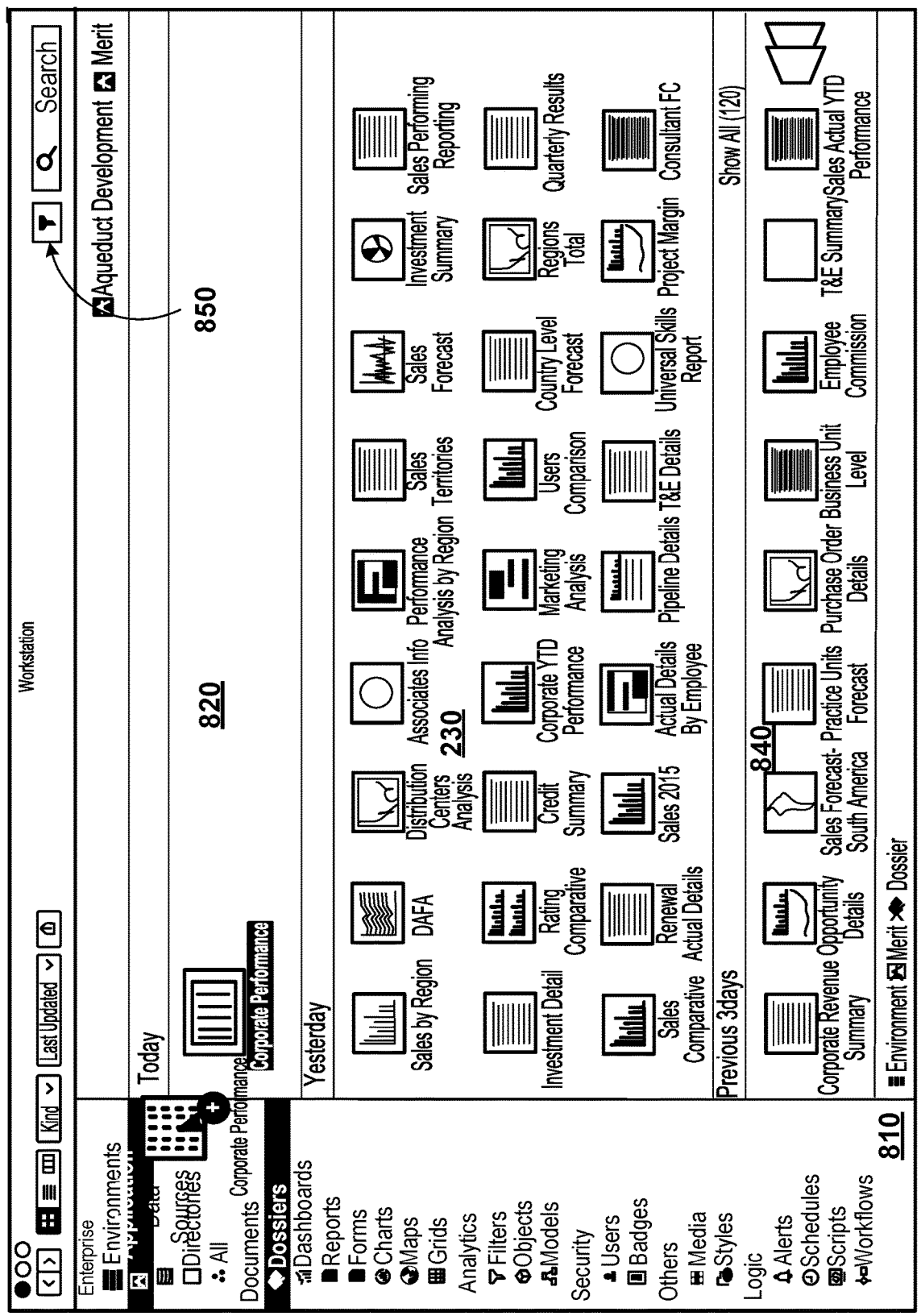
FIG. 8 illustrates a screenshot of a graphical user interface (GUI) to access the unified, multi-platform enterprise system.

FIG. 8 illustrates a GUI 800 through which a user may access the unified, multi-platform enterprise system. This GUI 800 may be provided by a client device, with information populated from data provided by a server system. For example, a client device can run a management application to view and configure settings of the various servers, client devices, applications, documents, and other elements in the enterprise. The GUI 800 may be divided into one or more portions 810, 820, 830, 840, and 850. In one portion, for example in categories portion 810, a list of categories corresponding to the various platforms in the unified, multi-platform enterprise system is displayed. Within each category, a list of various data objects can also be provided. For example, within the "Documents" category, various types of sub-categories such as Dossiers, dashboards, reports, forms, charts, maps, grids, etc. are listed. Within the "Analytics" category, various types of sub-categories corresponding to filters, objects, and models are listed. Within the "Security" category, users and badges are listed. Within the "Others" category, "Media" and "Styles" sub-categories are listed. Within the "Logic" category, "Alerts," "Schedules," "Scripts", and "Workflows" sub-categories are listed. In general, it should be understood that any suitable type of category in the unified, multi-platform enterprise system available for access to the user may be listed in categories portion 810.

In the illustrated example, a "Dossiers" subcategory is selected by the user. A dossier represents, for example, a user-defined collection of documents, interactive interface elements, and other content. A dossier may include links to live, changing data sources, and may draw on various databases and servers to populate information, refresh charts, tables, and other visualizations, and respond to user interactions within the interface of the dossier. Thus, use of a dossier, like running a server-based application, serving of a document, or performing a database search, can consume system resources within a computing environment. A dossier, like a dashboard, form, report, or other document, may be interactive and may respond to user actions, e.g., to filter, edit, annotate, adjust views, and so on. Displaying documents can involve generating charts, graphs, maps, tables, and other visualizations. These visualizations, and collection of the data for them, can be performed by the server system that serves the document, by a client device that displays the document, or a combination of both.

In response to the selection, portions 820, 830, and 840 are displayed with information indicative of one or more dossiers available in the "Documents" category. For example, portion 820 may display one or more of an alphanumeric text and a graphical representation of a dossier "Corporate Performance" created, accessed, or modified by a user in the enterprise system today. Portion 830 may display one or more of an alphanumeric text and a graphical representation of dossiers created, accessed, or modified by a user in the enterprise system yesterday. Portion 840 may display one or more of an alphanumeric text and a graphical representation of dossiers created, accessed, or modified by a user in the enterprise system at a particular date (e.g., three days ago). In general, portions 820, 830, and 840 may display dossiers in any type of subcategory arrangement (e.g., by subject, by date, by author, by editor, by modifier, etc.).

Figure 9:
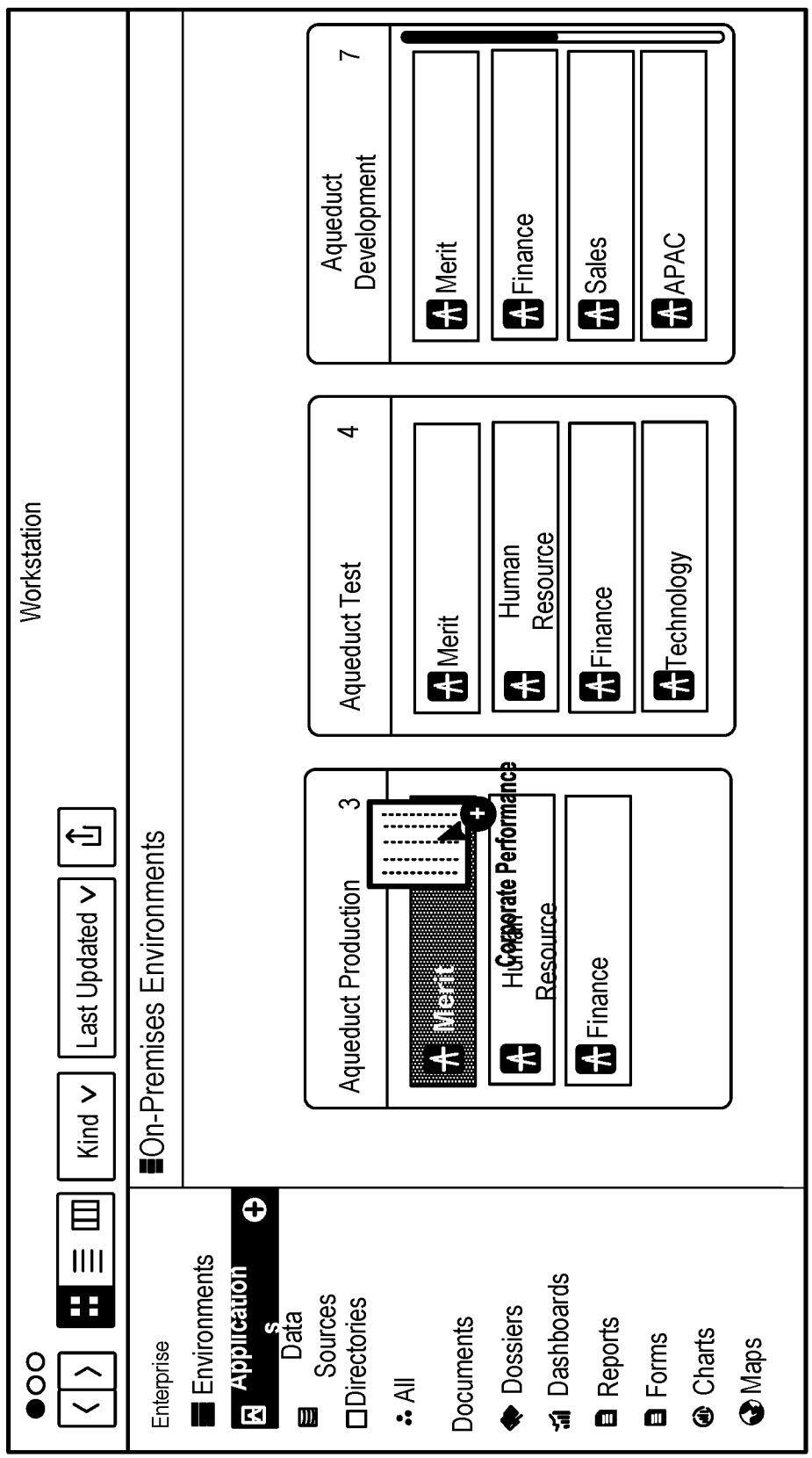
FIG. 9 is an exemplary illustration of a drag-drop operation performed in the GUI.

The GUI 800 and the supporting server system enable a user to configure server systems and their interactions with documents, users, data sources, applications, and other elements of the enterprise. For example, a user may select a document, in this instance one of the "dossier" type, and assign it to be served by a particular application and/or server environment. As shown in FIG. 8, a user may select the "Corporate Performance" dossier icon and drag the icon to the "Applications" sub-category. In response to the drag, e.g., while the user holds the icon over the "Applications" entry in the navigation bar, the GUI may change to provide an interface that displays on-premises environments in the Applications sub-category. As shown in FIG. 9, the user may proceed to drop the "Corporate Performance" dossier representation on a "Merit" application representation.

FIG. 9 illustrates a second GUI 300 provided in response to the user interactions shown in FIG. 8. The GUI 300 shows representations of the "Aqueduct Production," "Aqueduct Test," and "Aqueduct Development" environments, and applications within the respective environments. As an example, the "Aqueduct Production" environment includes a "Merit" application, a "Human Resource" application, and a "Finance" application. As noted above, the user may drag and drop the "Corporate Performance" dossier representation on the "Merit" application representation.

In general, an environment may refer to a collection of one or more computing machines. A drag and drop operation may correspond to a move or copy and paste operation for a particular data object, such as a client 740 or a resource 750. For example, if a user drags and drops an icon representing a document from one platform to a destination platform, in some cases, the document may be moved to the destination platform. In some cases, the document may be copied and stored at the destination platform.

However, moving an object may not simply transfer a single file. The system is configured so that moving objects can also migrate auxiliary data, settings, and user access. For example, moving a dossier from one application to another, or from one environment may initiate a series of tasks that connect and disconnect data sources, migrate users and resources between systems, and so on, as described below. Moving a document can thus change which servers or environments host the document and serve it to a set of users. Similarly, moving objects such as applications and databases, while shown in a simple interface, can initiate various processes to address the dependencies and requirements of those applications.

In response to completing the drag and drop operation by dragging and dropping the graphical representation of the "Corporate Performance" dossier (hereinafter referred to as "object") on the "Merit" application representation, a system performance prediction indicator may be displayed. In some implementations, the system performance prediction indicator may be implemented as a window, notification, alert, or message that provides information indicative of the likely performance of one or more portions of the unified, multi-platform enterprise system. To provide system performance prediction information, the unified, multi-platform enterprise system may generate a simulation of the environment with the moved data to predict the performance of the unified, multi-platform enterprise system. As part of the simulation, the unified, multi-platform enterprise system may determine the type of object (e.g., dossier) being moved and identify each asset of the object.

Determining the type of object may include one or more of determining a category or subcategory of the object, an asset of the object, a file type of the object, a programming language used to program the object, and, in general, determining any identification feature of the object. Assets of the object may include one or more a metadata model associated with the object, data indicative of users associated with the object, data structures associated with the object, and data sources associated with object.

In some implementations, a metadata model associated with the object includes information indicating how metadata for the object can be obtained and assigned to the object and how the metadata can be represented. The metadata model may include classifications of data that can be assigned to the object and a workflow model that provides a method to access and or use the object and the object's metadata.

In some implementations, data indicative of users associated with the object may include data identifying one or more users of the unified, multi-platform enterprises system that have interacted with the object in any manner, and, for each user, data that indicates a relationship or interaction between the user and the object. The relationship or interaction of the user may include, for example, a creation of the object, a modification of the object, a view or access of the object, an edit of the object, a migration of the object, a copying of the object, and, in general, any action taken by the user connected to the object.

In some implementations, data structures associated with the object may include, for example, an indication of a programming language in which the object is programmed in or can be executed in, a programming code or algorithm for implementing the object, and data indicating how to access or execute the object. The data structures may include keys, hash tables, compiler data, format data, encryption/decryption information, compression information, and password and security information.

In some implementations, data sources associated with object include any source, location, or resource from which data is imported or used by the object when the object is executed.

Figure 10:
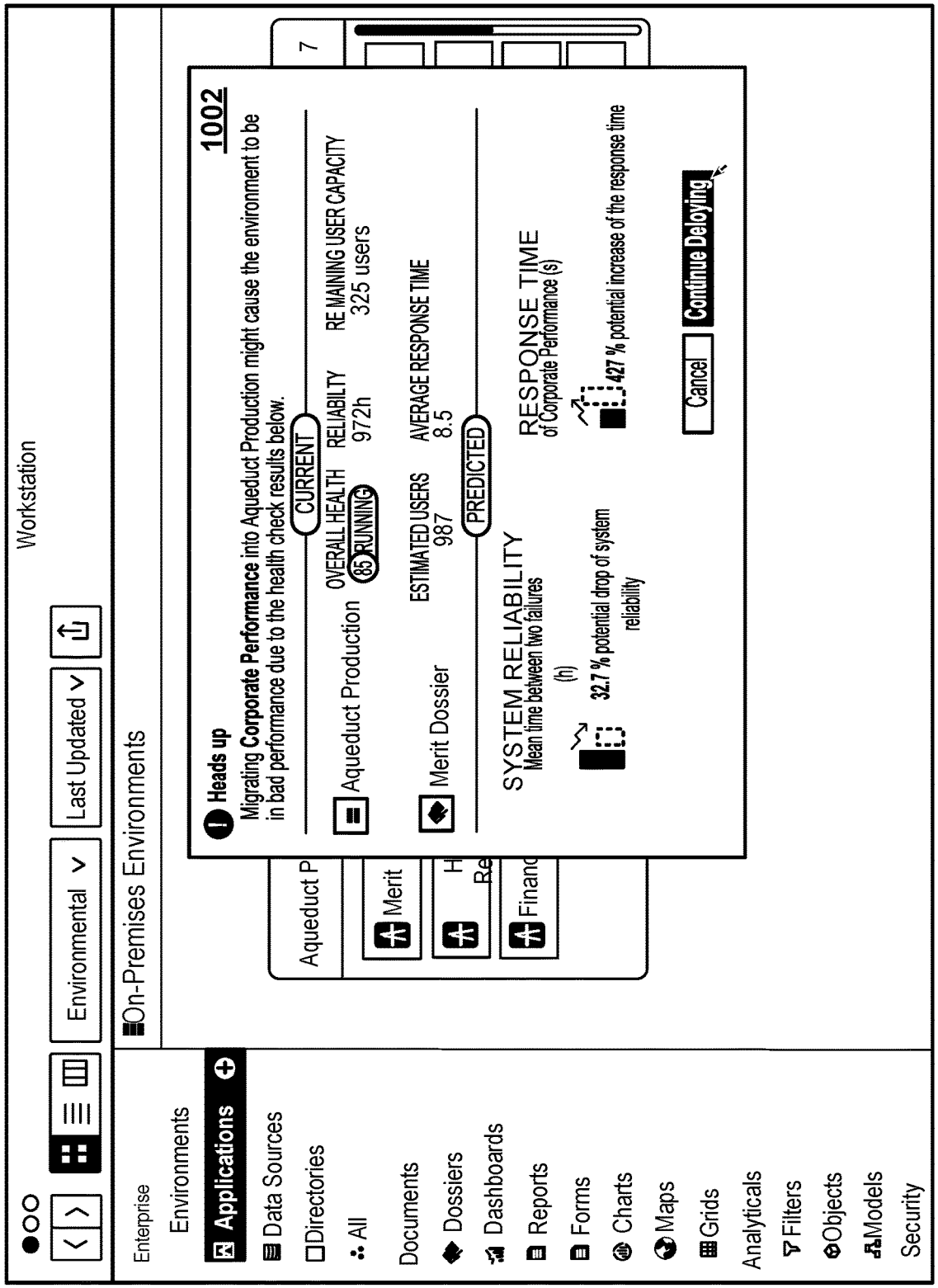
FIG. 10 is an exemplary illustration of a system performance prediction indicator.

Referring to FIG. 10, in response to the user request to change the configuration of the "Corporate Performance" document, the management server 760 generates performance estimates representing the performance that would occur if the requested change was made. In some implementations, the client device provides information indicating the requested change to the management server 760, and may send a request for the management server 760 to provide performance estimates corresponding to the change. In other implementations, the client device that showed the GUI 300 simply requests that the change to the computing system be made, and the management server 760 evaluates the performance impact before carrying out the change. Estimates may be requested to be generated for all changes to enterprise assets, only for changes involving certain data assets or computing devices, only for certain users or documents, or for specific types of actions.

The management server 760 can access logs or other data indicating performance of the document in the current configuration (e.g., response time, throughput, reliability, CPU load, memory usage, etc.), and can determine predicted performance measures for the same performance measures. The predicted performance measures can be generated after the user request, to indicate estimates specific to the configuration change that the user requested, e.g., taking into account the characteristics of the document or other resource to be moved, the data sources relied on by the document, the configurations and other demands on the source server environment and the destination server environment, the usage patterns of the users that use the document, and so on.

The management server 760 also compares the predicted performance for the document with the current performance of the document. The management server 760 determines that the performance would change, and that the change would decrease performance by at least a threshold amount. For example, predetermined thresholds can be set for each of multiple performance metrics to represent when users should be notified. For example, a change that reduces reliability 20% or more, or increases response time more than 50%, or is predicted to increase average CPU load more than 10% can trigger a notification of the potential adverse effects of the user's requested change. The thresholds can measure relative changes with respect to the current configuration. The thresholds may additionally or alternatively measure absolute performance, e.g., whether average CPU load would exceed 80%, if available storage is less than a particular amount, or if the number of users that would be assigned would exceed a particular amount.

If the predicted performance measures do not meet the threshold, and thus indicate that performance after the change would be acceptable, the management server 760 carries out the requested change. The management server 760 may acknowledge the request and provide confirmation when the configuration change has been completed.

If the predicted performance measures meet the thresholds, and thus indicate that performance after the change would be unacceptable, then the management server 760 temporarily blocks the change. In response to determining that the predicted performance following the requested change would trigger one of the thresholds, e.g., would decrease performance by at least a predetermined minimum amount, the management server 760 provides a notification to the client device that indicates the potential effects of the requested change. For example, the management server 760 can provide a message instructing the client device to show a user interface to the user. The message may include information indicating performance measures before the change and predicted performance measures representing the capability of the system after the change.

As shown in FIG. 10, in response to the message from the management server 760, a system performance prediction indicator (SPPI) 402 is displayed on a GUI 400 user's device as a "Heads Up" window and provides information that compares the likely performance of the environment (e.g., "Aqueduct Production") and object (e.g., "Corporate Performance" dossier) after the object is migrated relative to the performance of the environment and object before the object is migrated. For example, as shown in FIG. 4, the SPPI indicates that by migrating the object into the new environment, enterprise system reliability may drop by 32.7% and a response time of the object may increase by 42.7%. The reliability and response time information may be part of an anticipated health score presented to the user that reflects a likely state of one or more portions of the enterprise system if the object is migrated. Although the change in reliability and response time shown in FIG. 10 is provided in a percentage change, in some cases, the change may be presented in non-relative terms. For example, the SPPI may indicate that the response time will likely increase from 3 milliseconds to 3.6 milliseconds and the increase may correspond to, for example, a 42.7% increase. The SPPI 1002 can indicate to the user that the requested change has not been made, and requires confirmation before the configuration change will be carried out. By blocking or deferring execution of the requested change, the system can limit the potential for changes with unintended consequences to adversely affect the enterprise computing system. Similarly, erroneous or inadvertent changes can be identified and stopped more easily.

The health score calculations may be executed before the scores are requested. For example, the health scores may be calculated periodically, and may be available very quickly upon request. In some implementations, the health scores may be calculated in response to certain actions taken with respect to the system 700. For example, the health scores can be calculated in response to an environment migration, a change in configuration to the environment, and various other actions taken within the system 700.

The health score calculations can be based on specific performance metrics of the system 700. For example, the health score calculations can be based on an amount of time for a report to be generated (e.g., a standard report used for benchmarking, or a particular report specific to and used in the organization), a response time of a particular server to a ping, a load time of a server when an application is requested, and various other performance metrics. The task of generating a report or generating other types of documents can provides information about particular characteristics and performance metrics of a system. In some implementations, generating a report involves extracting values from data sources and populating various fields of the report. For example, a report may be a template with fields for specific characteristics of the system including available memory, percentage of CPU used, and various other characteristics.

In some implementations, the health scores may be calculated by migrating the selected object and generating a report using the object in the new environment, which may be an existing environment in the enterprise or a newly generated environment created by the system. For example, a health score for a migration of a user named Brad may be calculated by migrating a copy of Brad's processes into the new environment and then generating a report on particular characteristics of Brad's processes. The health score for Brad's migration to the new environment may include an indication of Brad's effect on the new environment. In such examples, the migration may be temporary, and the user may be able to reverse the migration after being presented with the effects of the migration. In some implementations, a simulation of aspects of the migration may be performed without actually initiating or temporarily performing migration. For example, a profile of usage patterns of a user or group of users may be determined from logs or other usage records. The profile may indicate, for example, a frequency of database accesses, typical storage requirements, types of queries run, etc. From this profile, actions similar to those in the profile can be performed in the new environment to measure performance, even without performing the same actions or using the same documents the users actually used.

In some implementations, the health scores for a migration from a current environment to a new environment (e.g., one different from the previous environment) may be calculated by using known characteristics of the new environment. In such examples, the health scores provide accurate predictions for the performance of the object being migrated in the new environment. Benchmark results or scores for particular characteristics of the initial system are taken prior to the migration, and these benchmark values can be used to estimate performance of the system in the new environment. For example, if the system has access to 32 computing cores in the current environment and has access to only 16 cores in the new environment, a projection that the system has reduced access to processing power can be generated. A health score for the migration of the system may indicate that there is a reduced performance, and, for example, reports may take longer to generate, applications may take longer to initialize, etc. In some implementations, health scores and other measures are generated by the management server 760 and provided to a user's client device for display. In some implementations, health scores and other measures are generated by a client device, for example, by computing the scores from data from the management server 760 and/or one or more databases. The scores can be generated in response to a notification from a management server or in response to a policy for the enterprise. As an example, a policy may indicate that certain actions, such as changing the assignment for an item to be served from one environment (e.g., a first server system) to a second environment (e.g., a second server system), should always be evaluated for performance impact.

In general, the anticipated health score may include various suitable system performance indicators. For example, the anticipated health score may include, but is not limited to, data indicative of one or more of a response time, reliability, data processing speed, data processing capacity, available storage, user capacity, security status and indicators, and network connectivity and performance.

The system may generate the expected load characteristics in response to the user action to drag from one portion of an environment to another. To generate health scores or performance predictions, the system may access data indicting prior usage of the object and current configuration data. Various documents, applications, and other objects may be profiled to indicate typical usage patterns and resource requirements. For example, bandwidth, storage, and computation requirements can be determined from the characteristics of the application, determined from previous access, or estimated from objects with similar characteristics. In this manner, the resource needs of an object can be known at the time a user attempts a change. The available capacity of the destination environment, and the recent history for the environment, can be used also to generate the scores.

The SPPI may also provide supplementary information regarding the object. For example, as shown in FIG. 10, the SPPI may provide information regarding a reliability of the object or a remaining user capacity for the object prior to migration of the object. In some implementations, the SPPI may also provide one or more of reports, analyses, or recommendations regarding the migration of the object. The SPPI may provide guidance to a user regarding the effects of the migration of the object on the performance of the system or environment.

For example, as shown in FIG. 10, the SPPI indicates that migration of the object "might cause the environment to be in bad performance." In some implementations, the SPPI may provide a recommendation and/or instructions for migrating the object to another environment or category as a more suitable option for data migration or for improved system performance. In some implementations, the SPPI may provide a recommendation not to migrate the object.

In some implementations, the SPPI may provide feedback to the user in terms of which functionality would be affected. The feedback may be provided through a user interface such as an application dashboard, a separate window, etc. In some implementations, the SPPI may provide a visual representation of the effect of a user's actions (e.g., an object migration) on the environment or system. For example, the SPPI may provide a visual data representation of the change the migration of a particular machine to a new environment would have on the environment through a bar graph on a dashboard interface displayed to a user. In other examples, the SPPI may provide a textual indication of the effect of an object migration on a particular environment or system's performance, such as "Are you sure you wish to complete this migration? The change in report generation time is +0.6 seconds, indicating a 45% decrease in performance."

In some implementations, the SPPI may classify the predictions into different alert levels and provide an indication of the alert level to the user. For example, the SPPI may use a four-level alert system such that: in the first level, the enterprise system is not predicted to be impacted negatively by the object migration and no warning message is generated for the user; in the second level, the enterprise system is predicted to be impacted negatively by the object migration by less than a threshold amount, and a proceed with caution alert message is generated and presented to the user; in the third level, the enterprise system is predicted to be impacted negatively by the object migration by more than a threshold amount and an alert indicating that the object cannot be migrated without a system administrator's approval is generated for the user; and, in the fourth level, the enterprise system is predicted to be harmed significantly (e.g., much greater than the threshold amount) by the object migration and an alert indicating that the object migration cannot be completed is generated for the user. Although a four level alert system is described, multiple levels of alert may be used to communicate the likely effectiveness, security, or efficiency consequences resulting from the object migration.

By providing a user with alerts and project performance changes, the SPPI allows users to make informed decisions about whether they wish to complete certain actions. The alerts, prompts, and supplemental information provided by the SPPI are unobtrusive, and are presented only when a user attempts to make a change to an environment or system. By analyzing the system in response to a user action, the described method of providing alerts reduces the amount of computing resources used.

In some implementations, the SPPI may actively monitor an environment or system to provide suggestions that improve performance. The SPPI may provide actionable insights, or recommendations, automatically without user input or action. For example, the SPPI may display a prompt to a user asking if the user would like to migrate a particular application to a different environment in order to increase performance of the application.

To determine when to provide a recommendation or warning, the management server 760 can estimate performance impact of user changes in response to user actions. For example, for each configuration change a user initiates, or for changes that meet certain predetermined criteria, the management server 760 can determine one or more estimated performance measures. While the performance measures are generated in response to user configuration change requests, and are customized for the particular change requested (e.g., the specific servers, documents, users involved), the management server 760 can use previously generated benchmark results and conversion measures to maintain appropriate responsiveness.

For example, the management server 760 may store benchmark results, performance measures for different computing environments, and conversion factors prior to the time a user requests a configuration change, so that predictions of the performance impact of a configuration change can be generated quickly once a change is requested. For example, in some implementations, the predicted performance measures may be generated and provided e.g., 10 seconds, 5 seconds, 2 seconds, 1 second, or less after a change is requested. In some implementations, these performance predictions may be provided substantially in real time, as the user is managing the configuration of the system.

The management server 760 may automatically benchmark the capabilities of different devices in the enterprise computing system. This can involve actively instructing different devices to perform a standardized set of tasks while measuring the performance. The management system 760 can also monitor storage capacity remaining, average and peak CPU loads, and other performance measures for different systems in their current configurations. In addition, the management system 760 can passively monitor and store data indicating the resource demands required to perform particular tasks, such as to load or generate individual documents or run individual applications, as users use the enterprise computing resources in everyday use. In addition to these profiles of system capabilities and typical resource demands, the management system 760 can compare the performance of the same or similar task on one system relative to another. From these comparisons, and from comparisons from benchmark test results, the management server 760 can determine conversion factors to generate predictions.

For example, the performance of a task of a particular application may be determined to vary between servers having different numbers of CPUs, for example with a response time of 8 seconds for a server with 4 CPUs, 6 seconds for a server with 8 CPUs, 4.5 seconds with a server with 12 CPUs and so on. For this application, a curve that extrapolates expected performance for different CPU counts can be determined. Then, when a requested change would change the CPU count from 10 CPUs to 5 CPUs, the impact on responsiveness can be calculated based on the change between locations on the curve corresponding to the change from 10 CPUs to 5 CPUs. Other factors, such as available working memory, communication bandwidth, existing load, and so on can also be taken into account with other comparisons.

In some implementations, the SPPI may provide the user with alerts asking "Are you sure you wish to complete this action? This decreases the security of your system and increases latency." In some implementations, the SPPI provides the user with an option to proceed with or terminate the object migration. For example, after presenting the predicted health score of the enterprise system if an object is migrated, the SPPI may request the user to confirm whether the user would still like to continue with the object migration or if the user would like to terminate the object migration. In some cases, if the predicted health score is less than a particular threshold (e.g., representing a particularly adverse result of a change), the user may not be presented with the option to continue with the object migration, and the user will instead be informed that the object migration will either be terminated or requires approval by a system administrator.

After presenting the SPPI, if the enterprise system receives a selection indicating that the user has elected to continue with the object migration, the enterprise system may execute the object migration and provide system health reports to the user.

In some implementations, to execute the object migration, each asset of the object is provided in the destination (e.g., "Aqueduct Production") environment. In some implementations, to provide the assets in the destination (e.g., "Aqueduct Production") environment, the original object assets may be copied, redistributed, or modified so that the object may function and be executed in the new "Aqueduct Production" environment.

In some implementations, the system may automatically make changes to environments based on health scores for the environments. The system may periodically generate health scores for a particular environment and monitor the health scores to determine that a change to the environment should be made, and may use the health scores or other performance measures to determine what change to make. For example, the system may determine that the health score for server reliability for a certain environment has decreased, and that the lowest factor in the server reliability score is the amount of memory available. In this example, the system may automatically determine that more memory will be made available to the objects within the environment, and determine the amount of memory to add to the environment.

FIG. 11 is an exemplary illustration of the enterprise system providing health reports and alerts on a GUI 1100 shown at a client device after object migration has occurred. For example, as shown in FIG. 11, four health alerts have been generated for the "Aqueduct Production" environment. The health alerts indicate that system reliability and capacity has reduced, and that the performance of the "Dossiers" and "Dashboards" subcategories has reached a threshold. In general, health alerts may be provided for any environment in the enterprise system, and the health alerts may be generated on a continuous or periodic basis. In some implementations, health alerts are generated after detection of an event, such as a decrease in capacity, performance, or reliability beyond a set threshold.

In some implementations, users may be able to review alerts at any time. For example, a user may select the health alerts from an interface element to view the active health alerts. In some examples, users may be able to perform actions related to the alerts, such as dismiss the alerts, delay the alerts, etc.

Figure 12:
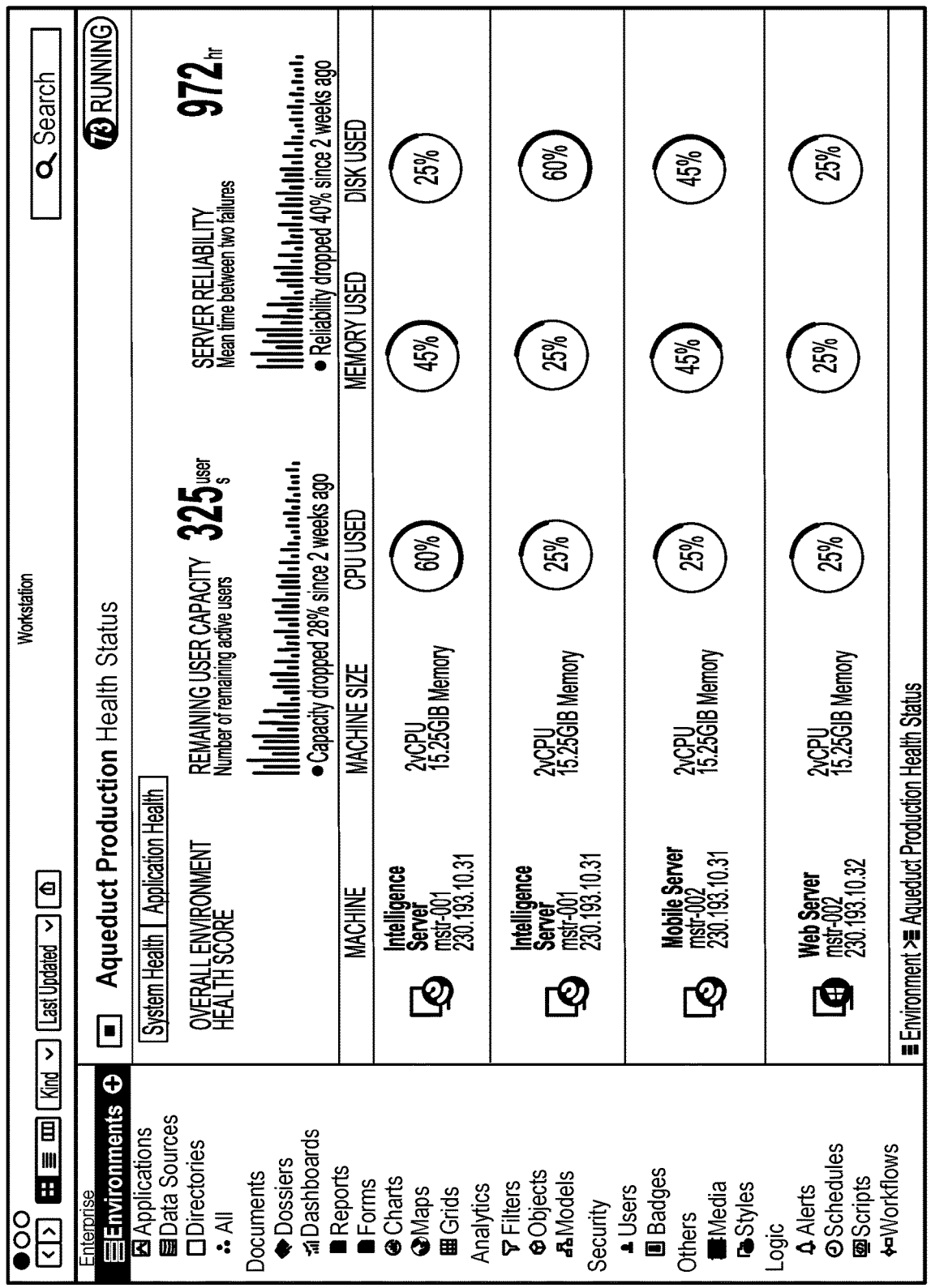
FIG. 12 is an exemplary illustration of an overall system health score.
Figure 14:
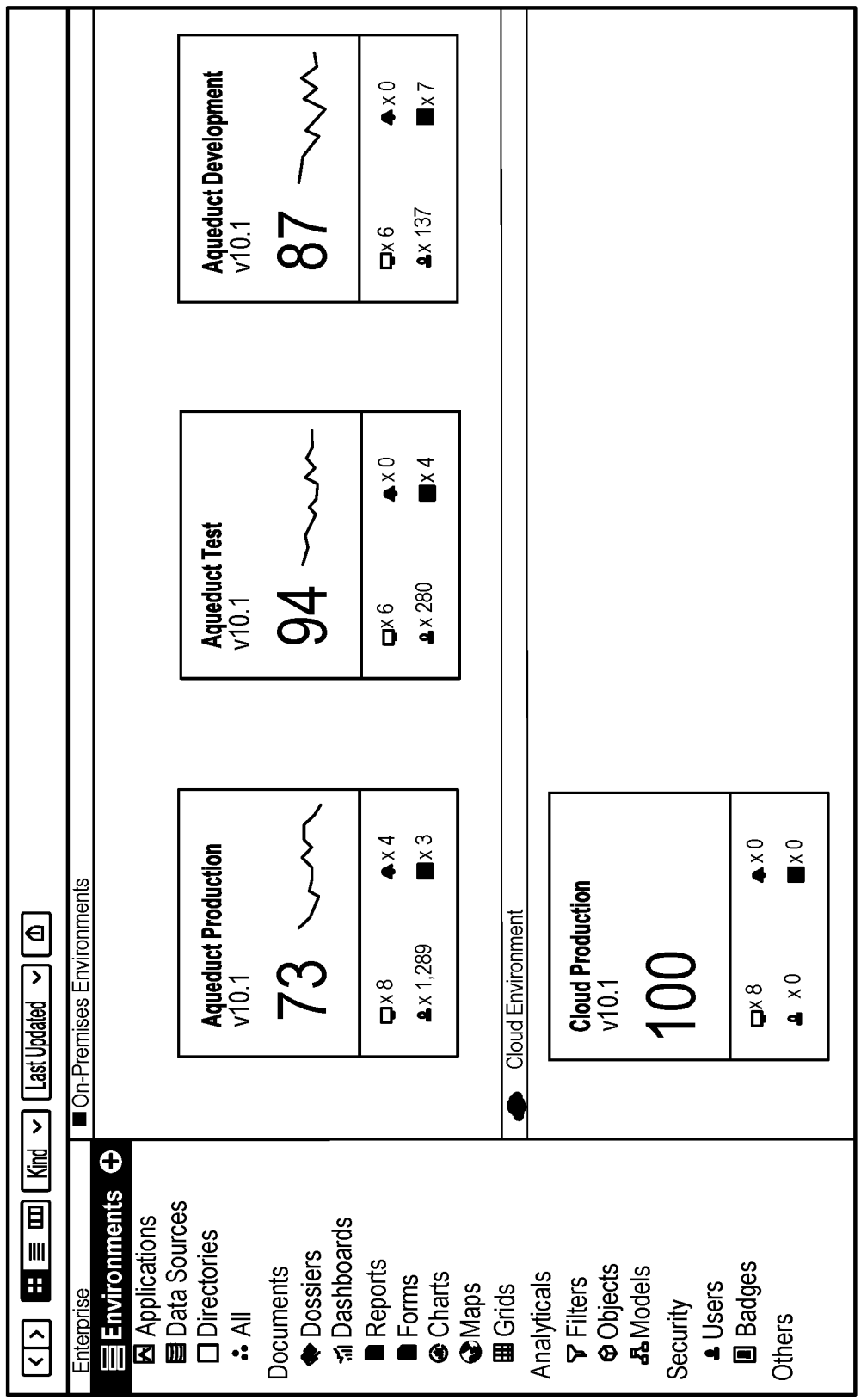
FIG. 14 is an exemplary illustration of a GUI displaying a status of a cloud-based environment.
Figure 15:
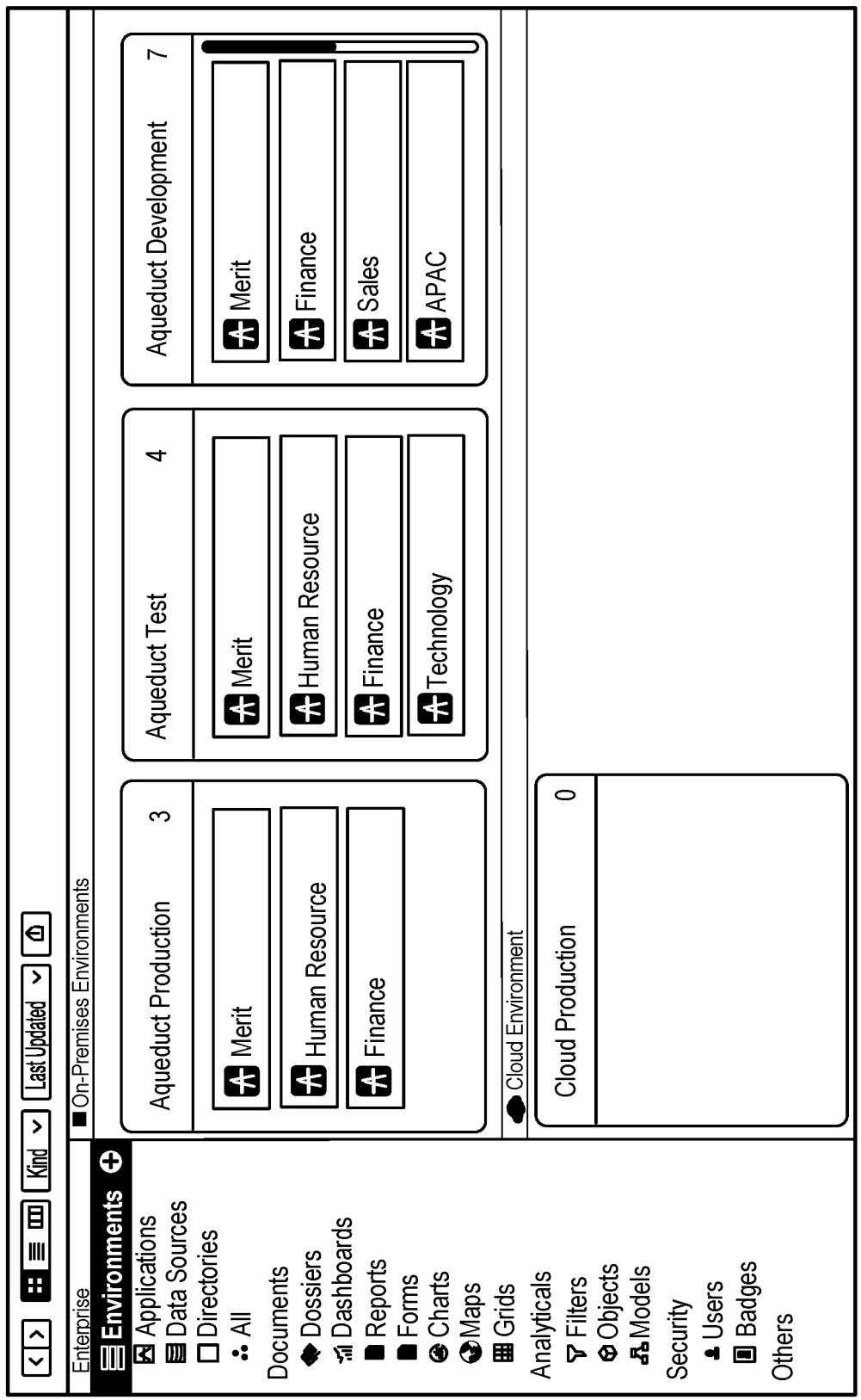
FIG. 15 is an exemplary illustration of a GUI displaying an indicator of a cloud-based environment.

FIG. 12 is an exemplary illustration of an interface 1200 displaying an overall environment health score for a particular environment. An environment is a grouping of servers to engage in a certain task. A health score represents an estimated or projected measure of performance of an environment. In FIG. 12, the overall health score for the "Aqueduct Production" environment is shown. The overall health score for an environment may be calculated based on multiple dimensions, and these dimensions may be displayed in a user interface. In some examples, users may select dimensions to be included in the health score calculations through the user interface.

The health score may be calculated based on various characteristics of the system, such as the mean time to generate a report, the mean time between failures of the system, etc. The reports may be templates with fields that are populated with values determined by the system. As described above with respect to FIG. 10, the reports may be highly customizable. An end user may create reports used in health score calculations, and may change the factors included in a report. In some implementations, a user may customize a report to include only the factors they are interested in.

In some implementations, users may select which reports or which portions of the reports are part of the health score calculations. A user may select reports on characteristics and performance metrics of particular machines to be included in a health score calculation. For example, a user may select their particular machine and their two most frequently used applications to be used in a calculation for their environment health score. In some implementations, the reports that are included in a health score calculation for a particular environment are predetermined. For example, an overall environment health score for an environment including machines, users, and applications may include a report on a randomly selected machine, a report on a randomly selected user, and a report on a randomly selected application.

Different environments and applications may have different algorithms for calculating a health score and a different set of reports included in the health score calculation. In some implementations, different environments and applications can have different health scores, such as overall machine health scores, individual user health scores, etc.

In some implementations, each resource or object in an environment includes a universal product code (UPC) that uniquely identifies the resource or object. The system may use the UPCs to determine when a particular functionality or object is accessed by a report, altered by a user, etc. For example, the system may access a database of UPCs to determine which portion of the system was affected by a user-initiated cache clearing. The system may determine which objects were accessed while a report was generated by determining which UPCs are included in the report and which portions of the environment are included in the health score calculations. In some implementations, the system can determine when users have interacted with products associated with a particular UPC. In some implementations, the system may use the UPCs to locate a resource or object. For example, a user may determine which portions of an environment are included in a health score calculation by indicating which UPCs are included.

In some implementations, users may set parameters for the health score calculations. For example, a user may define that a health score is generated by averaging the scores of different components of the health score. The user may define a range of time within which a report must be generated in order for that aspect of the health score to receive full marks. In such an example, the user may define that if a report is generated within 3 seconds, that portion of the health score is 100, if a report is generated after 3 seconds but within 5 seconds, that portion of the health score is 50, and otherwise, that portion of the health score is 0. In another example, a user may determine that the score for a portion of the health score can be determined based on the performance of the reports included in the calculation. For example, if 73% of the reports are generated within the set range of time, the overall health score is 73.

In some implementations, an individual score that is used in the calculation of an overall health score can be weighted based on the distance a metric is from a predetermined score or a user selected guideline. For example, a user may determine a band of acceptable values for a particular metric, such as the load time for a particular application, the amount of memory used, etc. In such an example, if the value of the particular metric for a particular environment is determined to be outside of the band of acceptable values, the particular metric is weighted more heavily than if it was within the band of acceptable values. In some implementations, the farther outside of a band of acceptable values a metric is, the more heavily it is weighted. For example, if a metric is two standard deviations outside of the band of acceptable values, it will be weighted more heavily than if it is one standard deviation outside of the band of acceptable values.

In some implementations, factors are weighted based on their impact on the environment's performance. For example, if an application within a particular environment runs out of disk space, the performance metric for the application could be weighted heavily because the application is using an excessive amount of processing power to compensate for the lack of disk space.

In some implementations, there may be a default set of rules or a default algorithm for determining a health score. For example, there may be a default set of reports that are generated, and the scores assigned to each health report may be averaged to determine a health score. In some implementations, users may customize the set of rules or the parameters of the health score calculation. For example, a user may customize the set of reports that are included in the health score calculation, alter the algorithm used to determine the health score, select certain portions of the environment to include in the reports, etc. Different environments and applications can have different algorithms, different sets of reports, etc. for calculating a heath score.

In some implementations, data used for generating the reports are captured periodically. For example, data in a particular environment may be captured every hour. In some implementations, data used for generating the reports are captured in response to certain actions. For example, data in a particular environment may be captured in response to a user initiating a migration of an object to a new environment.

FIG. 12 is an exemplary illustration of an overall system health score. In this particular example, the SPPI is displayed in the interface 1200, and may display information regarding the performance parameters of an environment. Information regarding various performance parameters such as the remaining user capacity and server reliability in the "Aqueduct Production" environment, machine storage size, memory usage efficiency, disk usage efficiency, and a central processing unit efficiency associated with particular servers is displayed. One or more graphical and alphanumeric representations may be used to display the various performance parameters. For instance, a bar graph is used to illustrate how the remaining user capacity and server reliability has changed over a two-week period.

In some implementations, the interface 1200 may display the changes in a health score across different states of a particular environment. For example, the interface 1200 may display a line graph that displays the historical trends of a health score for a particular application. In such examples, the interface 1200 may display information for a particular object or resource over a period of a day, a week, a year, etc. In some implementations, the interface 1200 may display visual representations of the changes in the overall health score for an environment, a particular machine, etc.

A user may be able to select an overall health score for a particular environment or for particular applications within the environment. For instance, in FIG. 12, a "System Health" tab is selected and therefore an overall health score for the "Aqueduct Production" environment is displayed. Upon selection of the "Application Health" tab, a user may select one of more applications in the environment and view the health score for each application.

In some implementations, the interface 1200 displays an overall snapshot of the current performance of different servers or applications in a particular environment. For example, the interface 1200 can display performance metrics, such as health scores, for each server in a particular environment. In some implementations, the interface 1200 displays performance information for a set of machines or servers in an environment. For example, the interface 1200 may display performance information for the machines performing below a performance threshold. In some examples, the system automatically determines performance information to display on the interface 1200. For example, the interface 1200 may display performance information for a particular user's machine when the particular user is accessing the interface 1200.

In some implementations, users may be able to sort the information displayed in the interface 1200 by characteristics such as display format (e.g., mobile, web), browser, adoption rates, performance, etc. For example, a user may sort the information display in the interface 1200 based on whether a particular application is performing at a particular threshold performance level. In some implementations, the system may determine that a particular application is performing abnormally. For example, the system may determine that the application is using an unusually large portion of the processing resources of a particular machine, and may display the performance metrics of the particular application in the interface 1200.

In some implementations, users can interact with the interface 1200 through various interface elements. For example, a user can click on the side bar of the interface 1200 to select a different category to view, a different environment, a different application, etc.

Figure 13:
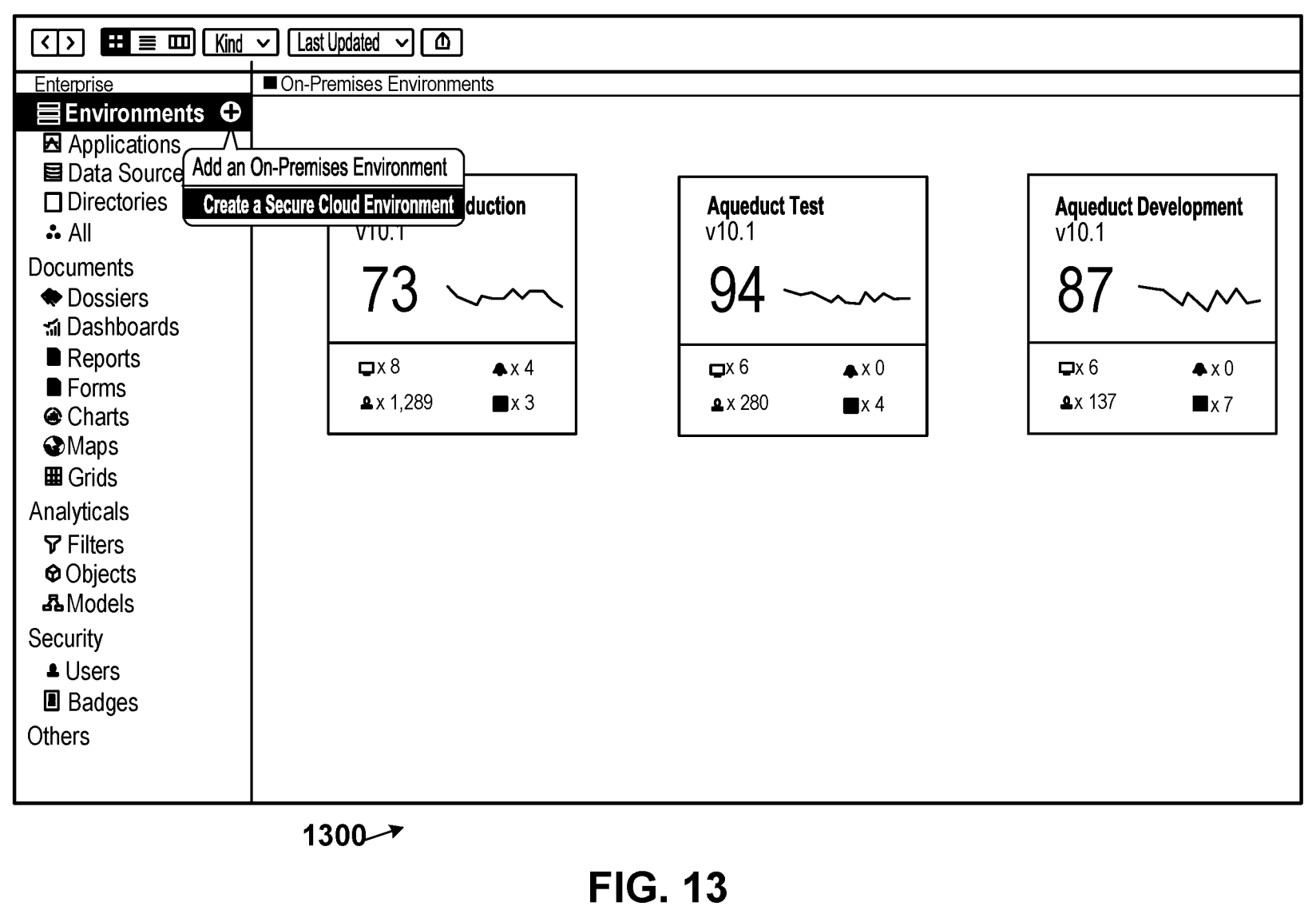

FIG. 13 illustrates another interface 1300 providing information about the environments available in the unified, multi-platform enterprise system. However, compared to FIG. 9, in FIG. 13, status information is provided for each environment. Status information may include various data indicative of the environment's health such as, for example, an overall health score indicator, the number of machines, alerts, users, warnings, and failures in each particular environment.

In some implementations, a user may choose to create a new environment such as a secure cloud environment. As shown in FIG. 13, a user may select the option to create a new secure cloud environment from a menu in the GUI 1300, and a new environment, entitled "Cloud Production," may be created, as shown in the GUI 1400 of FIG. 14. If the "Applications" category is selected in the GUI, an alternative view of the environments available in the unified, multi-platform enterprise system and applications located within the respective environments is displayed, as shown in the GUI 1500 of FIG. 15.

Figure 16:
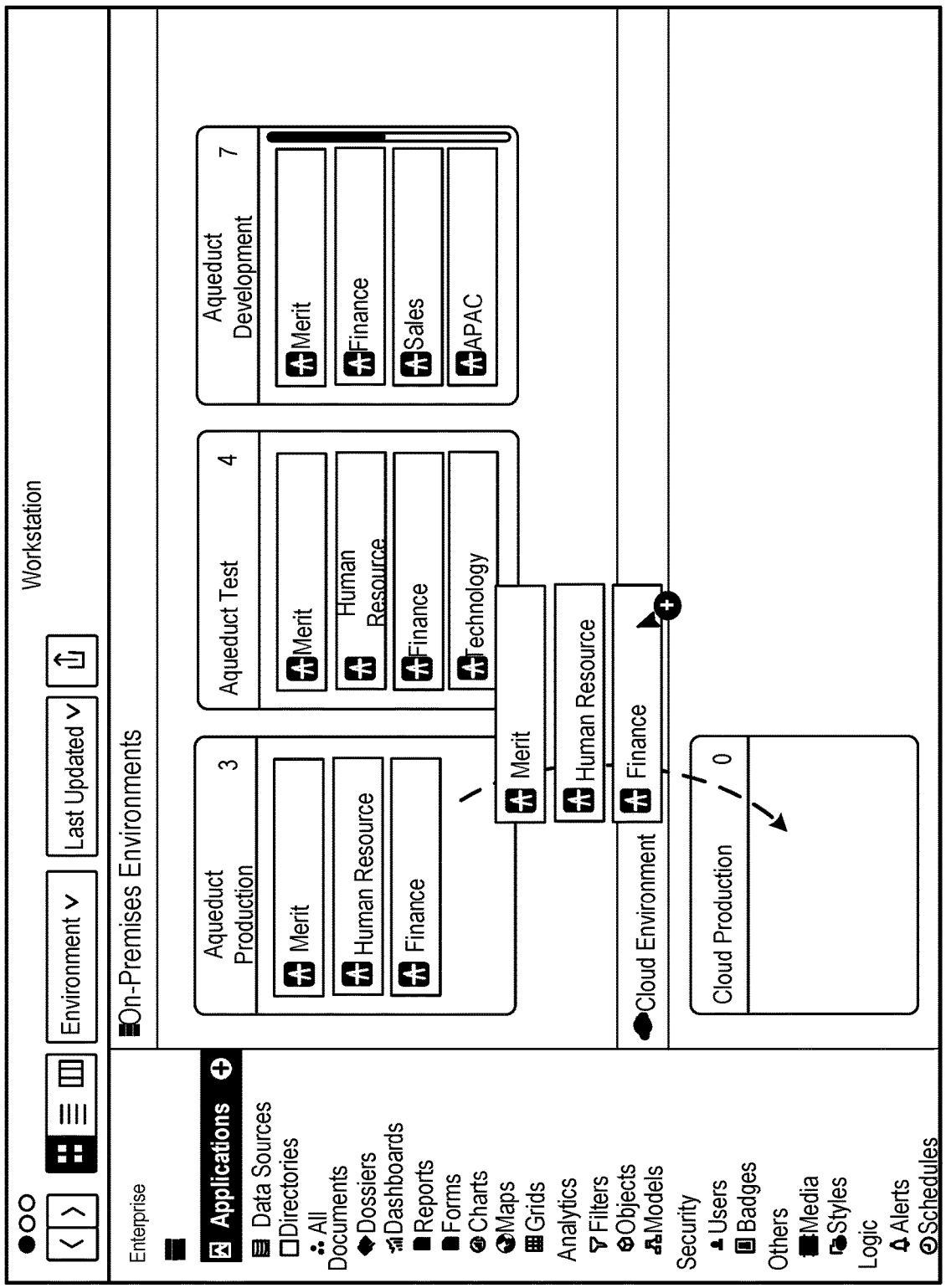
FIG. 16 is an exemplary illustration of a drag-drop operation to drop objects in a cloud-based environment.

FIG. 16 illustrates a GUI 1600 and another drag-and-drop operation in which a user is copying the applications "Merit," "Human Resource," and "Finance" into the "Cloud Production" environment from the "Aqueduct Production" environment. As described above, when manipulating data (e.g., copying data or migrating applications) from one platform, category, or environment to another, numerous operations and tasks are being executed in the background. These numerous operations and tasks include, for example, determining the type of data object (e.g., the applications in FIG. 16) being manipulated and determining features and assets of the object. The determined features and assets of the object may be reconfigured, copied, or modified to copy the "Merit," "Human Resource," and "Finance" applications into the "Cloud Production" environment. Assets of the object may include one or more a metadata model associated with the object, data indicative of users associated with the object, data structures associated with the object, and data sources associated with object.

In some implementations, the resources or data assets of the object may be displayed in user interfaces such as the interfaces shown in and described with reference to FIGS. 10-13.

The process of migrating or upgrading an environment within an enterprise may include the management server 760 establishing a baseline level of performance by running quality assurance reports and tests and documenting a baseline system performance. Establishing a baseline may include determining the performance characteristics of the particular system.

Next, the management server 760 determines the states of machines within an environment by collecting and taking backups of configuration files within the infrastructure (e.g., backing up plug-ins, metadata, .ini, etc.).

The management server 760 then deploys the new environment. An infrastructure is created by allocating hardware required by the new environment and/or deploying a virtual machine (VM) with the new environment. The management server 760 identifies pre-requisite components from the baseline measures and installs those components, and organization specific settings (e.g., antivirus software, administrative access rights, etc.) are applied.

The management server 760 sets up the database platform is set up by installing and configuring a database server. A third-party platform for managing the migration and upgrading of an enterprise's systems is installed. Next, management server 760 applies the previous machine state to the new infrastructure by merging the configuration files form the original infrastructure into the new infrastructure. Then, the databases are restored from backup files or copied from the environment that runs in parallel.

The management server 760 sets up and configures individual applications and management software in the new infrastructure. For example, search software, network management software, etc. may be configured for operation in the new environment.

The management server 760 performs quality assurance tests, and a new baseline with performance characteristics and metrics is established. Finally, the management server 760 compares the initial baseline and the new baseline evaluates the effects of the migration and/or upgrade.

In some implementations, the deployment of an environment further includes updating a user interface or a console through which a user provides input to the system. For example, the management server 760 may provide a user device with a notification that the build and deployment of a new environment is complete. Upon completion of deployment, the management server 760 may continue to configure non-critical applications, such as platform services, web and mobile settings, email, etc. In some implementations, the management server 760 may notify users of the new environment that the migration or update is complete. For example, the management server 760 may send users an email stating that the new environment is ready for use.

The process of migrating and/or updating an environment and deploying the environment may be executed automatically by the management server 760 when a user initializes migration. For example, the management server 760 may perform the process automatically when it is given data indicating that a user instructed the migration to occur, e.g., through a drag and drop operation on a user interface of a client device.

In some implementations, the management server 760 runs software that provides the data shown in user interfaces as illustrated and described in the present application. That data can be rendered or interpreted by a client device that displays the user interfaces depicted in the figures. For example, the client device can run a management application that communicates with the management server 760 to obtain messages or performance measures to display, and the application on the client device generates the visualizations and interactive elements based on the data received. The management server 760 manages the transition, migration, updating, etc. of the environments within the system 700.

In some implementations, the local server 770 runs software that provides the user interfaces as illustrated and described in the present application. The local server 770 manages the transition, migration, updating, etc. of the environments within the system 700.

Figure 17:
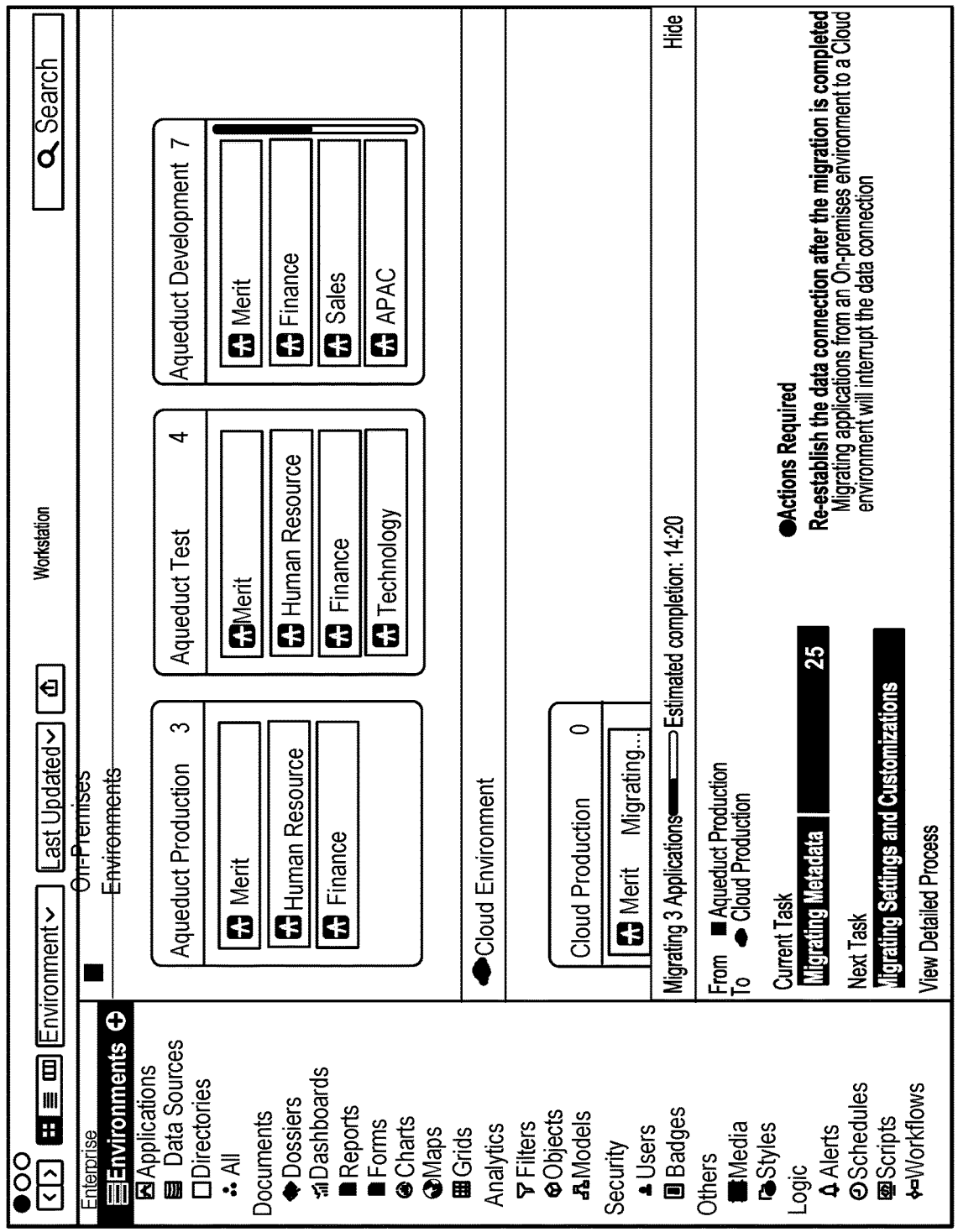
FIG. 17 is an exemplary illustration of a tasks and status indicator for a drag-drop operation to drop objects in a cloud-based environment.

FIG. 17 is an exemplary illustration of a tasks and status indicator for the drag-drop operation to drop the application objects in a cloud-based "Cloud Production" environment. For example, the GUI displays status indicators that identify a source of the data objects being manipulated, a destination of the data objects being manipulated, current tasks being performed, a next task to be performed, and any additional actions required. It should be understood that the displayed status indicators are exemplary, and various other suitable status and tasks indicator may be provided.

After data migration for the "Cloud Production" environment is complete, a user may select the "Cloud Production" environment by clicking on the displayed representation of the "Cloud Production" environment to view a profile of the "Cloud Production" environment. As shown in FIG. 18, the "Cloud Production" environment profile includes information that identifies machines and applications operating in the "Cloud Production" environment, and respective characteristics (e.g., address, CPU usage, memory usage, disk usage) of the identified machines and applications.

In some implementations, a user or system administrator may want to restrict access of particular users to particular categories, platforms, environments, or sub-categories. Accordingly, the GUI provides a tool for selecting one or more categories, platforms, environments, or sub-categories and fencing users within the one or more categories, platforms, environments, or sub-categories.

Figure 20:
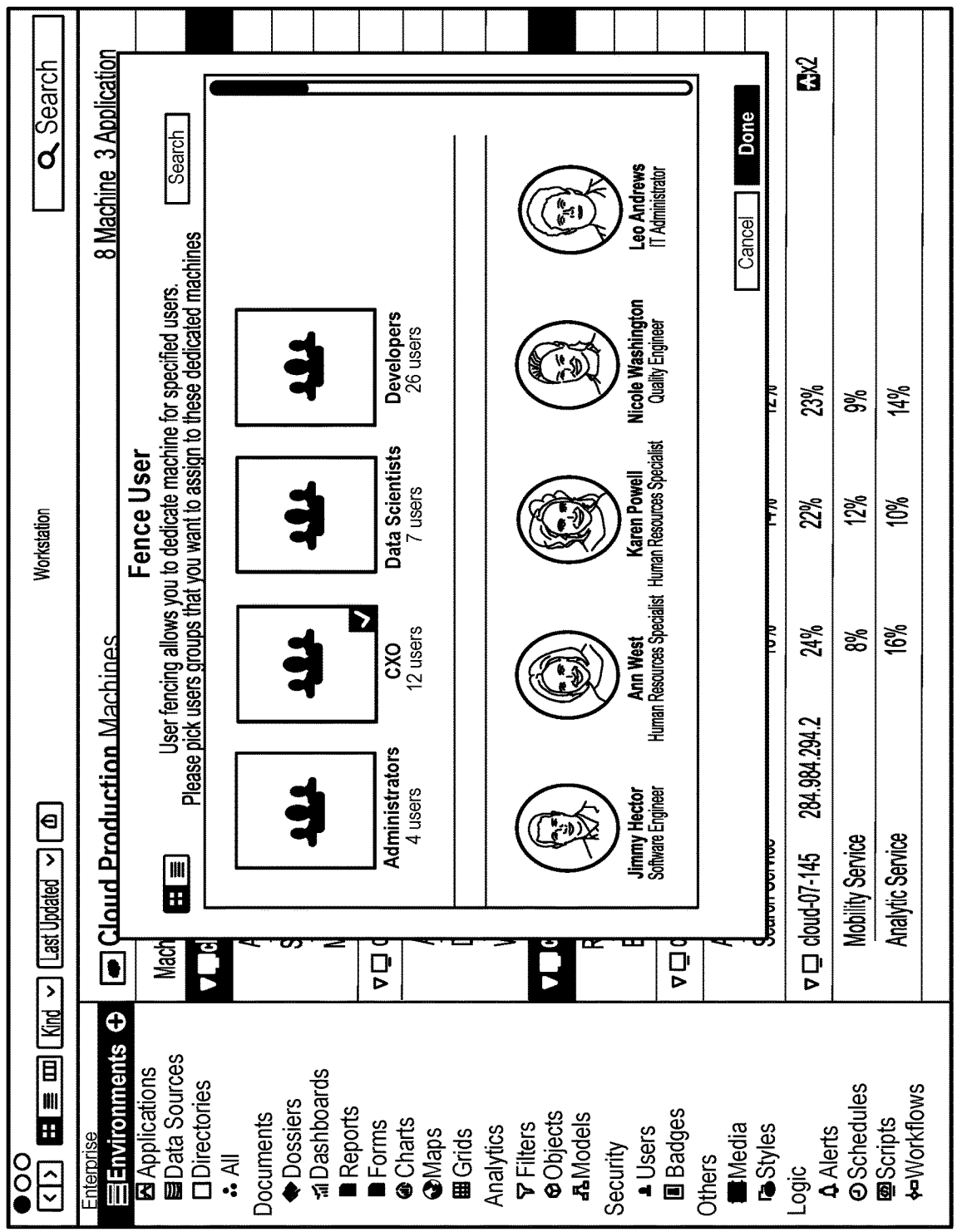
FIG. 20 is an exemplary illustration of an operation to fence users.

For instance, as shown in the example illustrated in FIG. 19, the user has selected two machines and a menu option to fence users for these two machines. In response to selection of the menu options, a new window providing data on users and user groups is displayed, as shown in FIG. 20. The user or system administrator may then select a user group (e.g., "CXO") or one or more users, who will be restricted to accessing just the two machines. After selecting the users or user groups, the profile of the environment is updated to reflect the fenced in users. For example, in FIG. 21, the "Cloud Production" environment has been updated to reflect that users in the "CXO group" have been fenced into machines "cloud-07-134" and "cloud-07-138."

In some implementations, users are fenced to particular machines or environments to ensure performance targets are met. For example, the CTO of a company may be assigned or "pinned" to a particularly reliable machine that is only used by him so that his requested reports on productivity for the entire enterprise system are generated quickly, research and development employees running resource-intensive simulations can be pinned to separate, different servers so that if one simulation crashes, it doesn't affect the other simulations.

As noted above, a simply process such as a drag-and-drop move of a server-hosted document or application may initiate a number of migration actions. These actions may be performed automatically in response to the user's confirmation for the change in serving the object, without further input from the user. As a few examples of the actions that may be performed to migrate an object, a server may: analyze required resources for the application move and advise on possible outcome; migrate metadata; migrate object definitions; migrate data source connections; migrate object dependencies; migrate users, user groups, and user directories; migrate environment and application settings; intelligently merge server-level settings (e.g., governing limits) or flag when destination limits may cause reduced application performance; migrate customizations; migrate enterprise assets; migrate the security layer (access control list, privileges, and permissions); and/or provide notifications/migration messaging.

According to the implementations described hereinabove, an improved method for manipulating data across a unified, multi-platform enterprise system is described. The described GUI provides a simple, easy-to-use interface with the unified, multi-platform enterprise system. Operations such as drag-drop or copy-paste may be executed using tools on the front end of the graphical user interface. However, on the back-end, various operations, such as object asset identification, acquisition, and manipulation, may be performed to ensure that data objects that are manipulated may operate across multiple platforms, environments, and categories. Although the implementations noted above have been described with respect to a unified, multi-platform enterprise system, it should be understood that these implementations may also be applied and utilized across various other types of networks and systems, such as an ad-hoc network with multiple user devices and platforms.

Because the management server 760 provides management functionality that is integrated with the information technology infrastructure of an enterprise, the management server 760 has access to user data as well as performance data for all environments, applications, and machines within the infrastructure. This provides a unique method of migration and performance monitoring of particular components within the infrastructure. For example, the management server 760 can determine that application performance is suffering for a particular user because available memory is low for the virtual machine associated with the user. The system is able to provide actual data for particular use cases.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more computers, the method comprising:
   providing, by the one or more computers, an interface indicating a set of data objects used in a first server environment;
   receiving, by the one or more computers, data indicating a selection of testing parameters including a load level and one or more data objects selected from among the set of data objects;
   generating, by the one or more computers, a server environment test configured to generate concurrently running tasks at the indicated load level using the selected data objects;
   performing, by the one or more computers, the server environment test on the first server environment to generate first results indicating at least server resource usage levels and response times of the first server environment during the server environment test;
   performing, by the one or more computers, the server environment test on a second server environment to generate second results indicating at least server resource usage levels and response times of the second server environment during the server environment test, the first server environment having a first configuration that is different from a second configuration of the second server environment;
   determining, by the one or more computers, that a difference between the first configuration of the first server environment and the second configuration of the second server environment causes a difference between the first results and the second results; and
   based on the first results and the second results, providing, by the one or more computers, an output data set indicating (i) performance of the second server environment relative to performance of the first server environment and (ii) the difference between the first configuration of the first server environment and the second configuration of the second server environment that is determined to cause the difference between the first results and the second results.

2. The method of claim 1, wherein providing the output data set comprises providing a document having an interactive user interface that includes a set of controls customized based on the first results and the second results.

3. The method of claim 2, comprising:
   determining, based on the first results and the second results, an error that occurred during testing of the second server environment, wherein the difference between the first results and the second results includes the error occurring for the second server environment and not occurring for the first server environment;

wherein determining that the difference between the first configuration of the first server environment and the second configuration of the second server environment causes a difference between the first results and the second results comprises identifying, by the one or more computers, a software configuration setting of the second configuration of the second server environment corresponding to the error; and based on identifying the software configuration setting corresponding to the error, generating the document such that the set of controls includes a control that is configured to initiate, when selected by a user, a change to the software configuration setting to avoid the error.

4. The method of claim 3, comprising determining, based on the first results and the second results, that the error did not occur during the server environment test of the first server environment, wherein identifying, by the one or more computers, the software configuration setting comprises identifying a software configuration difference between the first server environment and the second server environment, and wherein the document is generated based on identifying the software configuration difference between the first server environment and the second server environment such that the control configured to initiate the change to the software configuration setting is configured to change the software configuration setting of the second server environment to a corresponding setting of the first server environment.

5. The method of claim 1, further comprising, after performing the server environment test for the first environment, making a hardware and/or software change to the first server environment to create the second server environment.

6. The method of claim 1, comprising:

accessing usage logs indicating load on the first server environment over a period of time;

determining, based on the usage logs:
a profile of tasks performed over the period of time; and
a maximum level of concurrency supported by the first server environment over the period of time; and determining, based on the second results, whether the second server environment supports the maximum level of concurrency with tasks corresponding to the profile of tasks, wherein providing the data set comprises providing an indication whether the second server environment supports the maximum level of concurrency with tasks corresponding to the profile of tasks.

7. The method of claim 1, wherein:

performing the server environment test on the first server environment comprises testing the first server environment to determine a maximum level of concurrency of users or tasks supported by the first server environment;

performing the server environment test on the second server environment comprises testing the second server environment to determine a maximum level of concurrency of users or tasks supported by the second environment; and providing the output data set comprises indicating the maximum level of concurrency supported by the second server environment relative to the maximum level of concurrency supported by the first environment.

8. The method of claim 1, wherein the data objects comprises one or more of data sources, documents, or applications.

9. The method of claim 1, wherein the interface comprises a graphical user interface or an application programming interface.

10. The method of claim 1, wherein the second server environment differs from the first server environment in regards to one or more of a software configuration change, a hardware change, or a software upgrade.

11. The method of claim 1, wherein the server environment test is configured to test one or more of response time, task completion time, central processing unit resource usage, memory resource usage, or throughput.

12. The method of claim 1, comprising:

determining, by the one or more computers, whether the first results and the second results are valid; and determining, by the one or more computers, whether outputs from the server environment test on the first server environment match outputs from the server environment test on the second server environment.

13. The method of claim 1 wherein:

performing the server environment test on the first server environment comprises testing the first server environment to determine a maximum number of concurrent users or concurrent tasks supported by the first server environment;

performing the server environment test on the second server environment comprises testing the second server environment to determine a maximum number of concurrent users or concurrent tasks supported by the second environment; and providing the output data set comprises indicating the maximum number of concurrent users or concurrent tasks supported by the second server environment and the maximum number of concurrent users or concurrent tasks supported by the first environment.

14. The method of claim 1, wherein:

the first server environment is configured to run a first version of software;

the second server environment is configured to run a upgraded version of the software that is a newer version than the first version of the software;

performing the server environment test on the first server environment to generate the first results comprises performing the server environment test on the first server environment running the first version of the software to generate the first results;

performing the server environment test on a second server environment to generate the second results comprises performing the server environment test on the second server environment running the upgraded version of the software to generate the second results, wherein the first configuration includes a first software configuration corresponding to the first version of the software and the second configuration includes an upgraded software configuration corresponding to the upgraded version of the software;

determining that the difference between the first configuration and the second configuration comprises determining that a difference between the first software configuration and the upgraded software configuration (i) causes the difference between the first results and the second results and (ii) is due to a difference between the first version of the software and upgraded version of the software; and providing the output data set comprises providing the output data set indicating (i) performance of the second server environment running the upgraded version of the software relative to performance of the first server environment running the first version of the software and (ii) the difference between the first software configuration and the upgraded software configuration.

15. A system comprising:
one or more computers; and
a non-transitory computer-readable medium coupled to the one or more computers having instructions stored thereon, which, when executed by the one or more computers, cause the one or more computers to perform operations comprising:
providing, by the one or more computers, an interface indicating a set of data objects used in a first server environment;
receiving, by the one or more computers, data indicating a selection of testing parameters including a load level and one or more data objects selected from among the set of data objects;
generating, by the one or more computers, a server environment test configured to generate concurrently running tasks at the indicated load level using the selected data objects;
performing, by the one or more computers, the server environment test on the first server environment to generate first results indicating at least server resource usage levels and response times of the first server environment during the server environment test;
performing, by the one or more computers, the server environment test on a second server environment to generate second results indicating at least server resource usage levels and response times of the second server environment during the server environment test, the first server environment having a first configuration that is different from a second configuration of the second server environment;
determining, by the one or more computers, that a difference between the first configuration of the first server environment and the second configuration of the second server environment causes a difference between the first results and the second results; and
based on the first results and the second results, providing, by the one or more computers, an output data set indicating (i) performance of the second server environment relative to performance of the first server environment and (ii) the difference between the first configuration of the first server environment and the second configuration of the second server environment that is determined to cause the difference between the first results and the second results.

16. The system of claim 15, wherein providing the output data set comprises providing a document having an interactive user interface that includes a set of controls customized based on the first results and the second results.

17. The system of claim 16, comprising:
determining, based on the first results and the second results, an error that occurred during testing of the second server environment, wherein the difference between the first results and the second results includes the error occurring for the second server environment and not occurring for the first server environment;
wherein determining that the difference between the first configuration of the first server environment and the second configuration of the second server environment causes a difference between the first results and the second results comprises identifying, by the one or more computers, a software configuration setting of the second configuration of the second server environment corresponding to the error; and
based on identifying the software configuration setting corresponding to the error, generating the document such that the set of controls includes a control that is configured to initiate, when selected by a user, a change to the software configuration setting to avoid the error.

18. The system of claim 17, comprising determining, based on the first results and the second results, that the error did not occur during the server environment test of the first server environment,
wherein identifying, by the one or more computers, the software configuration setting comprises identifying a software configuration difference between the first server environment and the second server environment, and
wherein the document is generated based on identifying the software configuration difference between the first server environment and the second server environment such that the control configured to initiate the change to the software configuration setting is configured to change the software configuration setting of the second server environment to a corresponding setting of the first server environment.

19. The system of claim 15, comprising:
accessing usage logs indicating load on the first server environment over a period of time;
determining, based on the usage logs:
a profile of tasks performed over the period of time; and
a maximum level of concurrency supported by the first server environment over the period of time; and
determining, based on the second results, whether the second server environment supports the maximum level of concurrency with tasks corresponding to the profile of tasks,
wherein providing the data set comprises providing an indication whether the second server environment supports the maximum level of concurrency with tasks corresponding to the profile of tasks.

20. A non-transitory computer storage device encoded with a computer program, the program comprising instructions that when executed by one or more computers cause the one or more computers to perform operations comprising:
providing, by the one or more computers, an interface indicating a set of data objects used in a first server environment;
receiving, by the one or more computers, data indicating a selection of testing parameters including a load level and one or more data objects selected from among the set of data objects;
generating, by the one or more computers, a server environment test configured to generate concurrently running tasks at the indicated load level using the selected data objects;
performing, by the one or more computers, the server environment test on the first server environment to generate first results indicating at least server resource usage levels and response times of the first server environment during the server environment test;
performing, by the one or more computers, the server environment test on a second server environment to generate second results indicating at least server resource usage levels and response times of the second server environment during the server environment test, the first server environment having a first configuration that is different from a second configuration of the second server environment;

determining, by the one or more computers, that a difference between the first configuration of the first server environment and the second configuration of the second server environment causes a difference between the first results and the second results; and based on the first results and the second results, providing, by the one or more computers, an output data set indicating (i) performance of the second server environment relative to performance of the first server environment and (ii) the difference between the first configuration of the first server environment and the second configuration of the second server environment that is determined to cause the difference between the first results and the second results.

\* \* \* \* \*